US012691585B2

(12) United States Patent
D'Amelio

(10) Patent No.: US 12,691,585 B2
(45) **Date of Patent: *Jul. 28, 2026**

(54) SYSTEMS, DEVICES, AND METHODS FOR PERFORMING OPTIMIZED PICKING AND PLACING OPERATIONS IN A MANNER TO MINIMIZE VOID SPACE

(71) Applicant: Gridiron Robotics LLC, Chalfont, PA (US)

(72) Inventor: Peter D'Amelio, Langhorne, PA (US)

(73) Assignee: Gridiron Robotics LLC, Chalfont, PA (US)

( * ) Notice: Subject to any disclaimer, the term of this patent is extended or adjusted under 35 U.S.C. 154(b) by 412 days.

This patent is subject to a terminal disclaimer.

(21) Appl. No.: 18/230,593

(22) Filed: Aug. 4, 2023

(65) Prior Publication Data

US 2024/0066711 A1 Feb. 29, 2024

Related U.S. Application Data

(60) Provisional application No. 63/416,452, filed on Oct. 14, 2022, provisional application No. 63/395,279, filed on Aug. 4, 2022.

(51) Int. Cl.
*B25J 9/16* (2006.01)
*B25J 9/00* (2006.01)

(52) U.S. Cl.
CPC ........... *B25J 9/1697* (2013.01); *B25J 9/0093* (2013.01); *B25J 9/1612* (2013.01); *G05B 2219/32037* (2013.01)

(58) Field of Classification Search
CPC ...... B25J 9/1697; B25J 9/0093; B25J 9/1612; B25J 5/04; B25J 9/0084; B25J 5/007; G05B 2219/32037; G05B 2219/40006
(Continued)

(56) References Cited

U.S. PATENT DOCUMENTS

2015/0073589 A1* 3/2015 Khodl .................... G06Q 50/40
700/218
2019/0071260 A1* 3/2019 Laverdiere ........... B65G 47/842
(Continued)

OTHER PUBLICATIONS

F. Wang and K. Hauser, "Dense Robotic Packing of Irregular and Novel 3D Objects," in IEEE Transactions on Robotics, vol. 38, No. 2, pp. 1160-1173, Apr. 2022, doi: 10.1109/TRO.2021.3097261. (Year: 2022).*

*Primary Examiner* — Dione N. Simpson
(74) *Attorney, Agent, or Firm* — Kim IP Law Group LLC

(57) ABSTRACT

Provided herein is a system for implementing a series of optimized picking and placing operations in a manner so as to minimize void space when packing a conveyance with parcels. The system may include one or more of an automated intelligent translation platform or motorized intelligent base member, an extendable and retractable injection platform, an automated positioning element that may be moveably coupled to the translation platform, base member, or injection platform, and an automated gripping instrument. One or more of the translation platform, intelligent base, and injection platform for moving the positioning element proximate a parcel to be picked and placed, and the gripper instrument for picking up the parcel for placement, in accordance with a generated placement model that minimized void space. A system server for generating the placement model may also be included.

20 Claims, 26 Drawing Sheets

(58) Field of Classification Search
USPC .......................................................... 700/213
See application file for complete search history.

(56)  References Cited

U.S. PATENT DOCUMENTS

| | | | |
|---|---|---|---|
| 2021/0001489 A1 * | 1/2021 | Peterson | ................ G06Q 10/08 |
| 2021/0395023 A1 | 12/2021 | Patil et al. | |
| 2022/0177231 A1 | 6/2022 | Kopecko | |
| 2023/0062676 A1 | 3/2023 | Patil et al. | |
| 2023/0331411 A1 * | 10/2023 | Menon | .................... B65B 57/14 |
| 2024/0157561 A1 | 5/2024 | D'Amelio | |

* cited by examiner

SYSTEMS, DEVICES, AND METHODS FOR PERFORMING OPTIMIZED PICKING AND PLACING OPERATIONS IN A MANNER TO MINIMIZE VOID SPACE

CROSS-REFERENCE TO RELATED APPLICATIONS

This application claims priority to and the benefit of U.S. Provisional Patent Application No. 63/395,279, titled "SYSTEMS, DEVICES, AND METHODS FOR PERFORMING OPTIMIZED PICKING AND PLACING OPERATIONS IN A MANNER TO MINIMIZE VOID SPACE," filed on Aug. 4, 2022, as well as U.S. Provisional Patent Application No. 63/416,452, titled "SYSTEMS, DEVICES, AND METHODS FOR PERFORMING OPTIMIZED PICKING AND PLACING OPERATIONS IN A MANNER TO MINIMIZE VOID SPACE," filed on Oct. 14, 2022 the disclosures of which are incorporated herein by reference in its entirety for all purposes.

FIELD OF THE DISCLOSURE

The technologies presented herein are directed to implementing advanced analytics for optimizing picking and placing operation.

BACKGROUND

This document presents devices, systems, and their methods of use for performing picking and placing operations in a manner that efficiently picks and packs miscellaneously shaped parcels within a bin where, because of the advanced analytics employed, such as in solving an on- or offline bin packing problem, void space is minimized. In essence, there is a balance between the desire to optimally pick and place parcels, such as for transport, e.g., within a trailer truck for transport, and the desire to transport a variety of miscellaneously shaped objects. Particularly, the more the parcels to be placed vary in shape and size, the more difficult it will be to place those parcels efficiently. This is fundamentally a logistics problem.

More particularly, moving objects from Place A to Place B, in theory, is a simple, but necessary task. For instance, military and commercial retailers, like WALMART®, AMAZON®, and TARGET®, as well as shippers, such as USPS® FedEx®, UPS®, DHL®, and the like, are often faced with the need for moving objects, such as food, commercial products, and military equipment, from a central warehousing facility, where they are being stored, to a location where the objects to be transported may ultimately be utilized. However, before transport, a transport conveyance must be loaded with the objects, e.g., parcels, and the like, to be delivered, and it is this loading procedure that often serves as a bottleneck in the overall supply chain and logistics process.

For example, a large majority of commercial enterprises involve the sale of a variety of goods that are stored in a large number of regionally positioned, centrally located warehousing facilities, where each facility is strategically utilized to serve a large area around the warehouse. In order to serve these areas, these warehouses store a large variety of differently shaped products, which products may be packed for transport within boxes of different sizes and configurations, and will need to be packed within a container, such as a truck trailer, shipping container, or train car, for transport from the warehouse to the local consumer.

However, because the items themselves and/or the boxes that may contain them can be of different sizes and configurations, the efficient packing of containers is very difficult and often results in a large portion of void space, which can result in containers being sparsely packed, such as including up to 50%, 60%, or even 70% or more of void space. This inefficiency is costly to both the producers and consumers as well as for the environment.

Likewise, when the military is deployed, troops are sent across the world for the purpose of achieving a militarily determined objective. However, once deployed, members of the military need to be supplied with food, clothing, equipment, materials, and the like, which are necessary for performing the activities that lead to successful completion of the determined objective. In these regards, supplying consumers with the goods they purchase, as well as supplying deployed military troops with the items they need, a supply chain is set up, whereby supplies stored in a centralized warehouse need to be moved to all the places where the troops or consumers have been deployed or are located can receive and utilize them.

As referenced, moving objects from Place A to Place B, nevertheless, is difficult because of a number of bottlenecks in such supply chains. A typical supply chain includes procurement, warehousing, transporting, and distribution. Logistics is the manner by which the various elements of the supply chain are implemented. In various instances, success in daily life as well as success in achieving a given military objective can depend largely on successfully implementing the various logistical steps necessary for accurately accomplishing the requirements inherent to each individual step of effectuating the supply chain. Additionally, the speed by which the logistics required for accomplishing the requirements of each particular step of a supply chain can also be determinant of success or failure.

Consequently, a logistical bottleneck in a supply chain can cause a disruption that prevents an objective to be successfully achieved, such as a reduction of emissions or carbon footprint, which can be disastrous to the environment, and when that objective is a military objective, a failure to meet an objective can be a life and death matter. One of the largest challenges, therefore, e.g., on the commercial side or for military logistics, is overcoming the supply chain bottlenecks in the global shipping of objects, which creates uncertainty as to whether those who need goods will be supplied those goods by the time they need them. Further, these bottlenecks can be especially disruptive and economically costly on the commercial side, Particularly, the volume for the entire global parcel shipping market exceeded 131 Billion in 2020, up 27% from 2019. In fact, it is reported that 4,160 parcels were shipped every second in 2020, with the volume expected to reach 266 billion by 2026. Specifically, from 2019-2021, the per capita number of parcel shipments increased from 10 parcels per person to 27 parcels per person. This trend was greatly accelerated by the COVID-19 health crisis. All ages of the population increased their online spending in 2020, with those under the age of 55 increasing their online spending by more than 50% with 23% of consumers in the U.S. increasing their online spending for products they would normally have bought in local retailers.

The only difference logistically between the military and the commercial supply chains is simply an orders-of-magnitude increase of volume of goods being shipped commercially, and who owns what part of the supply chain. In this regard, where the military will largely be responsible for each individual step of a supply chain, commercially, each step will largely be independently owned and operated, which makes shipping and communication with respect thereto more time consuming and expensive on the commercial side. Hence, the logistical problems faced by maintaining a military supply chain, are very similar to those faced by maintaining a commercial supply chain. In these regards, one of the biggest logistical problems in supply chains of all natures is the picking of the objects positioned at Place A and the packing of such objects within a conveyance that can transport those objects to Place B. More specifically, the picking process is difficult because objects of various shapes and sizes need to be grasped in a secure manner, by a uniformly shaped and sized grasping element, if the picking process is to be automated.

Regardless of whether the logistics involved are being engaged in for commercial or logistical purposes, the picking and placing operations are typically the same in either instance. For instance, in either instance, parcels and/or other objects to be shipped from one place to another typically involves three stages: from warehouse to transport or on-boarding conveyance system, then from the conveyance system to the transportation system for distribution. And then, once the transportation reaches its destination, the parcels need to be removed from the transportation system to the off-boarding conveyance system, and then to the warehouse for storage, or directly to the delivery vans to be delivered to final end destination.

Not only are there problems inherent to the logistics of moving parcels from point A to point B, but there are further problems onboarding the parcels at point A, e.g., into a conveyance, e.g., transportation system, and then off-loading the parcels, from the conveyance, once they have arrived at point B. In many instances, both the on-boarding of parcels, e.g., at the warehouse of the factory or distribution center, and the off-boarding of parcels, e.g., at the warehouse of the retailer, etc., often requires human activity such as for picking up parcels from where they are stored in the factory or warehouse and placing them on a conveyor system, and further, human intervention is necessary for offloading the parcels from the conveyor system into the conveyance. Specifically, automation has largely only been provided for the conveyance process itself, requiring human handling for the loading of parcels onto the conveyance, and then again for unloading the parcels from the conveyance and into the transportation system, such as into a skid sled, trailer, or the like.

Likewise, once transported to its destination, parcels have to be offloaded on to the conveyor belt system, by human handling, and then also for unloading the parcels from the conveyor system and storing them within the warehouse. More particularly, human intervention is typically required, on the loading side, because parcels to be shipped are often of different sizes. More specifically, as more and more consumers turn to online shopping, the greater the variability of objects being shipped having a wide array of shapes and sizes. The non-uniform nature of parcels to be shipped makes typical automation instruments incapable of solving the complex problems of fitting different shape packages within a uniform shaped shipping container and/or trailer. This problem is made even more complex when the different volumes, weights, and masses of the parcels to be shipped need to be accounted for.

Some have proposed robotics for use in the picking and placing process. However, although robotic arms have been proposed to be used, they have been found to be inefficient and incapable of handling the problem of diverse parcel shapes, sizes, and weights inherent to bulk shipping, especially with regard to parcels that are atypically small, such as polybags, padded mailers, tubes, and other small packages that typically need to be sorted manually. With regard to atypical package sizes, each new parcel represents a completely new problem to be solved than the former parcel, not just because it is likely to have a different shape and/or size, but also because once one parcel is placed within a growing stack of parcels to be shipped, the placement of each subsequent parcel within the stack becomes more complex and more complicated. Although, robotics have been found to be useful for repeating the same action within the same context over and over again, they have not presently been found to be as useful for performing different tasks in different contexts where a solution needs to be found to an ever-changing problem substantially at real time. Additionally, human intervention is also required, on the unloading side, because parcels to be shipped are often of different types that need to be sorted in accordance with different categories.

Consequently, although automation is useful in the conveyance system, its usefulness is very limited due to the inherent difficulties for automated systems to deal with the computational complexities associated with picking, and then placing, and further stacking packages of different sizes as well as sorting packages according to type. This difficulty in automating the picking and placing process leads to substantial inefficiencies because it is both costly and labor intensive for a human to perform these tasks, and given the repetitive nature of the picking and placement process, human engagement in this activity is prone to errors in decision making due to loss of attention to detail. Nevertheless, presently, automation for the loading and unloading of the conveyor system has not been able to perform on a level superior to human involvement, despite the aforementioned inefficiencies and problems in the supply chain.

Further exacerbating these supply chain problems is the high employment rates currently being experienced throughout the world, such high employment rates make it difficult to find laborers for these types of repetitive, monotonous jobs, which when coupled with a high turnover rate, further increases the costs it takes to employ them. A further difficulty, occurs once the picked object is grasped, e.g., off of a conveyor belt or injection system, and transported into, or proximate, the conveyance, e.g., transportation vehicle, and which must now be placed within an opening positioned within a previously packed framework into which the presently picked object now needs to be placed. This part of the picking and placing problem is termed a "three-dimensional (3D) bin packing problem (BPP)," which problem is manifested by the fact that non-uniform parcels may each have a number of different shapes, having different sides, and are composed of different dimensions. This variability not only makes grasping objects, e.g., off of a conveyor belt, by a uniform grasping element challenging, but further makes placement of any new object in to a growing structure of previously placed objects within the conveyance to be packed more difficult.

Particularly, solving the online 3D-BPP is challenging in these regards, and usually involves a tradeoff between efficiencies and the time it takes for training models to be employed in configuring an artificial intelligence platform that can then be used to solve the BPP problem. A further tradeoff is between the speed by which the shipping conveyance is packed, and the efficiency of the packing. Specifically, as the speed increases, the efficiency decreases. And as indicated, this problem is made more difficult by having non-uniform parcel sizes that vary from one another, but yet need to be packed in a uniform manner. It is difficult to form a uniform stack of parcels within a conveyance when there are a number of parcels having a number of different sizes, shapes and/or dimensions. This problem is further complicated by having loose objects of irregular size that do not conform to any universalized standard, but nevertheless, still need to be packed.

More particularly, arranging parcels, e.g., boxes, into a transport conveyance, such as a truck trailer, delivery van, or other container, is one of the more complex packing problems concerning real-world logistics constraints. The consequences of miscalculation are appreciable, as misestimating the number of trailers, containers, and the like, which are required to transport a number of parcels can be very costly in terms of environmental waste, transportation costs, delay, and/or other problems associated with carrying extra containers that are underutilized. Outside of the natural difficulty in solving the 3-D Bin Packing Problem, several real-world constraints should be taken into account so as to realize the practical implementation of such a calculation.

For instance, each logistics shipper will likely have a large array of different box sizes that may be standard for them, but irregular with respect to others. The dimensions of each box size from each shipper needs to be taken into account, when determining how to construct a stack of parcels, and how to further continue building the stack once formed. Additionally, various other factors should also be determined and accounted for when further building the stack, such as weight distribution, staking build up, stack stability, and support considerations. Special consideration also needs to be given to packages that are fragile, cannot be stacked, contain hazardous materials, and/or needs to be packed in a certain orientation, such as "This Side Up" parcels. This information is also useful for determining the number of containers that will need to be employed when shipping a number of goods, and how to best pack the selected number of containers, regardless of the shapes and sizes of the individual parcels to be packed.

Further, each parcel may have specific limitations denoted on the box, which a picking and packing system should be configured to recognize. For instance, a picking and placing system should include devices that are configured for performing barcode scanning and/or computer visioning to identify hazardous or fragile materials that need to be shipped in a particular manner and orientation. However, these system components are expensive, and hard to integrate into an overall picking and packing system. Further complicating this problem, are carrier-specific limitations such as items that must be shipped together or next to each other in addition to unloading containers at more than one location. Accordingly, it is very difficult and labor-intensive packing disparate, abnormally sized, and loose objects into shipping containers. The result of this is that every year considerable resources are expended on packing small objects into different-sized parcels, which variable sized parcels are then loaded into a trailer for transportation of what amounts to mostly air. This disorganized, labor-intensive "loose loading" creates a vast amount of voids and gaps in each trailer that could be filled.

The result of not solving this 3D-Bin Packing Problem (3D-BPP) is that transport conveyances get shipped in a manner whereby not all the space therein is effectively utilized, thereby making the shipping process inefficient. This inefficiency is costly in transportation costs and time expenditure, as well as bad for the environment, as more shipping containers are needed to ship the same quantity of goods than would be necessary if the 3D-BPP had been solved with respect to a defined number of goods needing to be shipped. In particular, in particular instances, the 3D-BPP can be a sequential decision making problem. Typically, there are two versions of the problem: online and offline.

The online version comes into play when one doesn't know what is coming next. The offline version comes into play when the characteristics of all of the parcels that need to be packed are known and can be calculated, e.g., more easily than in the Offline version. Solving the online version is more difficult because the parcel dimensions and characteristics are not pre-known by the system, and can only be estimated as they come within the systems purview, making the processes herein disclosed complex and novel. Currently, this problem manifests itself in the reality that more than three-quarters of the trucks currently being used to transport goods are often less than 50% filled to their capacity. Specifically, space is being wasted, which wasted space causes increased transportation costs eventually being passed on to the consumer, and greater emissions and pollution being passed on to the environment.

For example, where the national acceptance that 50% capacity is considered "full" capacity, it is estimated that 3 B gallons of petrol and/or diesel fuel are wasted each year, and 8.3 metric tons of carbon emissions are generated. Specifically, the industry standard for long haul trucking considers truck trailers being 50% filled, e.g., having 50% void space, as having a "full" capacity, while truck trailers being 80% full, e.g., having 30% void space, are considered efficient. Solving the 3D-BPP, as disclosed herein below, will allow the packing of shipping conveyances more efficiently, allowing a wider variety of boxes, or other irregularly shaped containers, to be used by retailers and/or packaging companies to reduce void space. This will allow parcel suppliers to customize more boxes to better fit the goods to be shipped, and thereby, greater reduce void spaces in the containers to be used in shipping goods. Because of the nature of the online 3D-BPP, there has been very limited work done with regard to automating the process of loading shipping containers once items have been packed into boxes.

SUMMARY OF THE DISCLOSURE

What is needed therefore are devices, systems, and their methods of use for solving the online and/or offline 3D-BPP, and for further developing one or more algorithms by which an automated positioning element and grasper instrument, as well as the other various system components disclosed herein, can be instructed to implement one or more picking and packing models by which to effectively and efficiently pack a space, such as of a haul of a transport vessel. Particularly, what is needed, therefore, is an automated, intelligent system for imaging and/or identifying parcels as they come in to view, e.g., on a conveyor belt, imaging a stack of parcels as they are placed for shipment, such as in a skid-sled or trailer, determining the dimensions of each parcel as it translates on the conveyor belt, determining the dimensions of the placement possibilities, e.g., spaces, within the stack into which the parcel is to be placed, and determining, based on a comparison of the dimensions, e.g., of all possible placement spaces, the best fit for the parcels as they traverse on the conveyor belt. Likewise, what is also needed is an automated picking and placement system of instruments that are capable of acting autonomously as well as collectively together to effectuate the picking of parcels with a diversity of shapes and a greater range of variability than is currently possible. Specifically, current devices are typically designed to be able to grasp a small, defined number of standardized parcel shapes, sizes, and orientations, such as with regard to smaller objects, and thus, more medium and large sized objects are currently not capable of being picked and packed, such as via an automated loading system.

What would further be useful would be a system that is capable of performing an identifying and sorting function while at the same time as performing the picking and placing operations. It would further be useful to configure the system so as to be capable of autonomously scanning parcels, recognizing both packages that have been damaged and which have been mislabeled, as well as those parcels that have the wrong or missing address, or have been misclassified and/or sorted. Additionally, in various instances, the system may further be configured for inventorying the parcels. For instance, the system, e.g., including the imaging and analytics components thereof, may be used to identify, determine, and account for each parcel as it comes into contact with and moves throughout the system, such as whether it is being placed on a conveyor system, being retrieved off of a conveyor system and being placed in a conveyance, coming off the conveyance, or being loaded onto the shelves in a warehouse, e.g., at a distribution center or store itself. In a manner such as this, the system can keep track of a multiplicity of sets of inventory, throughout various stages of transportation, for example, as objects are offloaded from the conveyor belt, e.g., during the placement and packing process, or on the receiving end, during the unloading and/or storing process.

Provided herein, therefore, are picking and placing models so as to account for and track items against a list of items being placed onto and coming off of a conveyance, e.g., trailers and vans, so at each position an item is accounted for from trailer to shelf, from shelf back to delivery trailer or delivery van, etc. Particularly, what is provided is an autonomous system and apparatus for identifying, grasping, sorting, collecting, placing, and packing, e.g., stacking parcels for packing and shipment as well as unloading, storing, e.g., warehousing, and inventorying. Accordingly, provided herein is an autonomous picking and placing platform that is configured for picking and placing high volumes of irregularly shaped, small, and large packages, in challenging spaces, and with limited human intervention. The advancements set forth herein significantly reduce labor cost and inefficiencies, streamlines the identifying and sorting processes, and increases the efficiency of packing operations. More particularly, further provided are devices, systems, and their methods of use for implementing an efficient and effective picking and placing scheme, which when implemented will not only provide progress towards solving offline 3D-Bin Packing Problems (3D-BPP), but can also more effectively address and/or solve, the online 3D-BPP, thus, providing a more competitive environment within which to engage in logistics processes, such as in both retail, e-commerce sectors, and the like.

Presently, large and/or multi-national companies, including world-wide shipping conglomerates, have an immense advantage available to them through their vertical integration within the transportation and supply chain fields. Specifically, many large retailers, have become their own warehouser and shippers. However, given the economies of scale, small and medium-sized businesses simply cannot efficiently or effectively compete with such large companies. The present technologies will thereby increase competition by allowing smaller organizations the ability to compete with such larger companies on a level heretofore unrealized. More specifically, while small businesses may not be able to compete in terms of vast scale of full autonomous robotics employed by large retailers and warehousers, the present devices, systems, and the methods disclosed herein will help to increase the efficiency of labor and reduce the costs of transportation for smaller organizations without the need for large capital expenditures. Consequently, present technologies will enable family-run businesses to compete, in terms of packing and shipping efficiencies, with much larger organizations and increase the competition within the free market In one aspect, therefore, the present disclosure is directed to devices, systems, and the methods of using the same for analyzing an environment in which parcels are to be picked, and further analyzing an environment into which the picked parcels are to be placed. Further, the various components within the environment that can be engaged and activated so as to effectuate a picking and placing operation may also be analyzed, such as with respect the movements the various components can make in performing a picking and placing operation. This data may also be analyzed and a picking and placement strategy, e.g., including one or more picking and placing models may then be generated. Consequently, also provided herein are the instruments that can be deployed so as to effectuate the various picking and placing operations necessitated by the generated picking and placing model.

Consequently, provided herein is a system for not only generating a picking and placing model, but also the instruments for effectuating the operations required to implement the picking and placing model. Accordingly, in one aspect, provided herein is a computing architecture for not only generating but also a series of automated instruments and apparatuses for implementing the generated picking and placing model, such as where the system includes a number of specialized sub-systems. Such automated subsystems may include an automation system, which in turn may include one or more of an analytics system, image capturing system, and sensor system, including a plurality of distance scanners, weight detectors, strain gauges, motion sensors, speed, direction, and orientation sensors and the like. The analytics system may include one or more of a system wide master control unit that may be associated with a server system having a plurality of processing units, such as one or more central processing units (CPU), graphics processing units (GPU), image processing units (IPU), quantum processing units, and the like. Each of the processing units may be in communication through an associated communications module with one or more component control units, e.g., CPUs, which in turn may be in communication with one or more component controllers and motors that are configured for precisely moving the various components of the system in accordance with operations that are defined in accordance with the generated picking and placing model.

Accordingly, in generating an appropriate picking and placing model, a virtual automated work environment may be created and the operations to take place therein may be presented for review and real time viewing during the implementation of an exemplary picking and placing model, e.g., in virtual space, and/or the actual implementation of that model by the real world components of the system live, at real time. Consequently, for implementing these tasks, the system may include one or more client computing devices, one or more memories forming a structured database, and a server system. For instance, one or more first and second client computing devices may be provided, such as where the client computing devices are configured as, or otherwise coupled with a display. In certain embodiments, the first and/or second client computing devices may be configured as a mobile computing device, such as a smart phone or intelligent visualizing and/or scanning device, through which computing device a computational and/or analytics module of the system may be accessed, and a real world or virtual representation of a work environment may be displayed for viewing. In various instances, the display may be configured for displaying a graphical user interface to a first individual using the client computing device, through which graphical user interface one or more aspects of the system may be visually represented, visualized, and/or otherwise viewed.

Further, the computing device may be configured for producing a graphical user interface (GUI), which in turn may be configured for generating an interactive dashboard for presentation via the display, such as where a representation of one or more models may be displayed, and an automation implementation thereof can be viewed. In some embodiments, a real-world implementation of the model, as effectuated in real life by the components of the system can be viewed. Likewise, the interactive dashboard may be configured for performing one or more operations pursuant to the method steps described herein below.

Particularly, in one embodiment, the GUI may be adapted for presenting a visual representation of a storage location where parcels are stored, or to be stored, a skid sled or conveyance and/or loading environment, such as where parcels being stored can be onboarded onto a conveyance and transported, such as to an off-boarding location, e.g., within a transportation vehicle. The off-boarding location, either within a transportation vehicle, or at the final destination of transport, e.g., at a loading dock or storehouse, may also be visually and/or virtually represented via the graphical user interface. The visual representation may be a real-life image of an environment, or may be an animated or otherwise computer-generated representation. The computing system, therefore, may include a variety of image capturing devices and sensors that may be positioned on or proximate various of the other components of the system so as to build a 3-D model of the various different environments in which the presently described processes and method steps occur. The system, and its components are configured for transmitting data back and forth between themselves and/or a remote, e.g., cloud based processing and analytics system. Consequently, the client computing device(s) may include a communications module for transmitting the patient data packet via an associated network connection to the server.

Accordingly, the system may include a server that is coupled to the client computing device(s), via a network interface, which server and/or client computing device may further be coupled, directly, e.g., via a wired interface connection, or via a network connection, e.g., a cloud based internet connection, and may additionally be communicably coupled to a database, such as a structured database. The structured database may be adapted so as to form one or more searchable libraries, where each library may include a set of data files pertaining to a variety of models of object, e.g., parcel, shapes, sizes, weights, masses, and dimensions, as well as space shapes, sizes, and opening dimensions. These models may be developed iteratively over time based on prior instances wherein picking and placing operations were carried out.

In various instances, the server system may be configured for generating a work flow manager and/or project builder, where the project builder may be adapted for generating a working model of an environment, e.g., one or more spaces within the environment, objects placed within spaces within the environment, and/or objects to be placed within space openings within the environment. The workflow manager may be configured for generating a number of tasks to be performed by one or more components of the system within a given time period, so as to build one or more picking and placing operations. In particular embodiments, the server, e.g., in combination with a system analytics system, generates one or more models, and may generate the graphical user interface presented at the display of the client computing device, e.g., via the network connection for local display thereby, where the model, e.g., a computer animated version of the model, may be displayed. Particularly, the server system may be configured for performing one or more of the operations described herein, which can then be displayed for user review and/or authorization, e.g., at the client computing device.

Consequently, the picking and placing system may be configured for collecting data, such as via a number of imaging devices and sensors, such as distance and monition scanners, and the server system may be configured for receiving image and sensory data, e.g., of the various different environments, in which the various components of the system operate. Likewise, the server may be configured to further receive image and sensory data regarding the objects to be picked and placed, as well as the attendant data pertaining to their movements within the one or more environments. Further, the server may receive component position and movement data, e.g., real time, as each component moves and interacts within the environment. This data may be known and entered into the system, e.g., by a user or other system components, such as where parcel size, dimensions, weight, addresses are known and entered into the system, or this data may be inferred from an analysis of visual representation.

Upon receipt, this data may be parsed, classified, categorized, processed, tagged, analyzed, and stored, such as in a relational data structure for further processing. For instance, as discussed in greater detail herein below, this data may be accessed by an artificial intelligence module of the system which can then use this data to perform an on- or off-line bin packing problem analysis, from which analysis one or more models may be generated and tested, and one or more final picking and placing models may be generated. Once generated, the various components of the system may then be moved, e.g., autonomously and in concert, so as implement the various operations defined by the picking and placing model, such as in accordance with instructions generated by a suitably configured and/or trained work flow manager of the system.

Once a series of picking and placement operations, e.g., model, has been defined, and/or a workflow operation created, the server may then employ the workflow model to generate and provide instructions to the other components of the system for implementation thereby so as to effectuate one or more picking and placing operations. These operations should be generated and implemented in a manner so as to avoid conflicts in moving, picking, and placing. But, if a conflict is determined or arises, an alarm may be indicated, and the system may then resolve the conflict, real time, or pause the process until the conflict is resolved. Likewise, as the various processes of the system are being implemented, the server may determine, based on the results of a continuous stream of data being received, inputted, and analyzed, how the process is flowing. Updates may then be generated and communicated, and a series of likelihoods that one or more of the proposed processes will continue to advance or hinder achievement of the determined outcomes may be made. If it is determined that an adjustment to one or more of the components parts of the system can be reconfigured to assure a more efficient and/or beneficial process in achievement of the desired outcome, such as based on a likelihood determination, a system reconfiguration and/or adjustment may be made, e.g., automatically and/or autonomously, to implement the more efficient processes.

In view of the above, in one aspect, provided herein is a system of automated picking and placing components that are capable of functioning autonomously as well as collectively together to implement one or more operations of a picking and placing model. For instance, in various embodiments, provided herein is an automated workplace environment that may include one or more of an intelligent conveyor system, smart translating platform, e.g., gantry, as well as an autonomously controlled loading system, all of which can be employed so as to automate various of the tasks involved in loading a container or conveyance prior to shipment, as well as unloading the same subsequent to shipment. An automated bridging and skid sled system may also be provided.

Accordingly, in one aspect, provided herein is an automated conveyor system. The conveyor system may have a plurality of different configurations. For example, the conveyor system may include an automated conveyor portion that may be configured as one or more segments, one or more of which may include a moveable conveyor belt. In such instances, the conveyor belt segments may lead from a storage location, e.g., within a warehouse, to a loading/or unloading location, such as proximate a conveyance into which parcels to be shipped may be loaded. In this embodiment, objects, e.g., parcels, to be shipped may be loaded on to a distal portion of the conveyor belt, and via the movement of the conveyor belt, parcels positioned on the proximal end of the conveyor belt may be translated to the distal end.

As indicated, the conveyor system may be automated, and thus may be intelligent. In this regard, the conveyor system may include a conveyor system master control unit, which control unit may be configured for collecting data, such as related to the characteristics of objects, e.g. parcels, being translated on the conveyor belt, such as with regard to its weight, placement, orientation, and movement, e.g., speed along the conveyor belt, as well as its positioning relative to other parcels placed on the conveyor belt. In particular embodiments, the conveyor portion may include sensors for determining the weight or mass of the object placed on the conveyor belt. Additionally, the conveyor system may include a plurality of image capturing devices and distance scanners so as to account for every object being translated through the conveyor system. All of this data may be communicated, via a suitably configured communications module, from the conveyor system to the system analytics platform.

Likewise, once received by the analytics system, the system may analyze the data and then communicate instructions back to the master control unit of the conveyor system. Consequently, once received by the control unit of the conveyor system, the instructions can be parsed, and directions may then be communicated from the control unit to various of the controllers and/or motors of the conveyor system so as to speed up or slow down the movement of the conveyor belt, in accordance with the received instructions. Likewise, where the conveyor belt portion includes motorized wheels, movement of the actual conveyor belt platform can also be effectuated.

Further, at the distal end of the conveyor belt platform may be an autonomously controlled intelligent bridging system, which can be configured as a framework architecture surrounding a distal portion of the conveyor belt system. In its simplest form the bridging system may form a framework that is configured to allow one or more positioning elements, e.g., robotic arms, to translate across its support members in all three axes so as to pick up parcels as the reach the end of the conveyor belt. In particular embodiments, the bridging system may be employed in combination with an automated skid sled, such as where the bridge is able to move, e.g., autonomously, so as to position itself relative to the conveyor belt system so that one or more associated positioning elements, e.g., robotic arms, may be in a position for contacting and grasping parcels being conveyed on a conveyor belt, and once grasped, the arm(s) may then move along the supports, e.g., rails, of the bridging element along with the grasped parcel until they are proximate a skid sled, where the robotic arm may deposit the grasped parcel for packing.

In particular embodiments, the bridging system may be structured so that the support rail system is wide and long enough so as to encompass both the conveyor belt system and the intelligent skid sled so that the associated positioning element(s) can be translated back and forth between the conveyor belt portion to the skid sled picking up parcels from the conveyor belt portion and depositing the parcels into the skid sled. However, where useful, both of the bridging system and the skid sled may be intelligent and may be configured for automated movement. Thus, when necessary the bridging system may be moved relative to the conveyor system and/or skid sled, which skid sled may also be moved relative to the bridging system and/or conveyor system, so as to maximize the efficiency by which parcels may be placed. Accordingly, to effectuate such movements both the bridging system and the skid sled may include or otherwise be associated with a dedicated sub-system master control unit, which control unit may be configured for receiving instructions, e.g., from an analytics system of the global system, which once received may implement the instructions by directing one or more associated controllers and/or motors to direct the movement of the bridging and skid sled system, such as to expedite the implementation of the pick and placing model.

Accordingly, for the implementation of a picking and placing model, provided herein in one aspect is an autonomously controlled loading system, which may include one or more of a positioning element and gripper instrument. In various embodiments, the positioning element may be any element that is configured for positioning a suitably configured gripping instrument approximate an object, e.g., parcel, to be picked in a manner so that the gripping instrument may effectively grasp the parcel. For instance, in particular embodiments, a positioning element may be provided, wherein the positioning element is configured as a robotic arm. Particularly, the intelligent robotic arm may include a plurality of arm segments, such as where each arm segment may be coupled to one another via moveable joint elements. In particular embodiments, the joint member may be configured for allowing the movement of one arm segment relative to another, such as in a bending or pivoting motion along an arc in one or more of an X, Y, and a Z plane, as well as a rotational movement around one or more of an X, Y, and Z axis. Accordingly, for effectuating these movements, one or more of the joint elements may be coupled with a motor and associated controller.

As indicated, the positioning element may be intelligent, and thus, may be associated with a positioning element master control unit, which may be in communication with the master analytics system by which it may receive instructions as to how the positioning element should be moved. Particularly, in response to the received instructions, the master control unit may generate and communicate directions to the controllers of the motors of the arm segments that are to be precisely moved in accordance with the instructions, such as the instructions embodied by a picking and placing model. In this manner, one or more robotic arms may be precisely controlled and moved so as to position an associated gripping instrument proximate a parcel to be grasped, such as for placement within a skid sled or haul of a conveyance.

In these regards, in another aspect, provided herein is an intelligent gripper instrument, which gripper instrument may be any element that is capable of being positioned, such as by a suitably configured positioning element, proximate an object, e.g., a parcel, to be grasped and configured for coming into contact with and grasping the parcel so as to pick and ultimately place the parcel, such as in a conveyance for shipping. In particular embodiments, the gripper instrument may be composed of a number of arms, such as two arms positioned in a crosswise manner relative to one another so as to form a cross or "X" configuration. The end of each arm may include a gripping interface, such as in the form of a moveable flipper unit, which flipper unit is configured for being extend and contracted, and collapsed when in contact with an object to be grasped, such that the surface area of the cushioning material expands over the grasped surface of the object.

To effectuate this contact, a vacuum force may be applied through the positioning element and/or gripper instrument and through the gripping interface so as to form a tight seal between the cushioning element of the flipper and the grasped object. In this manner, the collective grasping interface of the gripping instrument may be expanded or contracted based on the size and the shape of the object to be grasped such that a tight seal may be formed between one or more surfaces of the object and the grasping interfaces of the gripper instrument. Once the object is grasped, an associated positioning element may be engaged to move the object to a determined location wherein the object may then be repositioned by the positioning element and placed via the gripper. As indicated, the gripper unit may be intelligent and thus may include or otherwise be in association with a gripper instrument master control unit as well as one or more controllers and/or associated motors. However, in particular embodiments, movement of the flipper units may be effectuated through a pneumatic, e.g., vacuum and/or compressor, system.

In another aspect, instead of, or in conjunction with, a conveyor belt system, a separate injection forking system may be provided. For example, in various embodiments, provided herein is an intelligent injection platform that is capable of receiving an object, such as while in a retracted configuration, but then may be extended. Particularly, the injection platform may include a number of segments that are configured for being translated one over (or under) the over so as to extend. The injection platform may include any number of segments, which segments can be moveably coupled together and may be associated with a controller and/or motor to effectuate the extending and contracting of the segments. In such an instance, a distal segment of the injection fork may be positioned proximally, e.g., as a top member of a stack of segments, and the injection fork may be positioned proximate one or more parcels to be picked and placed. In this regard, the injection forking apparatus, e.g., the distal segment thereof, may be associated with a positioning element and gripper instrument whereby the positioning element may position the gripper proximate a parcel to be grasped, and one grasped by the gripper the segments of the injection fork may be extended, such as into the haul of a conveyance, whereby the associated positioning element and gripper can then place the parcel in the haul for shipping. In particular embodiments, the injection platform may be intelligent, and thus may include or otherwise be associated with a injection sub-system master control unit that is configured for receiving instrutions, such as from an analytics system, and in response thereto effectuating the extending and retracting of the injection segments, such as by communicating with one or more controllers and/or motors associated with one or more of the segments In view of the preceding, in a further aspect, presented herein is an autonomous translating platform that may be configured for associating with the intelligent injection platform, such as to provide support the injection segments as they are extended and/or retracted. In such an instance, the translating platform may be mobile, and may be configured in such a way that as it moves the segments of the injection fork are extended or retracted, and in such an instance, each segment may or may not be associated with an individual controller and/or motor. Particularly, in particular embodiments, the translating platform may be configured as a mobile gantry having a mobilized base member that may be associated with an extended support frame such as for supporting various segments of the injection platform, as well as one or more automated positioning elements and gripping instruments.

In such instances, a base member including the segments of the injection fork in a retracted configuration may be positioned where parcels are to be grasped, such as proximate a conveyor belt, and one or more positioning elements and gripper units associated with the gantry may grasp parcels as they become available for pick up. The parcels may then be placed on the distal segment of the stacked injection platform, and the motorized gantry may then move away from the base member and into the haul of a conveyance where the parcels are to be placed for shipment. However, as the gantry moves away from the injection base, the injection segments are extended, and once positioned where the parcels are to be placed within the haul, the positioning elements may then move the grippers to grasp the parcels off of the injection segment and to place them in an appropriate available space with in the haul of the conveyance in accordance with a picking and placement model. Accordingly, in this regard, the mobile translating platform may be intelligent, and thus, may include or otherwise be associated with a gantry subsystem master control unit that may be configured for receiving instructions related to one or more picking and placement models and in response thereto directing controllers associated with motors that are responsible for directing the movements of the gantry so as to effectuate the operations dictated by the generated picking and placing model.

Accordingly, as described above, provided herein is a system for automating a picking and placing environment whereby the process of picking up parcels being stored within a warehouse and their subsequent placement in a conveyance so as to be shipped may all be performed autonomously and without substantial human intervention. Central to this process therefore, is a sub process, as described above, for capturing images of and adequately representing the environment within which the above described components are to move and operate. Therefore, to effectively model the environment a plurality of data with respect thereto needs to be captured, such as by one or more data collection devices of the system.

Consequently, in an additional aspect, provided herein, either alone and/or in combination with the other components of the system, are a set of data collecting apparatuses that are spread throughout the environment but in communication with one another and a server system of the global system whereby data captured by these various devices can be transmitted, aggregated, analyzed, and an adequate representation of the environment and the components therein can be generated. Further, from within this environment a number of picking and placing models may be generated and tested, either on or offline, and selected models may be chosen for implementation, instructions for the implementation of said models may be devised and transmitted to the various control units of the components thereof, and their respective movements can be coordinated and controlled so as to efficiently implement the various different operation tasks so as to effectuate the one or more models.

Accordingly, with respect to the above, various of the movements of the particular components of the picking and placing system may depend, at least in part, on the capturing of images, e.g., streaming video, the determining of distances between objects identified within the images, and the computer generated analysis of the captured images, e.g., vision, and determined distances, which may be employed by the system in determining what components of the system needs to move where and when, as well as what actions they will take once appropriately positioned. Consequently, a useful part of the system is the imaging, sensing, and analysis sub-systems, which may be composed of one or more, e.g., a plurality of image capturing devices, e.g., cameras, sensors, and analytics modules. In various embodiments, the image capturing devices and sensor modules of the system may each be associated with a local processing device, such as a controller, so that each of the cameras and sensors may be in constant communication with one another. Likewise, every component of the system may be associated with an image capturing device, sensor module, e.g., distance scanner, and/or associated controllers and/or motors.

Thus, collectively, they may be configured to maintain a field of view that is dynamically adaptable so as to continually maintain each object and/or component traversing through the environment within the field of view of the cameras, e.g., in the center thereof. This is particularly useful for keeping the focus of view on parcels to be picked and placed as they traverse along the picking and placing environment, e.g., along a conveyor system thereof. In a manner such as this, parcels may be tracked as they move throughout the system, and their characteristics may be identified. Particularly, the shape, size, orientation, and movement characteristics, e.g., speed, distance, acceleration, etc., of the parcels as they move throughout the system may be determined by analyses being performed on the captured, e.g., streamed, images and sensor data, by the analytics module of the system. Specifically, the captured images and sensor data may be transmitted, e.g., real-time, to the analytics module, data pertaining to object and component size, shape, and movement may then be determined by analyzing the captured images.

Such sensor data is useful for efficiently and effectively defining what operations may need to be performed, at what time, and by which component. For example, one or more of the conveyor or injection portions, as described above, may include a scale, strain gauge, and/or other weight determining devices for determining the weight of each parcel as it traverses across the system, orientation and motion data may also be collected, and this data may also be communicated such as to the analytics module so as to be considered along with the image data. Collectively these data may be used by the system to determine the coordinates of each of the bounding surfaces defining the parcels, and with this data the system can analyze the movement data and thereby determine by what direction, speed, and orientation the positioning element and gripper should be in for grasping and moving the parcel away from the conveyor system. Directions for moving any associated intelligent gantry, bridging system, and/or skid sled can also be generated and communicated to respective control units of these devices as well, so as to more efficiently implement a picking and placing operation.

To effectuate these movements of the positioning element(s), gripper devices, and associated gantry and/or bridging structure, the analytics system may generate instructions directing various of the controllers of the positioning element, gripper, gantry, bridge, to effectuate actuation of associated motors to move the respective components, e.g., positioning element and gripper, into the appropriate positions and orientations so as to be able to grasp, lift, and move parcels away from the conveyor system and towards a storage location, e.g., inside the haul of a shipping vessel. In various instances, the gripping instrument may include a number of arms and/or fingers, and the movements of the arms and/or fingers of the gripper unit may be implemented by one or more controllers, actuated motors, and/or by using pneumatics, so as to grasp objects, in accordance with a picking and placing model.

Accordingly, one or more server systems, including an analytics system having one or more analytics modules may also be provided, such as where the serve system may include one or more servers, such as a rack of servers. In various embodiments, a server of the system may be configured for receiving the collected data, parsing, aggregating, and/or classifying various of the identified data points therein, e.g., such as in regards to the various characteristics of the objects to be picked as well as the components employed in picking and placing those objects. This data may be considered such as in a process of generating an optimal picking and placing model, including a plurality of picking and placing operations to be effectuated by one or more of the components of the system.

As indicated above, in various embodiments, the server system may include one or more, e.g., a plurality, of processing engines. For instance, the server system may include a first processing engine, such as for receiving the various data collected by the various data collecting instruments of the system, such as where the data includes the characteristics defining the various objects within the work environment. This data may be received, parsed, one or more data points defined, and may then be transmitted to a database, e.g., a structured database, of the system for storage. Accordingly, a second processing engine may be provided for retrieving various of the data from the structured database.

For example, object characterization data may be collected and characterized, and object dimension data may be determined along with its various movement data. Likewise, the various picking and placing component characteristics and movement data may be collected, so as to define the various components of the system in relation to the objects to be picked and placed, As discussed, these data may then be used as one or more data points by which a third processing engine may compare the data and propose one or ore movement regimes by which the various picking and placing instruments of the system can be moved so as to engage and pick up an object, such as a parcel, moving within the system, such as on a conveyor belt portion.

Likewise, a fourth processing engine may further be configured for determining the likelihood that one or more of the generated picking and placement operations, e.g., movements, proposed to be taken, will result in the efficient picking up of an object, and once picked up, further analysis may be performed, such as by an additional processing engine, where by all the viable spaces within which the object may be placed may be analyzed, and one or more proposed placement operations may be defined. Consequently, an additional processing engine may then be employed so as to compare the various different picking and placing operations, they may be tested and weighted, and a picking and placing regime may be generated, such as by a further processing engine. Hence, form these analyses a picking and placing processes including a plurality of discrete operations may be defined, one or more models by which the picking and placing operation may be implement may be formed, and instructions embodying the model may be generated and communicated to respective components for carrying out the defined picking and placing operations.

Accordingly, as described in detail herein, all of the entered, or otherwise received, data, such as object and component characteristic and movement data, may be collected, parsed, individually identified, and thus, can be classified and stored within a database, e.g., structured library, in accordance with one or more categories thereof. In particular instances, these individually identified data points may be employed by the system so as to generate a knowledge graph data structure whereby various relationships between data points may be defined and weighted, such as with regard to the movements of an object to be picked in correspondence to the movements of an instrument used to pick up the object. These relationships and the weighting thereof may then be employed by the system so as to generate one or more inferences there from, and using these inferences, one or more initial predictions may be made as to the most efficient manner by which to pick and place objects. These predictions can then be tested so as to derive a predictive model that can then be used to train, such as by employing a machine learning module, an inference module of the system, which once trained can be used for better weighting the various relationships of the knowledge graph, better scoring individual factors thereof, and subsequently producing more accurate likelihood determinations, as discussed herein.

In another aspect, therefore, provided herein is a non-transitory computer readable medium for storing instructions that, when executed by one or more processors of a computing device of the system, e.g., a client computing device and/or a server, such as one or more processing engines of a server of the system, cause the one or more processors to perform the one or more processes and methods disclosed herein, such as with regard to solving an on- or off-line bin packing problem so as to generate one or more models for streamlining a series of picking and placing operations which may be implemented by the various components of the system so as to effectuate the one or more generated models for packing a haul of a vessel with parcels to be picked up. For instance, the methods herein described for generating and implementing an efficient picking and placing model may include one or more identifying and/or determining steps, which steps may be implemented by one or more processing engines of the server and/or associated computing devices. Particularly, the method may include identifying, such as by a processor of a computing device and/or server a system, one or more characteristics of an object to be picked up as well as the characteristics of one or more spaces into which that object can be fit, and then determining the most efficient model by which the various components of the system can be moved to pick up that object, determine the best fit space into which to place the object, and then determining the most efficient manner by which to place the object within the identified space.

The details of one or more embodiments are set forth in the accompanying figures and the description below. Other features and advantages will be apparent from the description and drawings, and from the claims.

DETAILED DESCRIPTION

Figure 1:
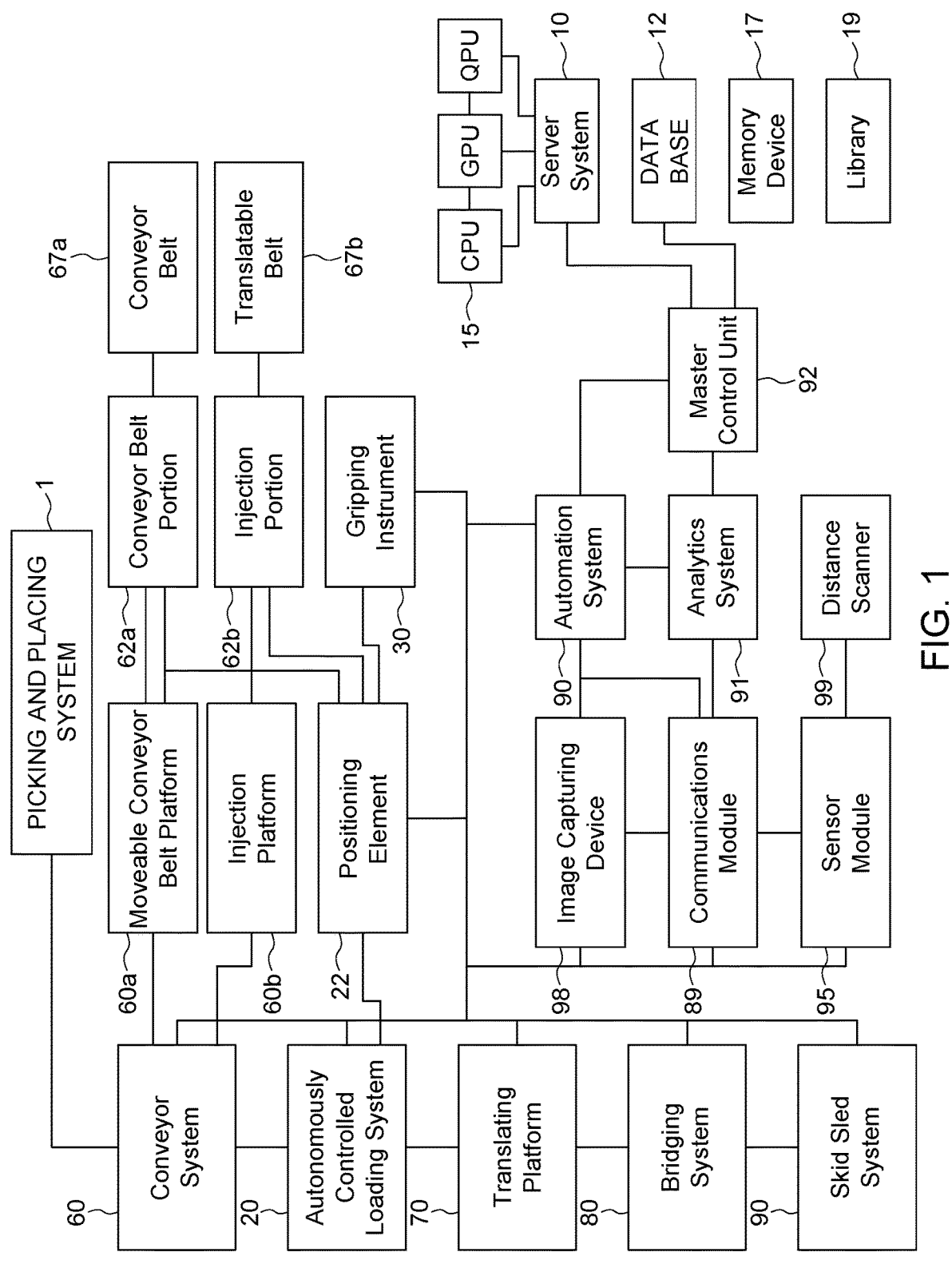
FIG. 1 presents a diagram of an exemplary system of the disclosure.

In one aspect, presented herein are both software and hardware products that are configured for generating and implementing an optimal picking and placing model in a manner to drastically reduce void space, while at the same time as increasing packing speed and efficiency. Accordingly, as can be seen with respect to FIG. 1, provided herein is an autonomous picking and placing system 1. In various embodiments, the overall autonomous picking and placing system 1 may include a number of different independent systems that are configured for working synergistically together, such as including one or more of a moveable and/or retractable conveyor systems 60, an autonomously controlled loading system 20, a translating platform 70, such as including an intelligent gantry framework, a bridging system 80, and a skid sled system 90.

Figure 2A:
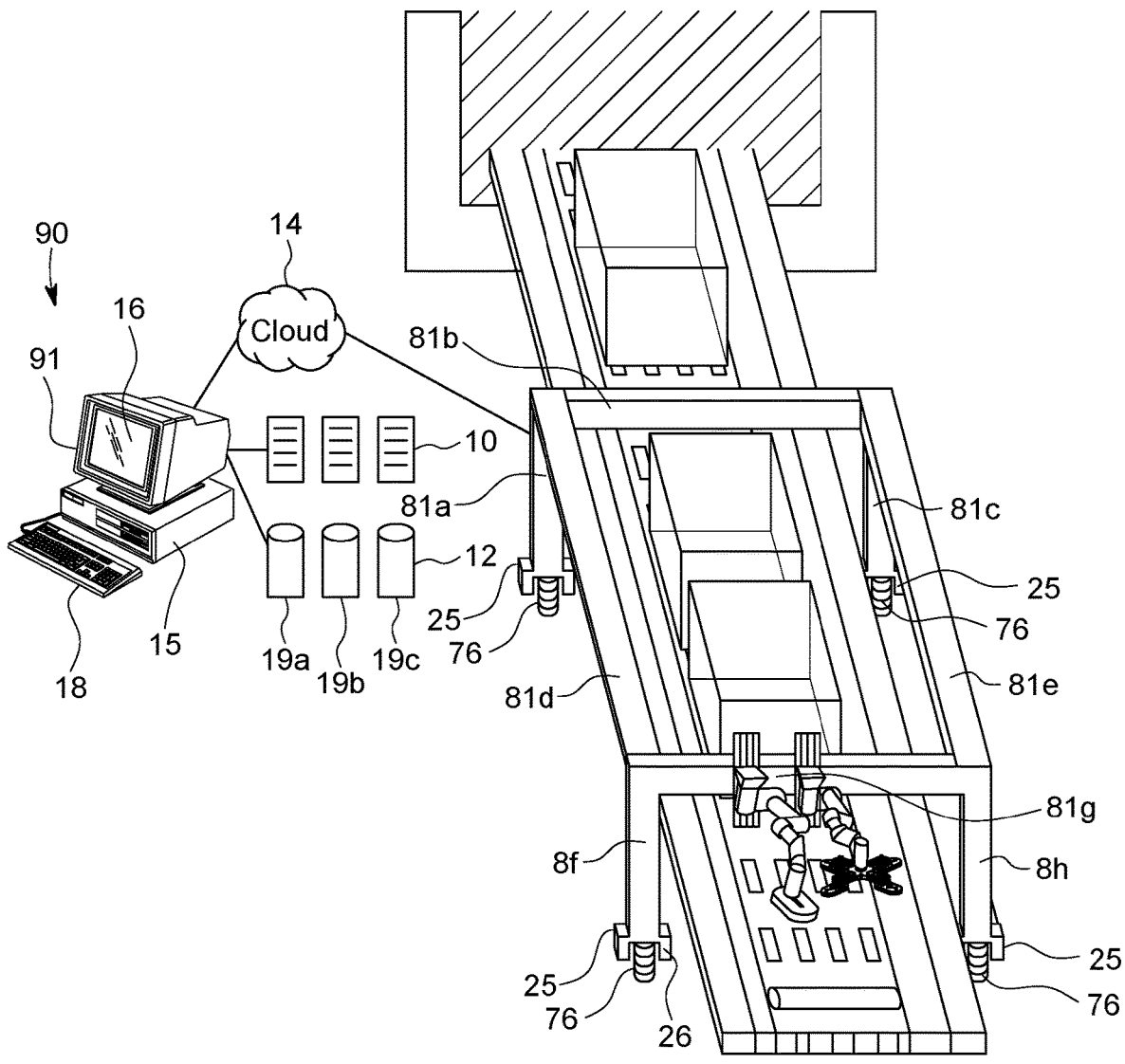
FIG. 2A presents a diagram of an exemplary conveyor and bridging system of the disclosure.
Figure 2B:
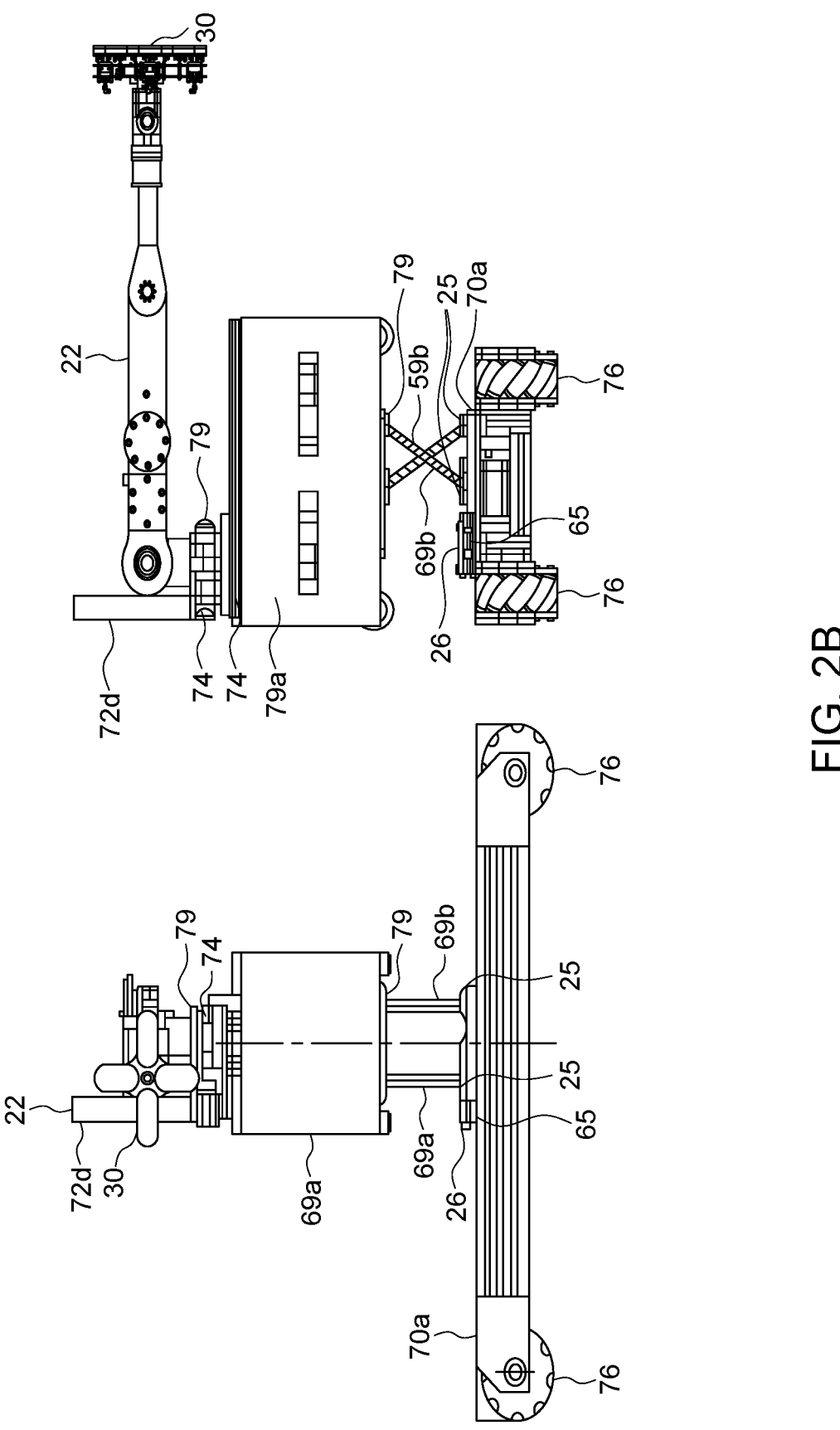
FIG. 2B presents a side and rotated view of an exemplary mobile injection platform of the disclosure, in its retracted configuration.
Figure 2C:
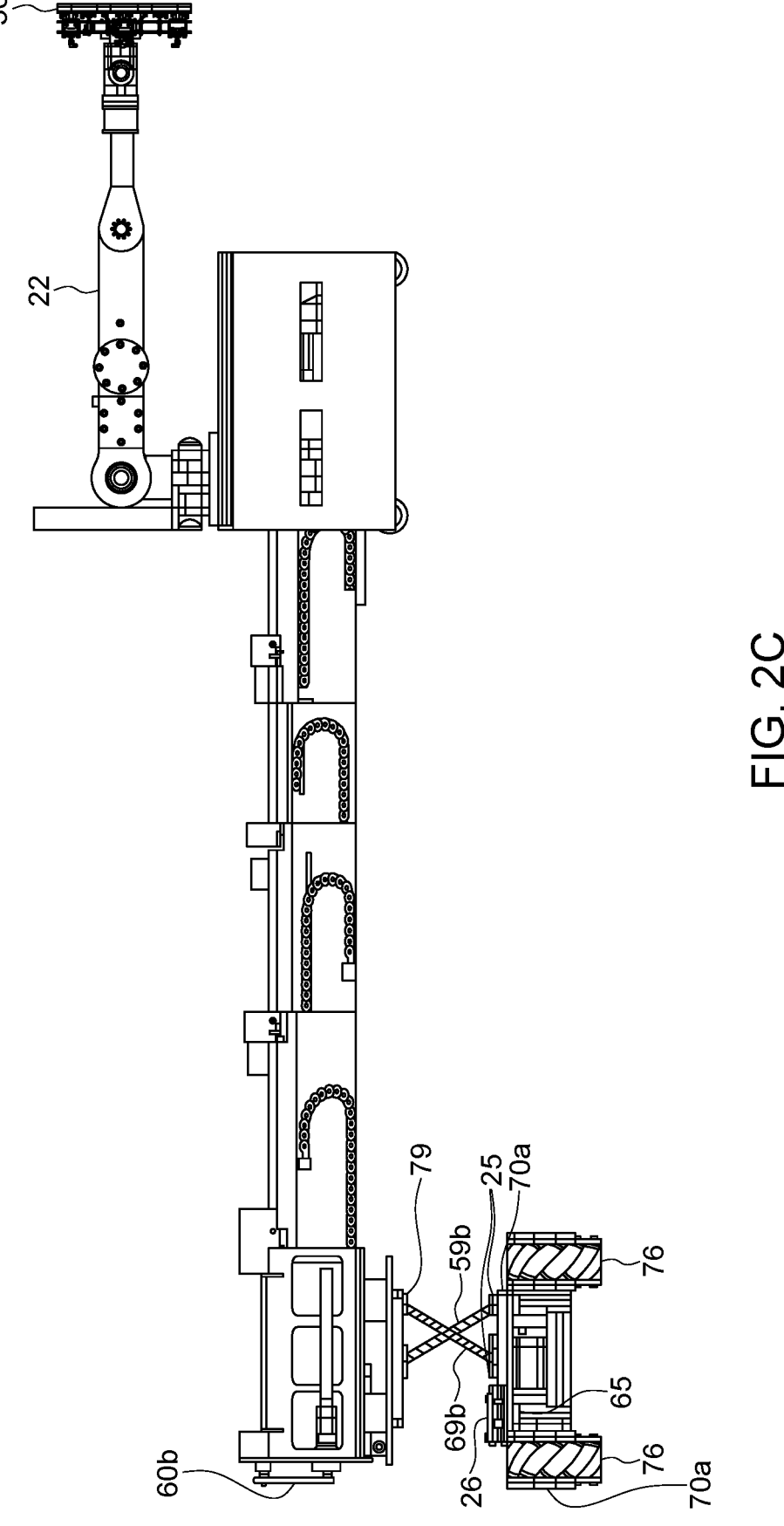
FIG. 2C presents a diagram of the exemplary mobile injection platform of FIG. 2B, in its extended configuration.

For instance, as can be seen with reference to FIGS. 2A-2C, the autonomous loading system 1 may include a conveyor system 60 that may be configured to include a moveable conveyor platform 60a, as can be seen with respect to FIG. 2A, and/or may include an extendable and retractable injection or forking platform 60b, as can be seen with respect to FIGS. 2B and 2C. For example, in one embodiment, as depicted in FIG. 2A, the conveyor system 60 may be configured as a moveable conveyor 60a having one or more conveyor belt portions 62a, where each conveyor belt portion has either an individual conveyor belt associated with it, or the collective of conveyor belt portions may have a single conveyor belt 67a associated with them such as where the single conveyor belt 67a spans across substantially all of the collective conveyer belt portion(s) 62a. Particularly, as depicted, a plurality of conveyor belt portions 62a may include a series of one or more belts 67a. The one or more conveyor belts 67a may be configured for moving over, or within, the conveyor portion 62a, where by the translation of the conveyor belts(s) 67a, parcels may be moved along each conveyor portion 62a so as to move the parcel from a storage location to a picking and placing location. However, as depicted in FIG. 2A, the conveyor system 60a may include a single, long conveyor belt portion 62a having a single conveyor belt 67a that is configured to extend the entire length of the long conveyor portion 62a.

In other instances, as depicted in FIGS. 2B and 2C, the conveyor system 60 may be configured as an injection platform 60b. The injection platform 60b may be configured for extending outward from and inward into itself so as to be both extendable and collapsible. Hence, as can be seen with respect to FIGS. 2C and 2D, the injection platform 60b may include a plurality of moveable injection portions 62b that are configured to move one with respect to the other, such as in a telescoping manner. Specifically, in particular embodiments, the injection portion 62b may include a plurality of translating segments or platforms 62c, 62d, 62e, 62f, 62g . . . 62n, where each successive platform portion is configured for being fit completely within the bounds of the previous platform portion, so as to be collapsed upon, or within, itself. In a manner such as this, the injection platform 60b may be configured for extending and retracting, and thus, may be configured as a movably extendable and retractable system 60b where parcels may be translated through the extension of one translatable injection portion in relation to another. In such instances, the translatable injection portions need not include a movable belt portion, but in certain instances, a translatable belt may be included.

Figure 2D:
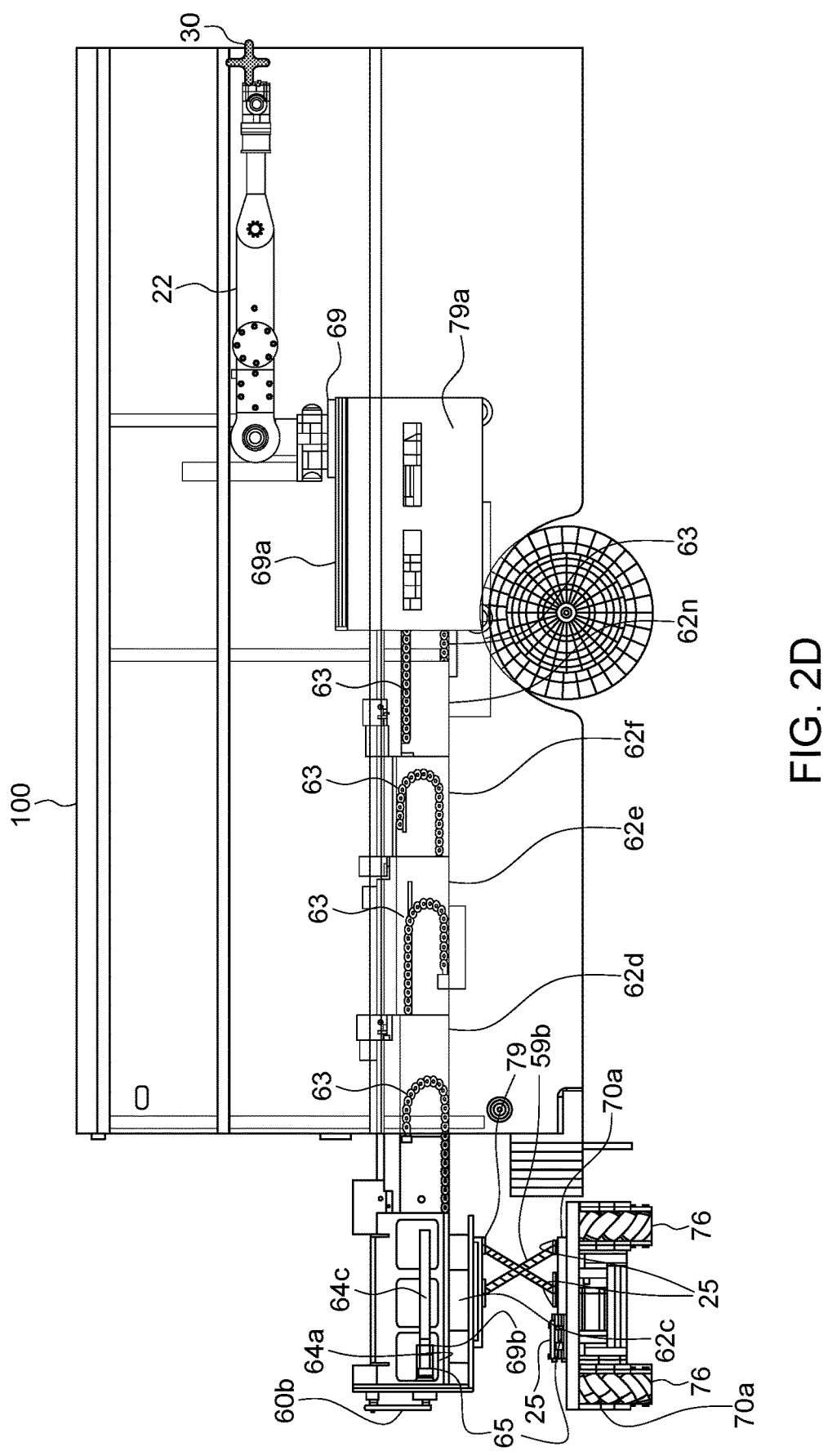
FIG. 2D presents a side view of an exemplary mobile injection platform of FIG. 2C, as it would be deployed in implementing a picking and placing operation.
Figure 2E:
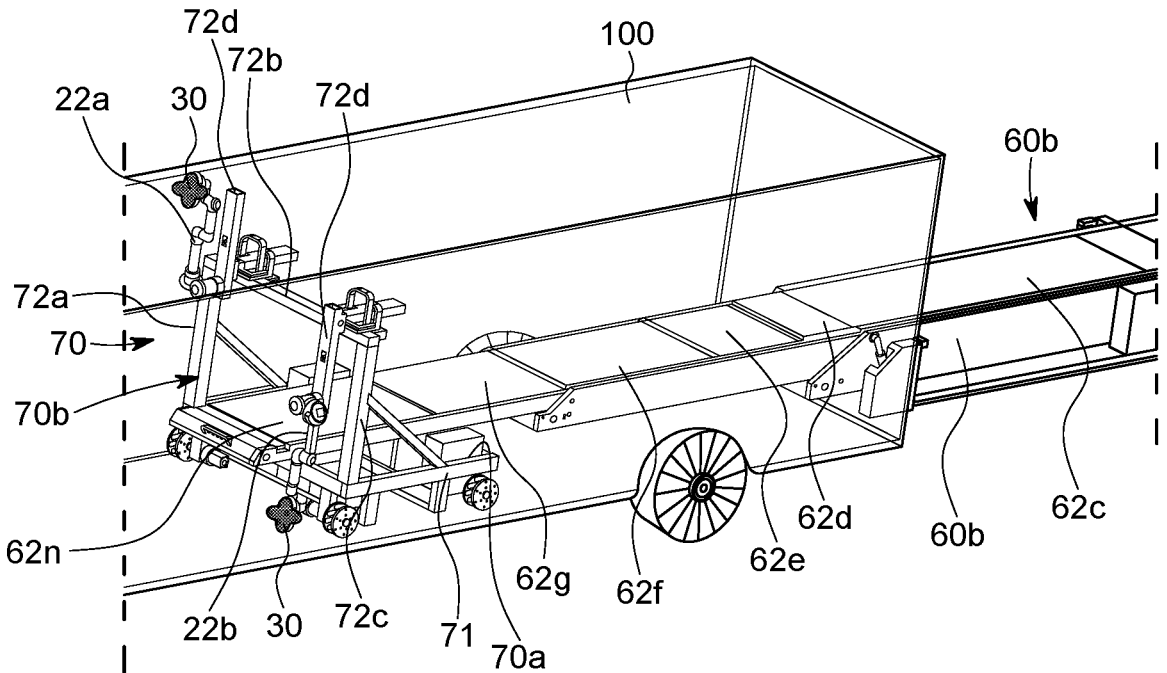
FIG. 2E presents a perspective view of an exemplary automated translating platform of the disclosure, as it would be deployed in implementing a picking and placing operation.

Accordingly, in various instances, as depicted in FIG. 2E the conveyor system 60 may be configured as a van, truck, trailer, or other container loader that may be configured as an injection platform 60b having multiple injection portions 62b, which can, but typically do not, include a belt portion 67b. For instance, the trailer loader injection platform 60b may include a plurality of telescoping injections portions, e.g., 62c, 62d, 62e, 62n whereby movement of parcels from a storage location to a conveyance location may be effectuated by extending the moveable injection portions 62b away from one another thereby expanding the injection platform 60b so as to intrude into a conveyance 100 into which the parcels are to be placed. In such instances, as set forth above, one or more of the injection portions 62b may not have or otherwise be associated with a belt portion 67b.

Hence, as depicted in FIGS. 2B, 2C, and 2D, the conveyor system 60 may include or otherwise be configured as an injectable, e.g., extendable, forking assembly 60b that includes a base member 70a having a housing 69a within which the extendable platform members 62b may be fitted, one within the other, in a collapsed configuration, as depicted in FIG. 2B. From this collapsed configuration within the housing 69a, each of the injection segments or members 62b may be extended outward, away from one another, so as to be in an extended configuration, as depicted in FIG. 2C, such as during a parcel delivery process, as depicted in FIG. 2E. For instance, parcels may be loaded onto a first injection portion 62n of the forking injection assembly 60b, which first portion 62n, and all previous portions, e.g., 62g, 62f, 62e, 62d, 62c, etc. may then be extended outward and into the conveyance 100, not through the action of a belt moving across each of the injection segments, but by various of the extendable injection portions, 62c, 62d, 62e, 62f, 62g . . . 62n, all being extended longitudinally one away from the other, as shown in FIG. 2D.

In particular instances, as depicted in FIG. 2A, the conveyor system 60 may be coupled to or otherwise associated with one or more autonomously moveable bridging systems 80. See also FIGS. 7A and 7B. An automated loading system 20, as depicted, may further be included and moveably associated with a bridging system 80, which loading system 20 may include an autonomous positioning element 22 and/or intelligent gripping instrument 30. Particularly, at a loading (and/or unloading) portion of the conveyor system 60, a bridging assembly system 80 may be provided in association with a translatable positioning element 22 and gripping instrument 30, whereby the positioning element 22 and/or gripper 30 are capable of being moved in relation to the conveyer 60, the bridging system 80, a skid sled system 88, and/or a conveyance 100 (not shown) into which parcels are to be placed, such as for loading and/or shipping.

However, in other embodiments, as set forth in FIG. 2E, a moveable translating platform 70, e.g., gantry, may be provided to assist with the loading and unloading of parcels with respect to the conveyor system 60, such as where the translatable positioning element 22 is coupled to the gantry framework 70, which in turn may be moveably associated with the conveyor system 60. As depicted in FIG. 2E, the conveyor system 60 is configured as a telescopic injection assembly 60b. Particularly, in this embodiment, initially the telescopic injection assembly 60b, in conjunction with the gantry 70, may be positioned at a distal end of a conveyor system 60, such as for the unloading of parcels as they approach the distal portion of the conveyor system 60. In such an instance, the positioning elements 22a and 22b may move, e.g., rotate, to position their respective gripper units 30a and 30b so as to grasp the parcels as they approach, the positioning element 22 then may rotate away from the conveyor system 60, and the gantry 70 may then move the injection assembly 60b into and/or approximate the haul of a conveyance 100, such as for unloading of the conveyor system 60 and the loading of the haul of the conveyance 100.

Accordingly, as depicted in FIG. 2A, during a loading procedure, at a portion of the conveyor system 60, an automated bridging assembly system 80 may be provided in association with a translatable positioning element 22 and gripping instrument 30, whereby the positioning element 22 and/or gripper 30 are capable of being moved along the framework of the bridging assembly 80, in relation to the conveyer 60, to grasp parcels as they move along the conveyor system, in this instance, a conveyor belt system 60a. The bridging system 80 may then be moved along with the positioning element 20 and gripper 30 so as to grasp parcels and onload them, such as for loading the grasped parcels into a skid sled system 88 (as depicted in FIGS. 7A and 7B), and/or a conveyance 100 (not shown) into which parcels are to be placed, such as for loading and/or shipping. Particularly, he bridging system 80 is often useful in conjunction with a translating conveyor belt system 60a, where a conveyor belt 67a moves in a manner to bring parcels towards a distal end of the conveyor belt portion 62a, where the bridging system 88 is positioned, as depicted in FIG. 7A. In such an instance, the positioning element 22 may move along the framework of the bridging assembly 80 so as to position the gripping instrument 30 in proximity to a parcel so as to grasp and then move the parcel, such as for loading into a transport platform, e.g., skid sled 88.

Although described with respect to functioning for the purpose of unloading the conveyor system 60, the bridging system 80 may also be configured and positioned to be used for the loading of parcels onto the conveyor system 60, such as for the loading of parcels that have been previously stored in a warehouse facility. Likewise, as depicted in FIG. 2D, the extendable forking assembly 60b, e.g., injection platform, may be employed in conjunction with a translating platform, e.g., moveable gantry system 70, which may be associated with the conveyor system 60, e.g., either a conveyor belt 60a or injection 60b system, for the unloading of parcels. However, in other instances, the conveyor system 60, e.g., conveyor belt 60a or extendable forking assembly 60b, may also be employed with the other components of the system, for the purpose of loading parcels onto the conveyor system, such as at a storage location. Hence, the moveable conveyor belt 60a and/or telescopic injecting assembly 60b are useful in many environments, but are particularly useful in loading and unloading of a conveyance 100 where the conveyance includes an open haul, such as a van, truck, container, or the like.

For example, with regard to FIG. 2A, the conveyor system 60 may be configured as a moveable conveyor belt 60a that may be positioned proximate the haul of the conveyance 100, where parcels may be translated across the conveyor portion 62a via one or more belts 67a. In such instances, the conveyor system 60 may be used to load or unload the haul or conveyance 100. In other instances, with regard to FIG. 2D, an extendable and retractable conveyor system 60b may be provided where the conveyor system may be configured as an articulating forking apparatus 60b that can be extended so as to be fitted within the conveyance 100, and retracted, such as for being removed from within the conveyance 100. In this manner, the forking assembly 62b may also be used for loading and unloading the conveyance 100.

In either instance, an autonomously controlled loading system 20 may be included and associated with the conveyor system 60 and/or bridging system 80 and/or gantry framework 70, such as where the gantry 70 itself may be associated with the conveyor system 60. In such instances, the autonomously controlled loading system 20 may be configured to load or unload parcels, e.g., for the purpose of being translated towards a proximal or distal end of the conveyor system 60, so as to be on or offloaded and positioned proximate or into the haul 100 of the trailer. Particularly, the intelligent loading system 20 may include an automated positioning element 22 and gripping instrument 30, which may be associated directly with the conveyor itself 60, a translating platform 70, associated therewith, or with a bridging system 80, whereby the loading and/or unloading system 20 may then be employed to offload (or load) parcels from the conveyor system 60 and then to place the grasped parcels into a conveyance 100. More particularly, the autonomously controlled loading and/or unloading system 20 may include an automated, intelligent positioning element 22, an automated intelligent gripping instrument 30, and may be associated with a translating platform 70 and/or bridging system 80, together which may be employed to onload and offload parcels onto or from the conveyor system 60 such as for translation into the conveyance 100.

In one such instance, a parcel to be translated into a conveyance can either be translated across the conveyor system via one or more belts, as shown with regard to FIG. 2A, or may be positioned on a first injection portion 62e, which can then be extended relative to a number of other conveyor portions 62n, which in turn can be extended relative to one another, as illustrated in FIG. 2E. In this manner, the retractable injection platform 60b can be made to extend into the haul of the conveyance 100 so as to facilitate ease of packing and making the overall process more efficient. This process can be repeated in reverse order such as for unloading parcels from the conveyance. The length of the conveyor system 60 may depend on the number and length of the individual conveyor portions, e.g., 62a, 62b, 62n. Specifically, with respect to the injection platform 60b, the length of the overall platform will vary dependent on the length of each individual injection panel 62b as well as the number of panels included in the respective conveyor system 60.

As depicted with respect to FIGS. 2A and 2E, in one embodiment, the conveyor system 60 may be associated with an autonomously controlled bridging system 80 (FIG. 2A) or translating platform 70, e.g., gantry (FIG. 2D), that may be coupled with an autonomously controlled loading system 20, which loading system 20 may include an intelligent positioning element 22, e.g., including a robotic arm, that may be coupled to an intelligent gripping mechanism 30, e.g., gripper. As depicted, the conveyor system 60 may be configured either as a moveable conveyor belt 60*a* (See FIG. 2C) or as an injection loader 60*b* (See FIGS. 2D and 2E), such as configured as a truck or trailer loader 60*b* (as depicted).

For instance, as depicted in FIG. 2A, the conveyor system 60 may be configured as a singular, elongated belt portion 62*a*, which elongated portion may include a single belt, or the conveyor system 60 may be configured as a series of conveyor segments, where each segment has its own conveyor belt, such as forming a series of moveable conveyor belt segments 62*a* each having their own belt 67*a*. In such an instance, a parcel placed on a moveable belt is capable of being moved from one position to another position along each conveyor portion 62*a* via the belt. However, in other instances, as depicted in FIG. 2E, the conveyor system 60 may be configured so as to include a plurality of injection portions 62*b* that are configured for being translated one with respect to the other, such as in a collapsible and extendable manner, whereby a parcel is translated not via a belt but by the various injection portions 62*b* being extended outwards away from one another. In various other embodiments (not depicted), a combination of conveyor belt portion 62*a* and injection portion 62*b* may be implemented, such as where an injection platform 60*b* is provided, where the injection platform 60*b* is composed of several telescoping injection portions 62*b* that are configured for collapsing inwards upon one another, so as to be in a retracted form, or translating outward from one another so as to be in an expanded form. In the combined configuration, each injection segment may include its own individual translatable, e.g., conveyor, belt 67*b*, such as for translating a parcel placed thereon from one end of the conveyor portion to the other.

Hence, as can be seen with reference to FIG. 2A, in various embodiments, a moveable conveyor system 60*a* may be provided, where the conveyor system 60*a* is composed of a single elongated conveyor belt portion 62*a* having a moveable belt 67*a* that translates across the conveyor belt portion 62*a*. In such an instance, a parcel placed on a proximal end of the conveyor belt portion 62*a* is translated to the distal end thereof via movement of the belt 67*a*. In such an instance, a proximal portion of the movable conveyor 60*a* may be configured for being deployed within a warehouse or other storage facility where the proximal end of the moveable conveyor portion 62 and belt 67*a* may be positioned within the warehouse, e.g., at a location where parcels may be loaded onto the conveyor belt 67*a*. The distal end of the distal moveable conveyor portion 62*a* and belt 67*b* may be positioned at a location where parcels may be offloaded from the conveyor belt 67, e.g., proximal a loading conveyance. The reverse process can be implemented, such as for the unloading of the conveyance.

In various instances, the conveyance system 60 may be an intelligent system, such as where the moveable conveyor 60*a* includes, or is otherwise associated with a sub-system master control unit 65, which control unit may be implemented by one or more processing units, such as a CPU, GPU, or Quantum Computing Unit (QPU). The CPU, GPU, and/or QPU may be coupled with, or otherwise configured to implement an analytics unit 91. Further, the control unit 65 may be coupled to a plurality of conveyor system controllers, such as via an associated communications module 89. Additionally, the conveyor system 60 may include a sensor modules including one or more sensors 95, such as a weight, pressure, strain gauge, velocity, acceleration, or other such sensor for collecting data about the parcels placed on the conveyor system 60, as well as their movement across one or more of the moveable conveyor portions 60*a* or one or more injection platforms 60*b*.

In particular instances, the conveyor system 60*a* may be coupled to or otherwise associated with an image capturing device 98 for capturing images of the parcels as well as their movement across the conveyor. A communications module 89 may be coupled to the image capturing devices 98, sensors 95, and/or control units 65, controllers 26 so that the data captured by the intelligent conveyor system 60 may be transmitted to the analytics platform 91 for analysis and integration therein. This data may be fed into the analytics module 91 whereby the weight, dimensionality, and movement characteristics of each parcel being translated may be determined by the analytics module 91, and using this data the movements of the conveyor system 60 may be controlled in accordance with control instructions generated by one of more of the CPUs, GPUs, and/or QPUs.

In such instances, as can be seen with respect to FIG. 2A, the loading of the intelligent conveyor portion 62*a* may be performed by an autonomously controlled loading system 20 in combination with an automated bridging system 80. The bridging system 80 may include a number of bars 81 and/or rails that are configured to form a horse shoe like structure that will allow the loading system 20 e.g., one or more robotic arms 22 thereof, to move about the conveyor portion 62, such as in a planar field along an X and Y axis, e.g., left and right, across a horizontal bar 81*b*, as well as vertically, up and down, along one or more vertical bars 81*a*, 81*c*. For instance, in certain instances, the bars 81 of the bridging system 80 may include one or more sets of upright or vertical bars 81*a*, 81*c*, which may be coupled together by one or more horizontal connecting bars 81*b*, such as to form a horse shoe structure around the conveyor portion 62*a*.

Figure 3A:
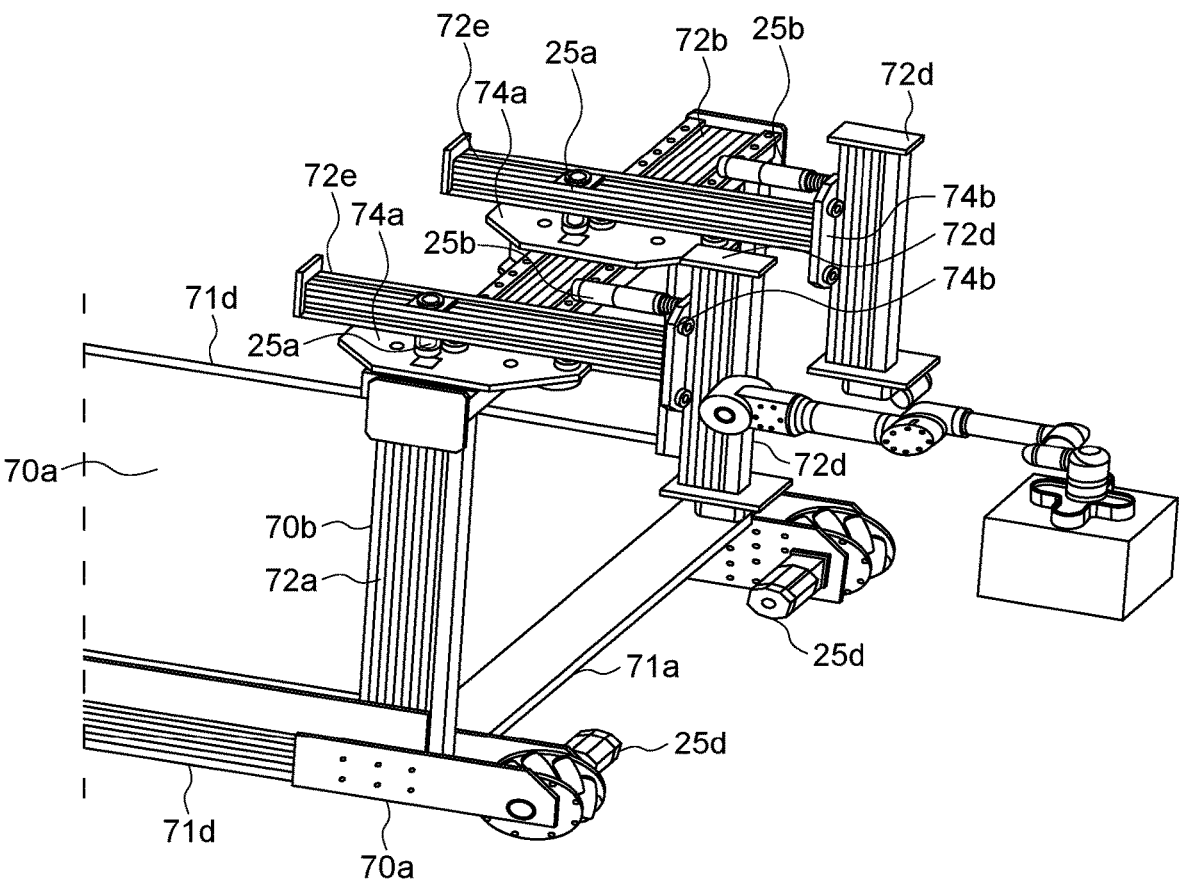
FIG. 3A presents a side view of an exemplary translating platform of the disclosure in combination with a positioning element, gripper, and grasped parcel.
Figure 3B:
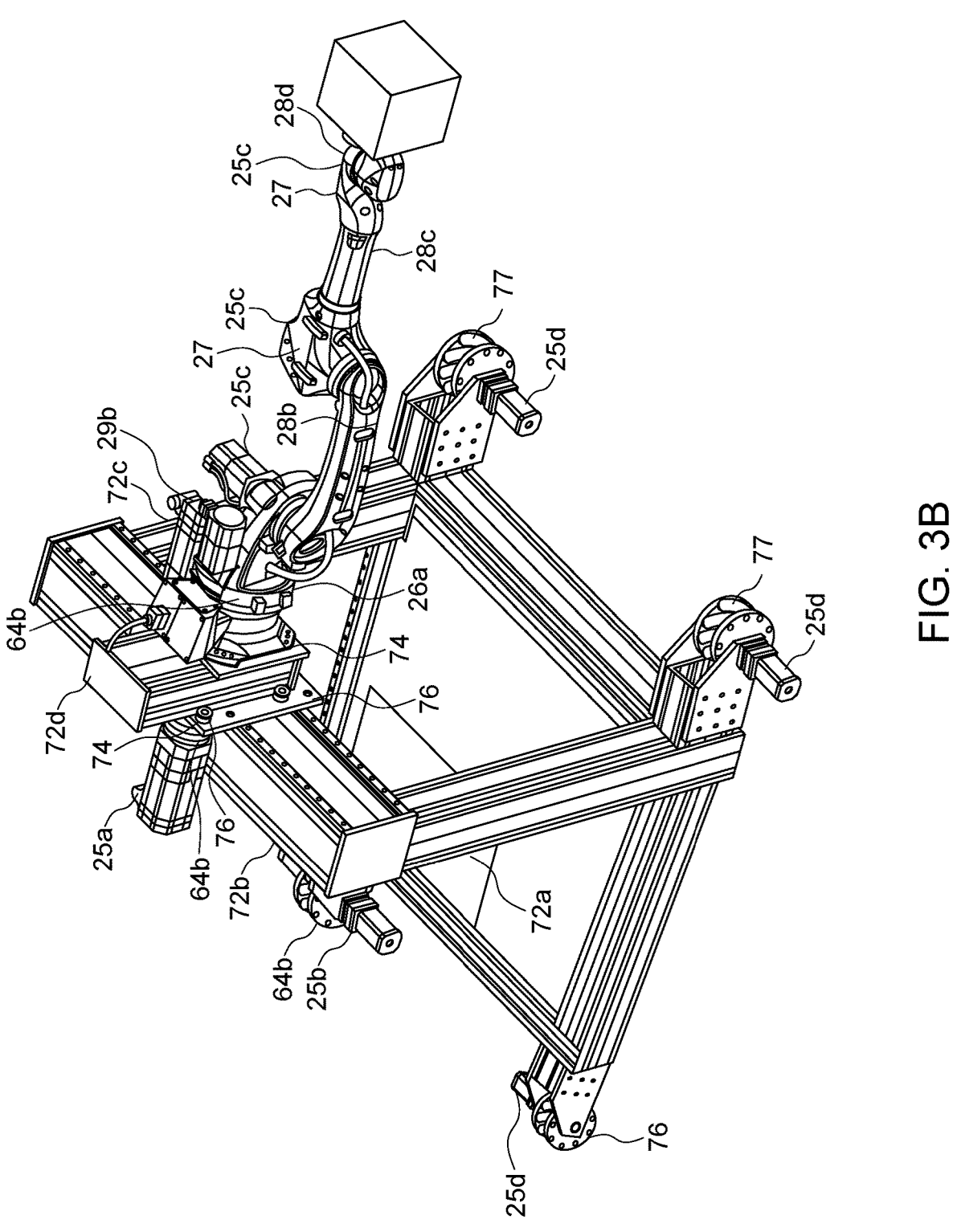
FIG. 3B presents a perspective view of another exemplary embodiment of the translating platform of the disclosure in combination with a positioning element, gripper, and grasped parcel.
Figure 3C:
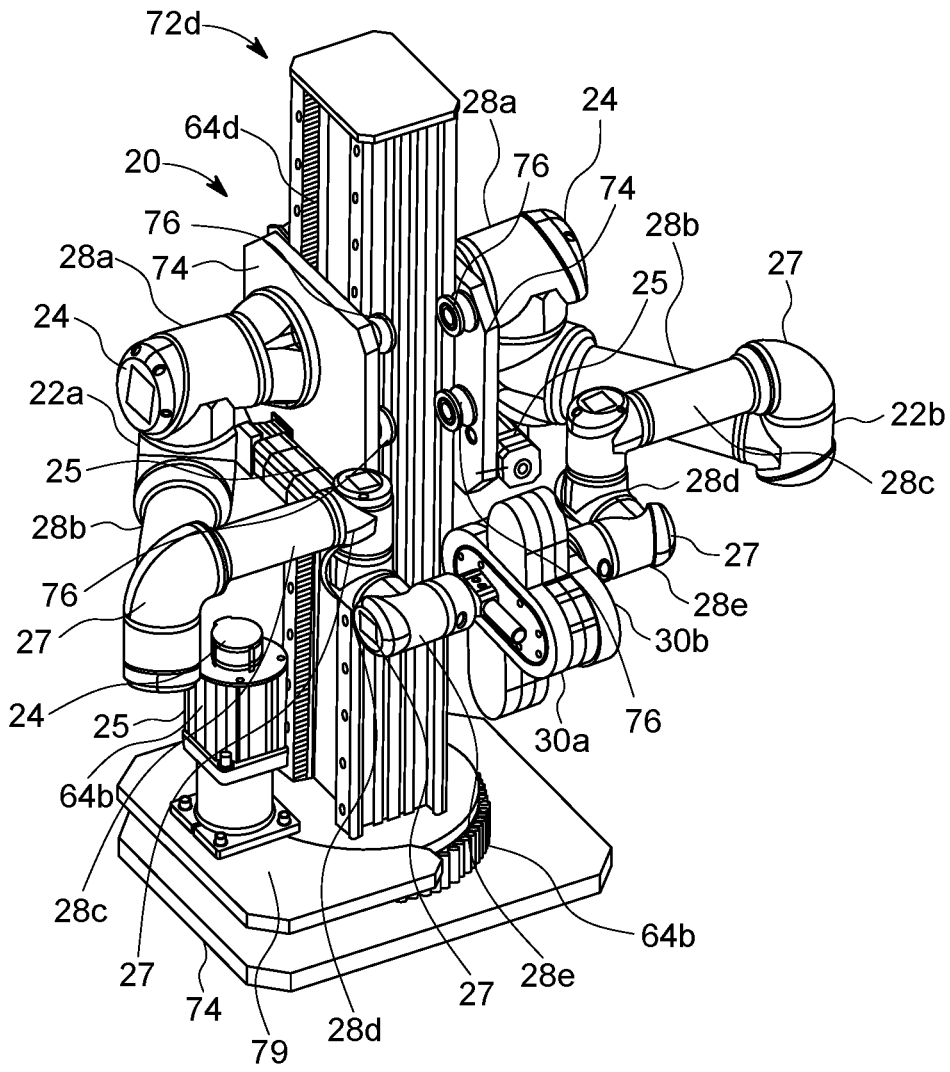
FIG. 3C presents a perspective view of a plurality of exemplary positioning elements of the disclosure.

In one implementation (not shown), two sets of horse shoe bridging structures 80 may be provided and may be offset from one another, such as by a plurality of elongated connecting bars 81*d* (as shown in FIGS. 7A and 7B) that extend along the Z-axis so as to connect the two horse shoe like portions together, such as to form a square or cube like configuration. In this configuration, the one or more robotic arms 22 of the loading system 20 may be configured to move in all three directions, including forwards and backwards, e.g., along the Z-axis connecting bars 81*d* (not shown), as well as horizontally left and right along the horizontal connecting bar(s) 81*b*, and vertically up and down along the vertical support bars 81*a*. These various bars 81 of the bridging system 80 may include rails or tracks (as shown in FIGS. 3A-C) that allow the autonomously controlled robotic arms 22 to move about the structure to pick up parcels so as to move them from storage to the conveyor, and from the conveyor to transport, such as into a skid sled system 88 (not shown) or into a haul of a conveyance 100 for placement. The positioning element(s) 22 may be coupled to the bridging structure system 80 by a horizontal (offset) support member 72*e*, rotational support member 27, and may include a vertical support member 72*d*, which may include a rail system as depicted in FIGS. 3A and 3B.

In particular embodiments, the bridging system 80 vertical supports 81 may include wheels 77 for movement, which may be coupled to one or more motors 25 for automating the motion of the bridging system. As indicated, the bridging system may be intelligent, and thus, may be configured to move in conjunction with the other components of the autonomous and automated picking and placing system 1. This is useful because it allows all of the various system components, including the bridging system, to move in unison so as to better effectuate the picking and placing operations. Consequently, like the intelligent conveyor system 60, the bridging system 80 may also be intelligent. Therefore, the intelligent bridging system 80 may include one or more image capturing devices 98, sensors 95, and one or more control units 65, e.g., having one or more CPUs, GPUs, and/or QPUs for directing the intuitive movements of the bridging structure 80, e.g., via one or more controllers 26, such as in communication with one or more motors 25. In this regard, the one or more sensors 95 may include a weight, pressure, strain gauge, velocity, acceleration, and/or other such sensor for collecting data about the parcels to be off- or on-loaded. One or more communications module 89 coupled to the image capturing devices 98, sensors 95, and control unit 65 and controllers 26, may also be provided, so that data captured by the intelligent bridging system 80 may be transmitted to the analytics platform 91 for analysis and integration therein.

In other instances, as depicted in FIG. 2E, the bridging system 80 may be positioned on a moveable, e.g., translating, platform 70 so as to form an intelligent, moveable gantry system. The intelligent gantry system 70 may include a rolling frame 71 having a plurality of framing elements, such as a base frame 70a and a vertical or sidewall frame 70b. The sidewall frame 70b may be configured as vertically extended poles 72 including a left extended vertical pole 72a and a right vertically extended pole 72c, which are offset from one another but coupled together by a horizontally extended bar 72b, so as to form a horseshoe configuration akin to the aforementioned bridging system 80, discussed above. In this embodiment, the vertical frame 70b is configured to frame an opening through which a conveyor system 60, in this instance a telescoping injection platform 60b, may be fitted. Thus, the vertical frame structures 72a and 72c raise the top frame structure 72b above the conveyor apparatus 62 so that one or more positioning elements 22a and 22b of the automated loading system 20 may be moveably coupled to the sidewall frame 70b so as to translate along the vertical and horizontal axes, and when the positioning element 22 is configured as a robotic arm, the autonomous loading system 20 can move in all three-dimensions.

However, in alternative versions, the translating platform 70 may be configured solely as a an autonomously motorized base member 70a, as depicted in FIGS. 2B and 2C, to which an injecting conveyor system 60b may be coupled, such as through a motorized and/or rotational member 73. For instance, the injection system 60b may be configured as an injectable forking apparatus 62b that is capable of being collapsed so as to be fit entirely within a housing 69a, as depicted in FIG. 2B, or it may be expanded, as depicted in FIG. 2C. The injection fork apparatus 60b may be coupled to a motorized platform 70b, which platform may be configured for moving the injection fork 62b to and where the fork may be employed for the performance of a picking and placing operation.

In particular embodiments, the motorized platform 70b may be automated so that it can be moved and orientated autonomously, and thus, may include one or more motors 64a for directing the motions of the platform 70b. The automated platform 70b may also include a motorized lifting and/or rotating member 73 which may be configured for rising and lowering the automated injection forking apparatus 60b to a level where the injection fork 62b may be deployed. In this regard, the forking apparatus 60b may be coupled to the base member 70b through the motorized lifting element 73, which lifting element may be coupled to gearing 64b such as for translating rotational motion into vertical motion, whereby engagement of the motor activates the raising of the lift base.

More particularly, in various embodiments, between the automated base member 70a and the injection fork housing 69a may be the rotational lift member 73 and one or more, e.g., a pair, of raisers 69b and 69c, such that as the motor is engaged the raisers may be incrementally raised, until the injection fork housing 69a is lifted to a determined level that corresponds to the level of the conveyor system and/or to a pile of parcels being packed. In such a configuration gearing may not need to be present. In particular instances, the lifting member 73 may be coupled to a controller 26 and motor 64a, so as to be automated, and in such an instance, may be coupled to or otherwise associated with one or more imaging devices 98 and sensors 95. The data captured by these elements may be fed into an associated injection platform control unit 65 and/or the analytics system 91 and may be employed to raise and extend the injection fork 62b to the appropriate level, as determined by an analysis of the image and sensing data. Once raised to the determined level each of the injection segments 62b may be extended outward, away from each other, so as to be in an extended configuration, as depicted in FIG. 2C, such as during a parcel delivery process.

Further, as indicated, the translating platform system 70 and motorized platform 70a may be intelligent, and like the other components of the system, the intelligent translating system 70 and motorized platform 70a may be configured to autonomously move in conjunction with the other components of the automated picking and placing system 1. Thus, the automated translating system 70 and motorized platform 70a may be configured so as to be able to be moved in unison with the other intelligent components of the system so as to better effectuate the picking and placing operations. Consequently, like the intelligent conveyor system 60 and bridging system 80, the translating system 70 may also be intelligent.

Therefore, the intelligent translating system 70 may include one or more image capturing devices 98, sensors 95, as well as a dedicated translating platform control unit 65, e.g., having one or more CPUs, GPUs, and/or QPUs, which may be in communication with one or more controllers 26 for directing the intuitive movements of the translating system 70. The translating system 70 and motorized platform 70a may include a sensor module 95 having a plurality of sensors associated therewith, which sensors may include a weight, pressure, strain gauge, velocity, acceleration, and/or other such sensor for collecting data about the parcels to be off- or on-loaded. In particular instances one or more, e.g., a plurality of distance scanners 95 may be provided. One or more communications module 89 coupled to the image capturing devices 98, sensors 95, control unit 65, and controllers 26, e.g., of the translating and motorized platforms, may also be provided, so that data captured by the intelligent translating system 70 may be transmitted, e.g., via the translating platform control unit 65, to the analytics platform 91 for analysis and integration therein.

Hence, as depicted in FIG. 2E an intelligent translating platform 70, e.g., autonomous gantry, may be provided in association with a truck or trailer loader conveyor system 60. An automated positioning element 22, e.g., configured in this instance as a plurality of robotic arms 22a and 22b, may be coupled to a framing element 70b of the autonomous gantry 70 and may be configured so as to move along one or more of the framing elements 72a, b, c, so as to position a gripping instrument 30 into an orientation whereby a parcel being translated on the conveyor system 60 may be grasped. In various instances, one or more image capturing devices 98 may be provided, such as in association with one or more positioning elements 22 and/or gripping instruments 30 so as to capture images of parcels as they are translated, e.g., from a proximal end to a distal end, or vice versa, across the conveyor 60 system. One or more sensors 95, such as a weight, mass, motion, direction, depth sensor, or the like, may also be included, so as to determine the weight, dimension, as well as distance between objects and the intelligent gantry. In this manner, the image capturing devices of the intelligent gantry 70 may be configured to determine gaps between objects as they grow or decrease as the parcels on the conveyor system 60 and positioning elements 22 move in relation to one another and/or the gantry 70.

In such an instance, the grasping of parcels can be fully automated by the image capturing device 98 capturing live streaming images of the parcels, bridging system, and/or gantry, feeding those images into an analytics system 91, e.g., along with sensed motion and direction data. The analytics system 91 can receive that sensed data and can translate the captured images into coordinates that are then converted into instructions for moving the positioning element(s) 22 proximate the parcel to be picked, and orienting the automated gripper 30 so as to grasp and pick up the parcel. The movement of the positioning element 22 may involve moving the positioning element 22 itself, moving a gantry 70 or bridging system, or even moving an injection portion 62b, to which the positioning element 22 is coupled. Once grasped by the gripper 30 and picked up off of the conveyor system 60 by the positioning element, the automated gantry 70, or other intelligent portion of the system, may then be moved, e.g., autonomously, so that the positioning element 22 and gripper 30 are positioned to place the parcel within the conveyance 100

Accordingly, a distal end of the conveyor system 60 may be positioned in, or near, a conveyance 100, via an intelligent and/or automated bridging 80 and/or translating platform 70. Where the conveyor system 60 is configured as an injection platform 60b, the translation platform 70 may be coupled to a distal portion 62n of an injection system 62b, so that the positioning element 22 may be autonomously moved towards the haul of the conveyance 100 without the positioning element 22 itself moving. Instead, once associated with the distal injection portion 62n, the positioning element 22 may be moved by the injection fork 62 being extended in a manner so that the extendable portions 62c-62n are moved outward away from one another. In this manner, a parcel grasped by the positioning element 22 may be moved by the extending of the injection fork outward so as to translate the parcel positioned on an extendable portion into proximity of the conveyance 100.

For Example, as depicted in FIGS. 2B and 2C, in particular embodiments, the conveyor system 60 may be configured as a retractable or telescoping injection or forking portion 62b, which may or may not include a conveyor belt 67b. For example, the telescoping injection system 60b may be configured as a van or trailer loader assembly, as depicted in FIG. 2E, and may include a number of telescoping segments or panels 62c, 62d, 62e, 62n, etc., which are individually sized so as to be collapsible, such as one within the other. In such a manner, the entire set of injection portions 62c-n is capable of being both collapsed, in a retracted configuration, and can further be extended, in an expanded configuration.

Alternatively, as depicted in FIG. 2A, where the conveyor system 60 is configured as a moveable conveyor belt system 60a, the translation platform 70 may move one or more conveyor portions 62a into proximity of the conveyance 100. Once appropriately positioned, the belt portion 67a may be activated so as to move parcels placed thereon into proximity of the conveyance 100. In either instance, once the conveyor system 60a is in proximity of the conveyance 100, a bin packing, e.g., trailer loading, process may be initiated where the parcels may be grasped and off-loaded into the haul of a trailer, such as depicted in FIG. 2E. As indicated, this offloading (or onloading) may be autonomously controlled, e.g., in conjunction with the automated loading system 20, by the analytics system 91 generating and implementing instructions for directing the positioning of the automated positioning element 22 and autonomous gripper instrument 30 so as to grasp, orientate, and translate parcels from the conveyor system 60 into the conveyance 100 for placement.

In view of the above, in various embodiments, as depicted in FIGS. 2B, 2C, and 2D, the translating platform 70 may be configured in a more simplified form, such as where an injection platform 60b is coupled directly to a moveable base member 70a of the translating platform 70, such as through a liftable and/or rotational coupling member 73. In such an instance, the base member may be motorized so as to be mobile, which motor 25 may be mechanical, electric, or digital. In various embodiments, the motor 25 may be a combustion motor, e.g., running on gas, e.g., petrochemical or natural gas, or may be an electric motor whose power is supplied by one or more batteries and/or may be solar powered. The base member 70a may further include a motorized driver 25c and wheels 77 whereby the driver effectuates the spinning of the wheels 77 so as to initiate movement, and a drive train, or at least one or more turnable axles may be present for directing, e.g., turning, the base member.

Further, like above, the moveable base member 70a may be intelligent, and thus, may include a control unit 65, such as a CPU, GPU, QPU, or the like, which may be coupled to one or more controllers 26, such as having one or more processing elements, as well as an image capturing device 98, a sensor module 95 containing one or more sensors, and a communications module 89 for interfacing and interacting with the other intelligent components of the system. For example, the image capturing devices 98 may be configured for imaging the surroundings within which the motorized injection base 70a operates, and the sensors, such as including one or more distance scanners 99, may be configured for determining distances between the injection base 70a and the other identified objects found to be within the space. In a manner such as this, the automated injection platform 60b may be autonomously moved within the picking and placing space without colliding with any of the other objects therein. In such an instance, one or more controllers 26 may be coupled to one or more motors 25, such as for effectuating the precise, controlled movement of the injection base member 70a. In addition to the distance sensors 99, the sensors of the sensor module may additionally include a weight, pressure, strain gauge, velocity, acceleration, and/or other such sensor for collecting data about the parcels to be off- or on-loaded. The communications module 89 may be coupled to the image capturing devices 98, sensors 95, control unit 65 and controllers 26, e.g., of the injection base 70a, and may be configured such that the data captured by the autonomously motorized base 70*a* may be transmitted to the analytics platform 91 for analysis and integration therein.

Furthermore, as illustrated in FIGS. 2B and 2C, the injection portion 62*b* may be coupled to the motorized injection base 70*a* through a lifting and/or rotational member 73. Hence, once positioned proximate the conveyor system 60 and/or conveyance 100, the injection fork 62*b*, e.g., in its collapsed form as depicted in FIG. 2B, may be lifted, e.g., vertically and/or horizontally, away from the base member 70*a*. Particularly, the motor 64*a* of the lift 73 may be coupled to gearing 64*b* for translating rotational motion into vertical motion, whereby engagement of the motor activates the raising of the lift base. Accordingly, the lifting of the injection portion 62*b* may be effectuated by one or more mechanical or electronic motors and/or gears so as to rise the injection portion 62*b* so as to be in a position suitable for the injectable segments 62*c*, 62*d*, 62*n*, to be injected into a haul of a conveyance as depicted in FIGS. 2D and 2E.

In various embodiments, between the automated base member 70*a* and the injection fork housing 69*a* may be one or more, e.g., a pair, of raisers 69*b* and 69*c*, such that as the motor turns the raisers are incrementally raised, until the injection fork housing 69*a* is lifted so as to be at a level corresponding to the conveyor system and/or to pile of packed parcels into which a grasped object is to be placed. Once raised to the appropriate level, as determined by the imaging devices 98 and sensors 95, then each of the injection segments 62*b* may be extended outward, away from each other, so as to be in an extended configuration, as depicted in FIG. 2C, such as during a parcel delivery process, as depicted in FIG. 2D. In a manner such as this, parcels may be loaded onto a first injection portion 62*n* of the forking injection assembly 60*b* and may then be extended outward and into the conveyance 100 such as by various of the extendable injection portions, 62*c*, 62*d*, 62*e*, 62*f*, 62*g* . . . 62*n*, all being extended longitudinally away from one another, as shown in FIGS. 2D and 2E.

Figure 2F:
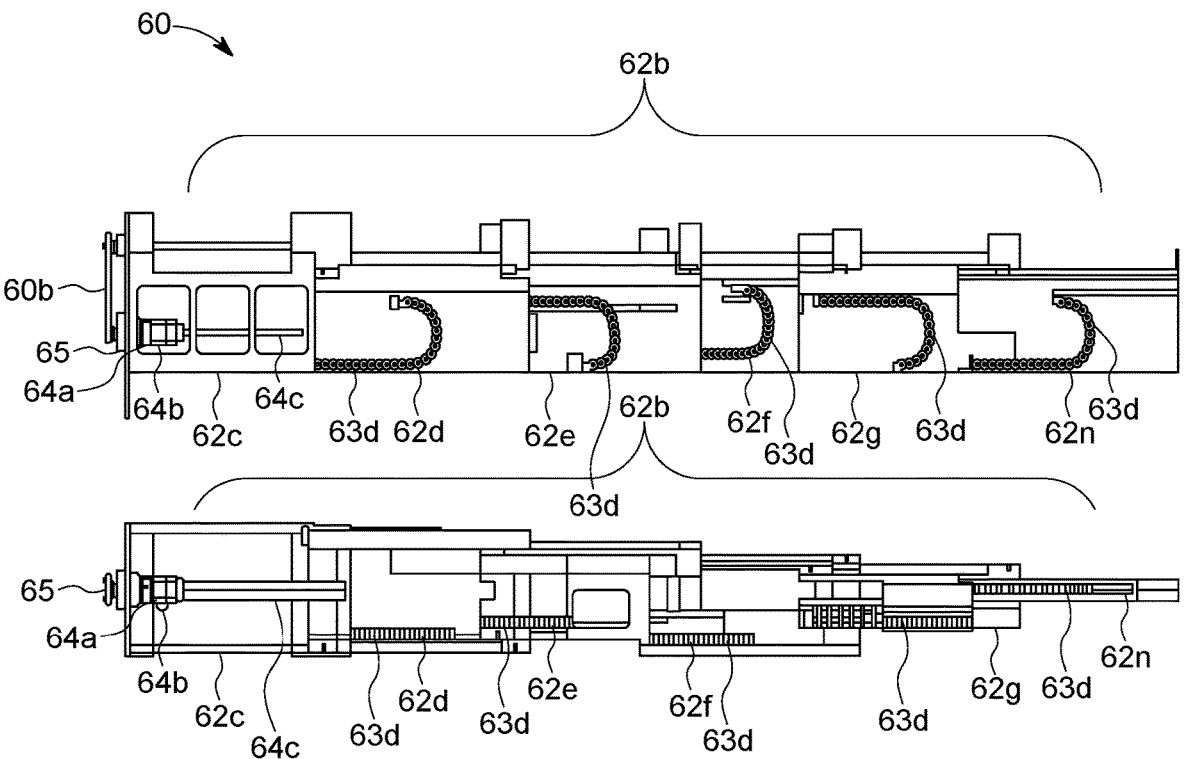
FIG. 2F presents a side view of an exemplary automated injection platform segment of the disclosure.

Particularly, as seen with respect to FIG. 2F, the injection forking system 60*b* may be configured for moving each of the individual injection segments 62*c*, *d*, *e*, . . . n, one with respect to the other, which movement may be accomplished through a variety of different manners. For example, in one implementation, the extension of the conveyor forking segments 62*b* may be accomplished via the interaction of one or more of a driver, e.g., a smart electronic or digital motor 64*a*, gearbox 64*b*, driving rod 64*c*, one or more linkage elements, e.g., belts, chains, driving rods, etc. 63*d*, and the like, which driver 64*a* may be controlled by a control unit 65 including one or more microprocessor units, e.g., CPU, GPU, which may be coupled to one or more controllers 26 that in turn may be in communication with one or more motors 64*a*, all of which may be wirelessly associated with a communication modules 89. Particularly, a mechanical, electronic, or digital motor 64*a* may be associated with one or more of the segments 62*b*, whereby the motor 64*a* drives one or more gears 64*b*, which in turn drives a driving rod 63*c* and/or belt or chain 63*d* in its translation along an edge of the segments 62*c* of the injection portion 62*b*, in a manner so as to extend and retract the various segments of the injection forking apparatus 60*b*.

In these regards, the motor 64*a* may be a digital, electronic, and/or mechanical motor, which may be coupled to one or more gears 64*b*, a driving rod 63*c*, and linking elements, e.g., belts 63*d*, and functions as a driver of the gears 64*b*, driving rod 63*c*, and belts 63*d*. In such an instance, an edge of the injection segments 62*b* may include one or more grooves, such as to form a link, e.g., belt, guide within which the linking element, e.g., belt 63*d*, moves. The linking element 63*d* may be one or more of a secondary driving rod, a belt, band, chain, link, or the like, such as a heavy-duty belt or chain, e.g., a roller chain, which may be connected to one or more bushings and sprockets. As the primary driving rod 64*c* moves from a collapsed to an expanded configuration the linking elements, e.g., belts or chains 63*d*, are also moved from a retracted or wound-up position to an extended or an unwound position. In doing so, the belts or chains 63*d* translates through a sprocket like element 64*b* causing the segments 62*b* of the conveyor system 62*c-n* to move from a contracted to an expanded condition, as shown in FIGS. 2C, 2D, 2E, and 2F.

Likewise, as the driving element 63*c* moves from an expanded to a collapsed position, the linking elements 63*d* may move about the sprocket from an unwound to a wound-up position, and the segments 62*b-n* of the conveyor system 60*b* may retract into a stacked, retracted configuration, as shown in FIG. 2B. In an alternative embodiment, a series of collapsible driving rods, which may be driven by individualized motors, may be employed for moving the individual injection segments from a collapsed to an expanded configuration, and vice versa. The panel segments 62*b-n* may further include one or more end bolts and roller linking nuts for coupling the linking elements 63*d* and/or associated sprockets to a portion, such as an end portion, of each conveyor segment 62*b*. In particular instances, a number of linking elements, e.g., belts, sprockets, linkage guides, and/or guiders may be provided and positioned on one or more sides, e.g., lengthwise sides, of the segments.

In particular instances, the conveyor system 60 may include a sensor module 95 having one or more sensors, such as a distance scanner 99, and one or more image capturing devices 98 so as to capture sensed data and images for determining how far to travel and/or rotate, in what direction, at what speed or acceleration, as well as how much to lift, how far to extend, and at what speed. More particularly, the image capturing devices 98 may capture images of the environment, the objects to be grasped, and the various components of the system within the environment, and the distance scanner 99 may capture data as to changes in distances between the various components and objects within the environment. This data may be fed into the control unit 65, which may then directly generate instructions, or the data may be preprocessed and then fed it into the analytics module 91 of the system 1, whereby the analytics system 91 may then generate the instructions, which can then be transmitted back to the control module 65 of the motorized platform 70*b*, such as for implementation thereby.

The instructions may include directions for directing the movements of the various components of the system in relation to one another and the objects to be picked and placed. In this regard, although described herein with respect to the automated injection platform 70*b*, as depicted in FIGS. 2B and 2C, the same processes for determining the motions, directions, speed, orientations, and the like, of the other components of the system can be implemented in the same or like manner. Specifically, images and sensed data captured by the various image capturing devices 98 and sensors 95 of all of the various components of the system can be fed into the various different component control units 65, and/or may be fed into the analytics module 91 for the entire system.

All of the collected data may be parsed, collated, aggregated, and may be analyzed, the results of these analyses may be the generation of instructions directing the movements of the various respective components of the system. Such control instructions can be transmitted to the various different control units 65 of respective components of the system, such as to the intelligent conveyor system 60, intelligent gantries 70, positioning elements 22, grippers 30, motorized injection bases 70a, and intelligent bridging system 80 of the system 1. The control instructions can then direct movements of the conveyor system 60, associated gantries 70, bridging systems 80, and motorized bases 70a, and the like, with respect to one another and the objects to be grasped. In a manner such as this, the entire picking and placing environment may be automated.

For instance, as depicted in FIGS. 2B and 2C, the conveyor system 60, e.g., injection system 62b, may be associated with or otherwise include a motorized injection platform 70a, This coupling may be effectuated by an automated lifting and rotational member 73, which in turn may be associated with a motorized unit 64a and a controller 26 for directing the lifting, rotating, and orientating of the injection system 60b. As depicted in the first figure of FIG. 2B the injection system 60b may be lifted and rotated along the Z-axis, such that when extended, the injection portion 62b would come outward from the page. However, as illustrated in the second figure of FIG. 2B, the injection system is depicted with the injection portion 62b being rotated 90 degrees as it would be before being expanded such that the injection segments may be expanded and inserted into a haul of a conveyance (as depicted in FIG. 2D). Hence, in FIG. 2B the injection system 60b is illustrated where the injection portion 62b is in its collapsed form and contained within the protective housing 69a. However, in FIGS. 2C and 2D, the segments of the injection portion are depicted in their expanded configuration.

Particularly, in FIG. 2D, the conveyor system 60 is illustrated as it would be deployed so as to deliver parcels within the haul of a conveyance 100. In this embodiment, an autonomously controlled loading system 20, configured as a robotic arm 22, attached to a gripping unit 30, is moveably, e.g., rotationally, coupled to the housing 69a of the injection portion 62b. In such instances, in use, the gripping unit 30 would grasp an object, e.g., off of a conveyor belt, the robotic arm would rotate, e.g., 180 degrees along a vertical axis, and the segments 62n of the injection portion 62b would be extended into the haul of the conveyance for placement of the grasped object therein.

More particularly, the injection platform master control unit 65 and/or associated controllers 26 of the injection portion 62b will generate, or receive instructions, which when implemented, e.g., by the various motors 26, 64a of the automated motorized platform 70a and injection fork 62b, cause the motorized platform 70b to move to its determined location, the liftable injection platform to rise and/or rotate, via the lifting and rotational member 73, and the injection forking unit 62b to be extended outward away from the housing, such as by the extending of the driving element 63c, which may be effectuated by the controllers 26 and motors 25 so as to appropriately align and insert the injection portions 62b into the haul of the conveyance.

In particular instances, as can be seen with respect to FIG. 2E, the moveable, retractable conveyor system 60, including a retractable injection fork 62b, may be provided and may be coupled to a translating platform 70, e.g., automated gantry. In such an instance, the translating gantry 70 may be used to translate an injection forking apparatus 60b into the haul of a conveyance 100, which when in the haul of the conveyance, the forking apparatus 60b, in conjunction with the autonomous controlled loading system 20, may be employed to translate packages from within a warehouse and into a short- or long-haul transportation container or van. Particularly, as can be seen, the telescoping injection fork 62b may be set up such that the proximal portion 62c of the conveyor fork 62b is positioned in or near the storage facility, and the distal portion 62n of the conveyor fork 62b is coupled to the translating platform 70. The translating platform 70 may then be moved, thereby extending the forking member 62b, into the conveyance 100, e.g., shipping container. Accordingly, the injection fork 62b may be mounted on, or otherwise be associated with, a frame member 71 of the autonomous translating platform 70. In such instances, the automated translating platform 70 may be configured as an overhead gantry, such as including a rolling control frame 71, as depicted in FIG. 2E.

In this manner, and as depicted in FIGS. 2D and 2E, the forking injector 60b is capable of being injected into the trailer of a conveyance 100 by being translated, e.g., extended, by the movement of the autonomously mobile gantry 70 (or motorized platform 70a). Accordingly, where the gantry 70 (or motorized platform 70a) is moved from outside to inside of the haul of the conveyance, a distal portion 60n of the injection portion 60b is extended into the haul. Additionally, where the positioning elements 22a and 22b (as depicted) are coupled to one or more gantry 70 supports, e.g., 72b, they can then be employed to pick the parcels off of the conveyor 60b and/or place them into the haul, e.g., of a truck (as depicted). Hence, the injectable fork 60b can be extended into a haul for unloading, and once unloaded can then be retracted, reloaded, and injected into another haul of a different conveyance.

In various instances, although depicted here as an injection fork 60b, the conveyance system 60 may also be configured as a retractable conveyor belt system 60a. In such an instance, once extended, one or more moveable belts may be employed to move the parcels across the conveyor portions 62a, so as to move parcels towards the gantry 70 and positioning elements 22, whereby the parcels may be offloaded by the positioning element 22. In other instances, the positioning element 22 may be positioned on a support that is separate and removed from the gantry 70, such as where the support couples directly to the floor, wall, or ceiling of the haul, such as in a bridging format, in a manner that the bridging support member, or its component parts, can be configured and move and/or rotate, in a manner similar to the gantry supports, so as to better position the positioning 22 and gripping 30 elements in an appropriate configuration for picking and placing objects in the haul of the conveyance, e.g., in accordance with a system generated picking and placing model. As indicated, in effectuating such movements, one or more electronic or mechanical motors 25 and/or gears 64b can be included and used to move the bridging support member(s) and their component parts, such as to embody autonomously moving joint members.

Consequently, in various instances, as depicted in FIG. 2F the conveyor system 60 may be semi or fully automated. For instance, as can be seen with respect to FIG. 2B-2F, the conveyor system 60 may include an injection forking apparatus 60b, including a number of forking segments 62b, which may be autonomously or mechanically moved from a collapsed configuration to an expanded configuration so as to be inserted, or injected, within the haul of a conveyance 100, as depicted in FIG. 2D. Accordingly, for effectuating such movements, the injection portion 62*b* may include a number of segments 62*c*-62*n* that are moveably coupled to one another, such as via one or more linking elements 63*d*. For example, in one embodiment, the injection fork 62*b* may include a driving element 63*c* and/or a linkage, such as a linking element, e.g., a strap, band, a chain, or a belt 63*d*. In various embodiments, the driver element 63*c* may be automatically extendable and collapsible, and thus, may be configured for directing the extending and collapsing of the injection fork members 62*b*. In associated instances, a link, e.g., belt, and pully arrangement may also be employed to effectuate the extending and collapsing of the forking portion 62*b*. In particular instances, the driver 63*c*, which may be used in addition with a belt and pulley system, may be employed to extend and retract the forking apparatus 60*b*.

For instance, the driver 63*c* may be associated with a mechanical or electronic motor 64*a*, which may be coupled to the linking element 63*d*, whereby when the motor is activated the linking element can be extended, e.g., via the driver 63*c*, so as to expand the conveyor panel segments 62*b*, from the retracted configuration of FIG. 2B, to the extended configuration of FIGS. 2C and 2D. Likewise, when the linkage 63*d*, chain, or belt, or the like, in an expanded condition is retracted, then the conveyor panel segments 62 can be retracted one within the other, as seen in FIG. 2B, such as by retracting the linkage elements. In particular instances, the driver element 63*c* may be configured as a rod, which driving rod 63*c* may be associated with gearing 64*b* and/or controllers 26 and/or a conveyor system control unit 65. Particularly, in particular implementations, as can be seen with reference to FIG. 2F, the conveyor system 60 may include one or more controllers, such as including one or more microprocessors, which may be in communication with the conveyor system master control unit 65, e.g., a CPU, GPU, QPU, etc., configured for directing the motions of the conveyor system 60 and its component parts, e.g., motors 64*a* and drivers 63*c*, such as with regard to positioning of a portion of the conveyor system 60, relative to the conveyance, and/or for extending or retracting the various segments or panels of the injection portion 62*b*.

As can be seen with reference to FIGS. 2D and 2E, an autonomously controlled loader system 20 may also be provided, wherein the autonomous loader system 20 may include one or more intelligent positioning elements 22, which in turn may be coupled to one or more intelligent gripper instruments 30. Particularly, the intelligent loader system 20 may be coupled to one or more automated injection platforms 70*a*, as depicted in FIG. 2D, and/or one or more gantries 70, as depicted in FIG. 2E. More particularly, the autonomous loader system 20 may include one or more robotic arms 22*a*, which may be coupled to one or more object grippers 30, whereby the one or more robotic arms 22 *a, b*, may in turn be rotationally and moveably coupled to one or more motorized injection platforms 70*a* and/or gantries 70. Likewise, one or more bridging systems 80 and/or skid sleds 88 may also be provided, whereby gantries 70 may be associated with the bridging system 80, and each skid sled 88 may include a number of different mobile package conveyances.

As set forth above, an exemplary embodiment of a retractable, e.g., a telescoping, conveyor forking system 60*b* is depicted in FIG. 2B, in its retracted state, and FIG. 2C, in its extended form. As can be seen in FIG. 2F, the telescoping and/or forking conveyor system 60*b* may include a number of moveable, e.g., translatable, segments or panels 62*b*, which panels may be formed in variable sizes, shapes, and configurations such that one panel 62*c* may be configured for being slid adjacent to, e.g., on the top or bottom of, or within the bounds of another panel 62*n*. In a manner such as this, the injection system 60*b* may be loaded with parcels, and the panels may then be injected into the inside of a haul of a conveyance, As depicted in FIGS. 2D and 2E. In such instances, an automated positioning element 22 and/or autonomous gripper instrument 30 may be coupled to the conveyor system 60, and/or translating platform 70 (as depicted in FIG. 2E), whereby once the injection platform 62*b* has been injected into the conveyance, the gripper instrument 30 may be positioned, e.g., by the positioning element 22, so as to grasp an object off of the conveyor system 60, and translate it to where it is to be positioned within the conveyance, in accordance with a generated picking and placing model.

For instance, as depicted in FIG. 2F, the retractable conveyor system 60 may be composed of a series of portions or panels 62*b*, 62*c*, 62*d*, 62*e*, etc. that collectively form a proximal portion, one or more medial portions, and/or a distal portion. Particularly, in various embodiments, the proximal portion may be defined as the portion 62*c* closest to where parcels are first placed on the injection platform 62*b*, and the distal portion 62*n* may be defined as the portion closest to where the parcels are to be offloaded, although, in the collapsed form the proximal and distal portions may be stacked one on top of the other. For example, in particular embodiments, the proximal portion may be composed of a panel segment 62*c* that is larger than the various medial portions, 62*d*, 62*e*, 62*n*, etc., which in turn may be configured to be larger than the distal portion panel 62*n*. In such instances, the smaller segments may be configured for retracting into the larger segments. In other embodiments, the reverse configuration may be implemented, such as where the proximal segment is smaller than those distal to it. Any number of medial portions may be included, dependent upon the length required for spanning the distance between the storage facility and the haul of the conveyance.

Hence, as indicated, the segments 62*c-n* may be configured to move in relation to one another. Therefore, the retractable forking system 60*b* may include a translating mechanism 63*c*, such as a driver, which driver may be employed in combination with one or more motors 25, e.g., electronic, digital, or mechanical motors, so as to drive the extending and retracting of the injection fork portions 62*b* one in relation to another. In various embodiments, one or more drivers may be associated with one or more motors, which may be associated with a corresponding number of controllers 26, such as at two, three, four, or all of the injection segments. In particular embodiments, translating elements 63*c* may be controlled by a controlling unit 65, such as including a microprocessor and associated memory, e.g., such as in the form as a CPU, GPU, QPU, and the like. In various embodiments, each injection segment may be associated with a rail system, such as including one or more grooves or rails, into which a later injection segment may be fitted within a former. To assist in such retracting (or extending), rollers or wheels 76, sprockets and/or gears 64*b* may be provided. A number of linkage elements, such as a belts, chains, and the like, may also be provided, such as where the wheel and rail system elements are configured for acting in concert to allow the various panel segments of the injection fork system to move in relation to one another.

Particularly, as depicted in FIG. 2F, each panel segment 62*c-n* may have a top and a bottom surface, and a number of linking elements 63*d*, which may include rails and/or rollers (not shown). Where included the rails and rollers may be positioned on respective top or bottom surfaces of each segment. In this manner, each conveyor segment may include a rail on a bottom surface and/or rollers on a top surface, such as where the rollers are configured for being fit within a groove of the rail 63*a*. In a manner such as this, as depicted in FIG. 3C, the rollers or wheels 76 on one segment, e.g., on a top portion of the segment, can be configured so as to fit within the groove, e.g., positioned on a bottom portion, of the next segment. Thereby during translation, the rollers 76 can rotate within each respective rail causing the segments to move in relation to one another. More particularly, in particular embodiments, the rail of a bottom surface of a first segment may have a groove or channel traversing a perimeter edge of the rail, whereby the rollers 76 positioned on a top surface of a second segment may be configured for fitting within the channel of the rail 63*a* such that as the second segment moves in relation to the first segment, the rollers rotate within the channel. In such an instance, the rollers may include one or more rotational elements or wheels that are situated in a plurality of rows of rotational elements that are positioned at a distance from one another in a manner so that the rollers may be easily fitted within the grooves forming the channels on opposing edges of the respective rails.

As can be seen with respect to FIG. 3A, an autonomous translating platform 70, such as a mobile positioner, e.g., gantry, may be composed of a framework or housing, such as a rolling frame 71. The rolling frame 71 may be composed of a plurality of frame members such as a base member 70*a* as well as one or more sidewalls 70*b*. In certain instances, each of the base 70*a* and side wall 70*b* members may be composed of a number of frame elements 71*a*-*d*, and 72*a*-*c*, respectively. Particularly, the base member 70*a* may be outlined by a plurality of perimeter frame elements 71*a*-*d*, such as in an opposed relationship to one another, such as in the configuration of a square, or rectangle, triangle, or other suitable shape. Likewise, one or more side wall members 70*b* may be included as well, such as where each sidewall 70*b* may also be outlined by a plurality of perimeter frame elements 72*a*-*c*, such as in an opposed relationship to one another, such as in the configuration of a square, or rectangle, triangle, or other suitable shape defining an opening, e.g., an opening through which an injection platform 60*b* may be inserted. In various embodiments, the bottom base member 70*a* may be employed without the sidewall member 70*b* so as to form a motorized injection platform, as exemplified in FIGS. 2B, 2C, and 2D.

In other embodiments, as depicted in FIGS. 3A-3F, the rolling base member 70*a* may be coupled with the side wall member 70*b* to form a rolling frame 70 or gantry. Accordingly, in particular embodiments, the gantry 70 may be composed of a base member 70*a* that is constructed in the shape of a square, and may further include at least one sidewall 70*b* that may also be in the shape of a square, such as where the sidewall 70*b* is coupled to the base member 70*a* so as to be normal thereto. In such an instance, the sidewall 70*b* and base member 70*a* may share a bottom perimeter frame element 71*a*, such as where the sidewall 70*b* may be positioned normal to the base member 70*a*, and an opening may be framed there between such that an end portion of the conveyor system 60 may be fitted therein, as depicted in FIG. 2E. In various instances, one or more of the base member and sidewall may include solid floor or wall and may further include a cover, such as an equipment cover, spanning the distance from opposing frame elements 71, 72.

In various instances, one or more of the frame elements, such as a top frame element 72*b* of the sidewall member 70*b* may be configured so as to form a positioning element support member 72*b*, depicted herein as a horizontal gantry bar 72*b*. Further, the horizontal gantry bar 72*b* may form a support for a further, e.g., vertical, gantry bar 72*d*. In these regards, as depicted in FIG. 3B, the horizontal gantry bar 72*b* and the vertical gantry bar 72*d* may together form a support for an automated positioning element 22, such as a robotic arm, as depicted in FIG. 3B. As can be seen, the vertical gantry bar 72*d* may be coupled directly to the horizontal gantry bar 72*b* via a translating bracket 74.

As described in further detail herein below, the translating bracket 74 includes a top and a bottom surface, in this instance each of which has a set of rollers or wheels 76 integrated there with. Additionally, each of the horizontal 72*b* and vertical 72*d* gantry bars have corresponding grooves into which the rollers 76 of the translating bracket 74 may be fitted. Specifically, the rollers 76 to be fitted into the grooves of the vertical gantry bar 72*d* may be oriented vertically of the front surface of the translation bracket 74, and the wheels 76 on the back surface to be fitted into the grooves of the horizontal gantry bar 72*b* may be oriented horizontally. Each set of rollers may be electronically or mechanically coupled to a motor 25 and/or gearing the activation of which effectuates the movement of the rollers, which in turn causes the movement of the associated gantry components. For instance, movement of the vertically positioned rollers 76 cause the vertical gantry bar 72*d* to move vertically, up or down, relative to the bracket 74. Likewise, movement of the horizontally positioned rollers 76 cause the horizontal movement of the bracket 74 relative to the horizontal gantry bar 72*b*, which consequently causes the vertical gantry bar 72*d* to which the translating bracket 74 is attached to also move horizontally.

However, as depicted in FIG. 3A a transverse gantry bar 72*e* may also be included, such as to offset the vertical gantry bar 72*d* from the horizontal gantry bar 72*b*. In such an instance, the horizontal gantry bar 72*b* may be configured for allowing an associated gantry bar, e.g., an offset gantry bar 72*e* or a vertical gantry bar 72*d*, to translate left and right, horizontally. When included, the offset, or transverse, gantry bar 72*e* will allow an associated vertical gantry bar 72*d* (or positioning element 22) to move in and out, such as along the Z axis, transverse to the horizontal gantry bar 72*b*. When the transverse gantry bar is not included, the vertical gantry bar 72*d* may be coupled directly to the horizontal gantry bar 72*b*, whereby the vertical gantry bar 72*d* may be translated horizontally directly along the horizontal gantry bar 72*b*. Further, when coupled to a positioning element 22, the vertical gantry bar may allow the positioning element 22, to translate up and down, vertically. Collectively, therefore, the horizontal gantry bar 72*b*, will allow an associated positioning element 22, e.g., which may be via a vertical 72*d* or a transverse 72*e* gantry bar 72*e*, to move laterally left and right; the vertical gantry bar 72*d* will allow an associated positioning element 22 to move up and down, and the transverse gantry bar 72*e* will allow an associated positioning element 22, e.g., which may be via a vertical gantry bar 72*d*, to move in and out.

For these purposes, each gantry bar may include a translating bracket 74 that couples two of the gantry bars together, whereby the movements of respective gantry bars relative to one another may be effectuated by movement of the translating brackets 74. Therefore, the translating bracket 74 may be coupled with a motor 25*a*, which motor 25*a* may be configured to cause the bracket 74 and associated gantry bar to translate. In particular instances, these movements may be directed or guided through a tongue and groove configuration, such as where each of the gantry bars may include a groove configuration and the translating bracket 74 may include an elongated tongue or rail configuration. In such an instance, the extended rail portions on the translating bracket 74 may be fitted within the groove of the gantry bar so that movement may be guided along the grooves. In certain embodiments, e.g., where a translating bracket is not included, each gantry bar may include both grooves and rails whereby the gantry bars can be translated with respect to one another via respective grooves and rails.

Therefore, as depicted in FIG. 3A, in one embodiment, the various gantry bars may be translationally coupled to one another through a moveable translation bracket 74. For example, the plurality of transverse gantry bars 72e may be coupled to the horizontal gantry bar 72b via a pair of translational brackets 74. Particularly, each translation bracket 74 may include a pair of surfaces, such as a top and bottom surface, where one or both surfaces may include one or more rail and/or groove configurations. Consequently, each transverse gantry bar 72b may be coupled to the horizontal gantry bar 72b via a dedicated translation bracket 74, and the transverse gantry bar 72e may be moved left to right, horizontally, along the horizontal gantry bar 72b, such as where a first set of rails, e.g., horizontal rails, on a first, e.g., bottom, surface of the translating bracket 74a is fitted within the groove of the horizontal gantry bar 72b. Likewise, each transverse gantry bar 72e may be moved inwards and outwards, relative to respective translating brackets 74a, such as where a second set of rails, e.g., longitudinal rails, on a second, e.g., top, surface of each translating bracket 74a fits within the grooves of the transverse gantry bar 72e.

Accordingly, when a vertical gantry bar 72d is associated with the transverse gantry bar 72e, via a second set translating brackets 74b, the vertical gantry bar 72d may be moved inwards and outwards relative the horizontal gantry bar 72d, such as through the rail and groove configuration described above. A second set of translating brackets 74b, therefore, may be included, such as for coupling the vertical gantry bar 72d to the transverse gantry bar 72e. In such an instance, the second translating bracket 74b may have extended vertical rails that may be fitted into corresponding vertical grooves of the vertical gantry bar 72d, whereby the vertical gantry bar may be moved up and down vertically. It is to be noted, the rail and groove configurations can be switched between the gantry bars and translation platforms.

Each of the translating brackets and each of the gantry bars may be coupled with associated motors 25 for effectuating the aforementioned respective movements. Rollers or wheels 76 may also be associated therewith, such as coupled to the brackets, e.g., the rails of the bracket, and the rollers 76 may be fitted within the grooves, such as where the motors 25 cause the rollers 76 to move, which in turn causes the respective movements of the gantry bars and/or associated moveable brackets. Alternatively, as depicted in FIG. 3C, the movement of a translating bracket 74 may be effectuated by a motor 25 and gearing 64b that translates circular motion of the motor to vertical or horizontal motion, e.g., of a notched rail system 64d with which the translating bracket is coupled. Specifically, the motor may have a first spindle or sprocket that rotates horizontally, which horizontal motions cause a second associated spindle to rotate vertically. The second spindle may be coupled to a notched rail that is moved upwards or downwards at the second spindle rotates. The opposite configuration can be deployed so as to effectuate horizontal motion. In a manner such as this, the motor 25 and rail system 64 can translate circular motion into horizontal or vertical motion, as depicted in FIG. 3C. In this manner, each of the gantry bars may be moved with respect to one another. Additionally, where a positioning element 22 is coupled to a gantry bar, the different movements of the gantry bars will effectuate the movements of the positioning element 22 along all three cartesian axes, X, Y, and Z, as described herein.

Specifically, the translating coupling members 74 in association with respective gantry bars may effectuate the movements of a positioning element 22 coupled to one of the gantry bars. Particularly, a positioning element 22 associated with a gantry bar may be moved horizontally, such as by the coupling mechanism, e.g., translation bracket 74b, being associated further with the horizontal gantry bar being driven by a motor 25 to move left or right, horizontally. As the gantry bar coupled to the positioning element is moved left or right by its association with the translating coupling member 74, then the attached positioning element 22 will also be moved left or right, e.g. without the positioning element being engaged to move. Hence, where the positioning element 22 is coupled to a transverse gantry bar 72e, which transverse gantry bar 72e is associated with the horizontal gantry bat 72b via a moveably coupling with the translating coupling member 74, then the positioning element 22 can be moved horizontally along an X-axis by the transverse gantry bar being moved by the translating coupling member 74 being moved left to right in relation to, e.g., along, the horizontal gantry bar. Further, the positioning element may also be moved in and out along a Z-axis by the translating coupling member 74 moving the transverse gantry bar 74 forwards or backwards with respect to the transverse coupling member 74, which in this instance does not move. Likewise, where the positioning element 22 is coupled to a vertical gantry bar 72d, which may further be associated with a transverse 74 or horizontal 72b gantry bar via a second translating coupling member 74, then the positioning element 22 may be moved vertically up or down along a Y-axis by the second translating coupling member 74 causing the vertical gantry bar 72d to move up or down relative to the second translating coupling member 74, which in this instance does not move. As indicated above, all of these movements may be effectuated by dedicated motors 25 being associated with respective gantry bars and translating coupling mechanisms, and as further indicated each motor may be controlled by a dedicated 26 or collective control unit 65, which may include a communications module 89 in communication with the analytics module 93 of the system.

Accordingly, in various of these configurations, the movements of the positioning element 22 may be directed, by the analytics module 91 of the system, with respect to the movement of the gantry support bars 72, in all of the X, Y, and Z coordinates and orientations, as directed by the analytics module 91, and once appropriately positioned, the positioning element 22, e.g., robotic arm, can then be manipulated, moved, and orientated, e.g., in six different axes, independently from the gantry system 70. The movements of the gantry support bars 72 is both unique and important, because they provide a substantial amount of support to the robotic positioning element 22, allowing it to pick up much heavier objects than the positioning element 22 would otherwise be able to pick up without this moveable support system. Specifically, using various gantry bar support members, e.g., 72b, 72d, 72e, to move and position an associated positioning element 22 provides both support and leverage for the positioning element 22 so that it may be better positioned to lift objects without being over extended. In this manner, the positioning element 22 may be better positioned.

In this manner, the gantry support members 72 can be maneuvered to more stably position of the robotic arm 22 where it can more easily place a parcel, regardless of the parcels weight, without error or fatiguing or straining any of the segments of the robotic arm 22. Without these supports, all the weight of the parcel would have to be born solely by the components of the positioning element 22, which dependent of the weight, may not be able to efficiently and/or accurately place the parcel. However, by use of the gantry support bars 72 this weight may be placed on the stronger, more solid gantry support members 72. In various embodiments, one or more, e.g., each, of the gantry members may be rotationally coupled to one another. In such an instance, the translating coupling member 74 may further be configured for effectuating rotational moment.

In any of these instances, the positioning element 22 may be coupled via a suitably configured movable coupling mechanism, e.g., such as a translating coupling mechanism, to any gantry portion and then can be translated with respect thereto. These configurations are useful especially where the parcels are being placed in an ever-growing stack of parcels, whereby parcels need to be lowered or raised, dependent on the size of the stack, and orientated, dependent on the configuration of the stack openings and the parcel to be placed. In such manners, heavy objects can be lifted or lowered, moved left or right, or positioned forwards or backwards, and even rotated by movement of the gantry support bars, all without engaging the positioning element 22, and once in the relatively appropriate position and/or orientation, the positioning element 22 can be engaged to make the fine motor movements required to snuggly place the parcel within an appropriately configured space, and thus minimizing strain on the positioning element 22.

Thus, the robotic positioning arm 22, and/or gantry bars 72, are also capable of rotating with respect to one another. In particular implementations, rather than being included in a mobile platform, a gantry support member 72 may be provided by itself, as a gantry pole isolated form the movable gantry framework. For instance, a gantry pole, e.g., 72d, 72e may be employed in conjunction with a bridging system 80, and the like. This gantry pole 72 can be configured in the same manner as any gantry member, but may be independent therefrom, such that it forms a pole, track, and rail system, whereby an associated positioning element 22 can be positioned up and down the pole, through one or more motors 25, gears 64b, and/or chains, belts, wires, and the like, along with one or more controllers 26, such as a processing element, such as in communication with a loading system master control unit 65 embodied by a CPU, GPU, QPU, and the like.

In any of these instances, although the configurations may differ, the main function of the gantry bars 72 is to provide support for the positioning element 22, so as to take the strain of the majority of the weight of packages capable of being loaded and unloaded. Typical systems of the past have focused either on light weight packages, and thus, did not include such support members, or they focused on heavy objects, and did not employ a gantry at all. Rather, full blown robotic transport vehicles have been used, which are very expensive, and therefore cost prohibitive. The present systems, therefore, use a specialized automated gantry system 70 that is especially useful for pick and placing light parcels, such as of about 1 or 2 or 5 to about 10 to 30 pounds, including about 15 to 25 pounds, such as about 20 pounds, such as using a lightweight automated positioning element 22, which need not be associated with one or more gantry support members, but may be associated with a light weight motorized base member 70a, as described above.

Further, the specialized automated gantry system 70 is especially useful for picking and placing medium to heavy weight objects, for instance, of about 30 to 80 or 100 pounds, such as about 40 to about 70 pounds, including about 50 to about 60 pounds, including about 55 pounds, such as by including a number of gantry support members, such as where the heavier the objects to be moved the more or thicker the gantry supports deployed. Additionally, the present specialized automated gantry system 70 can also be configured in a more solid framework so as to be able to lift much heavier objects, such as from about 50 pounds to about 200 or even 300 pounds, such as about 75 to about 175 pounds, for instance, from about 100 pounds to about 150 pounds, including about 125 pounds. In these regards, the composition of the materials from which the gantry 70 and/or positioning element 22 components are fabricated, as well as how they are structured, may be of such a manner as to be able to support march larger weights of parcels to be picked and placed.

For instance, for picking and placing lighter parcels, the various components of the lightweight version of the gantry 70 and/or positioning element 22 may be composed of plastic, polypropylene, polycarbonate, aluminum, carbon fiber, titanium, and other light weight metal, plastics, or other materials. However, in the medium to heavy weight gantry 70 and/or positioning element 22 model, e.g., for picking up parcels in the medium to heavy weight category, the various components of the heavyweight version of the gantry 70 and/or positioning element 22 may be composed of steel, reinforced steel, and other heavier weight metal or other materials. Various support members of the gantry system 70 can also be fabricated of the same materials, for the same purposes.

Further, to decrease weight but to increase structural integrity, one or more components of the positioning element 22 and/or gantry system 70, may be a solid core, or the core may be hollow. However, in certain instances, the core may have a honeycomb configuration, e.g., that is midway between hollow and solid, so as to allow the gantry 70 and/or positioning element 22 to be stiff enough to be able to pick up heavier parcels, while at the same time decreasing the weight of the positioning element and/or its components. In such instances, the core may be composed of a heavier metal, such as steel, reinforced steel, or may be composed of a lighter material, such as plastic, polypropylene, polycarbonate, aluminum, carbon fiber, titanium, and other light weight metal, plastics, or other materials. Additionally, a light weight core can be used in a heavy duty or light weight gantry 70 and/or positioning element 22 component, and likewise, a heavy duty, heavy weight core can be used in a light weight or heavy duty gantry 70 positioning element 22 component, and vice versa. Reducing the weight of the gantry and/or positioning element components, while increasing its structural integrity is useful because it allows for a greater weight to be attributed to the parcel, because accounting for the weight of the positioning element is lessened. Further, decreased weight results in a decrease in wear and tear of the joint features, motors, gearing, and the like.

In various instances, the positioning element components can be fabricated using 3-D printing. Such as with respect to the outward bounding member of the gantry and/or positioning element, e.g., outer surface, or the inner honeycomb core. This, therefore, decreases the time and expense of fabrication. In a manner such as this, a harder, stiffer exterior shell may be fabricated, e.g., with an open inner core, and then a lighter weight, inner, e.g., honeycomb, core can then be fabricated. The two components can then be assembled so as to produce the requisite positioning element and/or gantry support or other system component. Accordingly, the structural components can be composed of lightweight materials, so as to produce lightweight positioning elements, for picking lighter objects, or composed of heavyweight materials, so as to produce heavy weight positioning elements, for picking and placing heavier objects.

In various embodiments, a mixture of light weight and heavy weight positioning elements and gantry components may be used, such as where a light weight robotic arm is employed on one portion of the gantry or bridging element, and a heavy weight robotic arm may be used on another portion. This allows for a greater range of parcel sizes, weights, and configurations to be picked up. Additionally, light weight, smaller, medium, and heavy duty, bigger motors may be employed in like manner so as to increase the drive and fortitude of the motors on the heavy duty and light weight gantry and/or positioning element components 22.

In these regards, the gantry bar support members 71 and/or 72 can be fabricated in the same manner, such as where steel, solid core support members may be employed in combination with lighter core positioning elements 22, where the lighter core support members are coupled to heavier duty support members 71 or 72. Alternatively, lighter, thinner core gantry support members 71 or 72 may be coupled with the lighter positioning element components, which is useful were space is limited, and lighter weight is desirable, and the reverse configurations can also be employed. In this manner, the footprint and weight of the gantry 70 can be decreased, e.g., compressed in size, using less material, but the footprint and size of the positioning element 22 may be maximized, allowing for heavier objects to be picked and placed at a greater range than has heretofore been the case, thereby allowing the present robotic arms to lift heavier and extend further.

Figure 3D:
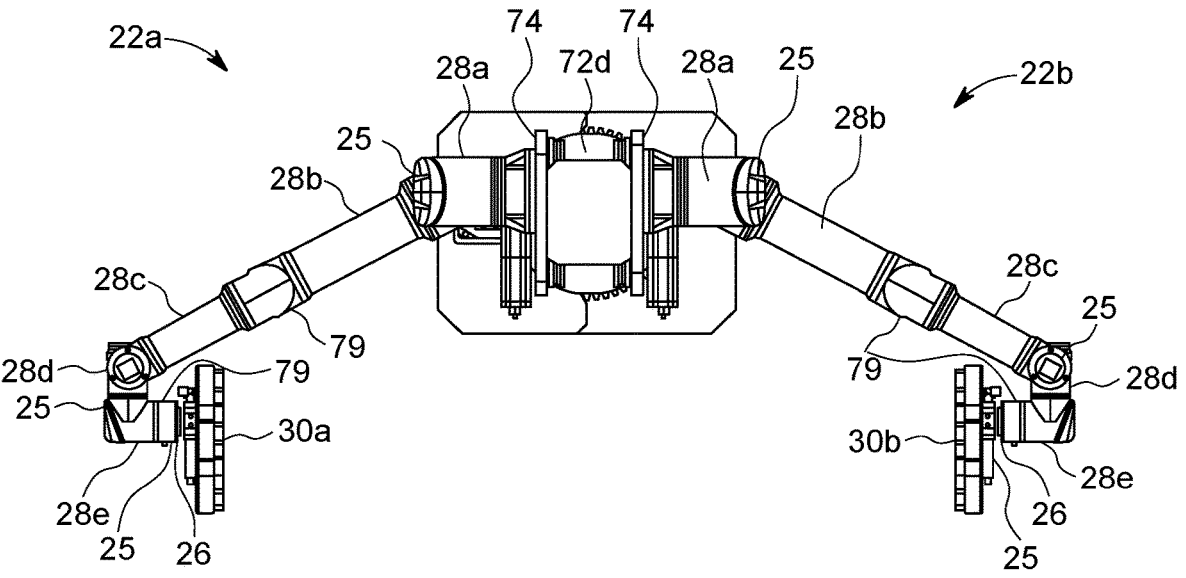
FIG. 3D presents a top down view of the plurality of exemplary positioning elements of FIG. 3C.

Also, where a plurality of positioning elements 22 are provided, such as for picking up objects in concert, as depicted in FIGS. 3C and 3D, the weight of the object can be distributed between the two arms, thus allowing for the picking and placing of objects of a greater variety in size, shape, weight, and configuration, than has heretofore been achievable. Further, where a multiplicity of positioning elements 22 are provided, such as for being employed independently from, but in concert with, one another, twice the amount of work can be done in half the amount of time. Thus, the present system is configured for allowing the deployment of two, three, four, five, and more positioning elements 22 to be deployed at any given time, thereby exponentially reducing the time it takes to load or unload a haul.

Another benefit of the present system and configurations, is that they increase the efficiency of the picking and placing operation. For instance, the present system and configurations will allow a greater percentage of capacity to be utilized, at a decreased time of packing. This pushes the boundaries of what is considered as full capacity. For example, as indicated, the national acceptance of "full" capacity is when 50% capacity is achieved. However, utilizing the present technologies, full capacity can be increased upwards of about 55%, about 65% upwards of about 75%, about 80%, about 90%, and even upwards of about 95% or more, thereby, substantially decreasing the void space present. Further efficiencies can be achieved by more fully solving the 3D-BPP, as disclosed herein below, thereby allowing the packing of shipping conveyances more efficiently, allowing a wider variety of boxes, or other irregularly shaped containers, to be used by retailers and/or packaging companies to reduce void space.

Specifically, in these regards, such efficiencies in decreasing void space, can further be implemented by the present automated packing apparatuses can be achieved at decreased timing, thereby further increasing packing efficiency over time, such as by over 10%, or 20%, or about 30% or about 40%, and even greater than about 50%, 60%, 70% or more. Consequently, the present technologies described herein provide devices and systems as well as their methods of use for picking and packing a number of parcels, such as 25, 50, 100, 1000, 2000 or more parcels, so as to achieve greater than 50%, such as greater than 60%, greater than 70%, including greater than 80% to 90% capacity, at greater than 80% efficiency, e.g., utilization of space, such as greater than 85% efficiency, for instance, greater than 90% to 95% efficiency and above, such as within 20 hours or 16 or 15 hours, 10 hours, within 8 hours, such as within 6 hours or 4 hours or even 2 or 1 hour of packing operations. What this means is that the usage of daily laborers can be greatly decreased when finishing the picking and packing operations when the automated system is no longer operable, such as reducing the manual labor portion of picking and packing, by about 20%, 30%, 40%, 50% up to about 60%, 70%, about 80%, about 90% or 95% or more.

As discussed in greater detail below, the exact grasping and positioning action will largely be determined by a suitably generated picking and placing model generated by the analytics module 91 of the system. The model can direct the positioning, orientating, aligning, and placement of the various components of the system, e.g., intelligent gantry 70, positioning element 22, and gripper 30, such as with regard to a parcel's X, Y, and Z coordinates and orientation. Particularly, parcel data may be collected by the various imaging devices of the system, whereby its dimensions and orientation may be determined, as discussed herein. Then its weight, movements, and relative positioning may be determined by the various scanners of the system. This data may be fed into the analytics module 91 of the system, by the various communications modules of the system, and the analytics system 91 will be able to determine how each component of the system 1 will need to be moved, orientated, and positioned, at what speed, over what distance, and at what time so as to be able to efficiently pick up and place the objects as they come into view. Specifically, the analytics system 91 will generate instructions detailing the parameters of movements of the components of the system and communicate those instructions to a master, system wide, control unit 92, which may then communicate those instructions to sub system control units 65, e.g., system operations management control units, which in turn can transmit directions the various component dedicated controllers 26, e.g., system operation implementation controllers or control units 26 associated with each individual component, which individual controllers 26 act individually but also collectively to direct all of the components of the picking and placement system with respect to their movements, orientations, positioning, configurations, and the like, so as to move the parcel into the position and orientation to be picked and placed.

For example, as depicted in FIG. 3C, the horizontal 72b, transverse 72e, and/or vertical 72d gantry bar members may have a generally square or rectangular shape and, therefore, may include a plurality of opposed perimeter members, e.g., vertical and horizontal perimeter members, such as to form a square, rectangle, or other such shape. In particular embodiments, one or more of the perimeter members may include a groove and/or rail, such as a groove forming a linear guide for a corresponding rail, which rail may be associated with one or more wheels 76. As described above, the groove and rail configuration may be implemented for effectuating a moveable coupling between a perimeter, support member of the gantry 70 and a coupling member, e.g., 74, of the positioning element 22. Particularly, each gantry perimeter member may include a linear guide within which guide a roller 76 of the coupling member of a bracket, or the positioning element itself, may allow the positioning element to move, upwards and downwards, in the vertical direction, or side to side, in the horizontal direction, inwards and outwards, dependent on the gantry member configuration. In this regard, the positioning element 22 may be coupled in movable relation to the gantry bars 72, such as by having a translating coupling element 74 with a projecting portion, e.g., an extended rail or roller portion 76, that is configured for being fit into a groove of the linear guide rail.

Consequently, as depicted in FIG. 3A, in view of this groove and ledge or wheel configuration, the positioning elements 22a and 22b may be moved upwards and downwards along the groove(s) in the perimeter portion of the vertical gantry bar 72d relative to vertically placed wheels 76 on a perimeter or surface, e.g., front surface, of a translation bracket 74b to which the vertical gantry bar 72d is coupled. Likewise, the vertical gantry bar 72d may be moved horizontally along the horizontal gantry bar 72b, such as by the horizontal movement of the transverse gantry bar 74e relative to the horizontal gantry bar 72b, such as where the vertical gantry bar 72d that is coupled to the transverse gantry bar 72d remains stationary. The movement of the transverse gantry bar 72d may be effectuated by another groove and wheel configuration, whereby wheels 76 positioned horizontally on a perimeter or surface member of the translating bracket that couples the transverse gantry bar 72d to the horizontal gantry bar 72b are fitted within grooves of the horizontal gantry bar 72b. In this manner, the spinning of the wheels 76 of the translating bracket 74 within the grooves of the horizontal gantry bar 72b cause the bracket 74 and the associated transverse gantry bar 72d to move horizontally.

In these embodiments, the horizontal gantry bar 72b allows for horizontal movement of the transverse gantry bar 72e, and associated vertical gantry bar 72d, as well as the movement of an associated positioning element 20, along the horizontal axis. Likewise, the vertical gantry bar 72d allows for vertical movement of the positioning element 20, such as along the vertical axis. And the transverse gantry bar 72e allows for in and out movement, e.g., of an associated vertical gantry bar 72d and/or positioning element 22, along the Z axis. Further, as can be seen with respect to FIG. 3A, any gantry bar may be coupled to any other frame member, e.g., gantry bar, of the automated translating platform 70, via a rotational coupling mechanism that allows the gantry bar to be able to rotate in relation the gantry 70. One or more digital, electronic, and/or mechanical motors 25 along with one or more processing controllers 26, which may be embodied in a CPU, GPU, etc., may also be provided so as to control such motors and effectuate said movements.

Further, as can be seen with respect to FIGS. 3C and 3D, in various embodiments, an autonomously controlled loading system 20 having one or more, e.g., two, positioning elements 22a and 22b, may be included, such as where each positioning element 22 may include a number of arm segments 26 that are coupled to one another by one or more joint elements 27, which may further include one or more mechanical, electronic, and/or digital motors 25 therebetween, such as for automating linear and rotational movements of one arm or segment, e.g., 28a, with respect to another, e.g., 28b. As depicted, a gantry support member is provided, which in this instance is configured as a vertical gantry support member 72d. The vertical support member 72d is moveably coupled to a gantry carriage 79 so as to form a rotational coupling mechanism. In this manner, the vertical gantry member 72d may be coupled to another gantry support member via the gantry carriage 79. As can be seen, the rotational coupling mechanism of the gantry carriage 79 may include a motor 25 and gearing 64b, which motor when activated cause a sprocket of the gearing 64b to rotate, thereby causing the vertical support member 72d, and associated positioning elements 22a and 22b to rotate.

Additionally, the automated positioning element 22 may be coupled to the vertical support member 72d via a translating bracket 74. As can be seen, the translating bracket 74 may be coupled with one or more other motors 25 and gearing arrangements 64b, which may include a rotatable spindle or sprocket, such as for effectuating the vertical movement (in this instance), of the positioning elements upwards and downwards along the vertical support member 72d. For instance, each positioning element 22a and 22b may be coupled to the vertical support member 72d via respective first translation brackets 74, and the vertical support member 72d may be coupled to another gantry support member via the rotatable gantry carriage 79. In this manner the vertical support member 72d may move, e.g., rotationally, relative to the other gantry support member to which it is moveably coupled, and each of the positioning elements 22 may move, e.g., vertically, relative to the support member, in this instance, vertical support member 72d, to which they are moveably coupled. These configurations may be adapted to allow for horizontal as well as inward and outward movement where the gantry support member is a horizontal 72c or transverse 72e support member, respectively As can be seen with respect to FIGS. 3C and 3D, one or more positioning elements 22 may be coupled to a gantry support member 71, 72, e.g., via a translating bracket 74. In various embodiments, to effectuate movement, e.g., vertical movement, of the positioning element, a controller 26, motor, 25, a gearing arrangement 64b, and a tongue and groove rail system, which may include rollers 76 may all be included. For example, the support member may include a groove and the translation bracket 76 may include a ledge and/or rollers that fit into the groove. In such an instance, movement of the rollers 76 causes the translation bracket 74 to move, in this instance vertically. Because in this instance the movement is vertical, the grooves and the rollers 76 may be aligned vertically, otherwise they may be aligned horizontally. In particular instances, to effectuate this movement the translation bracket may have a base member that extends beyond the bounds of the gantry support member at a sufficient distance that rollers 76 positioned proximate the perimeter of the base member may be fitted within the grooves and be free to rotate therein. In this instance, a plurality of rollers 76 may be offset from one another and positioned on opposing perimeters of the base member so that the support member is framed in between the two sets of wheels so as to be fitted there between, such as by each set of rollers fits into grooves on opposed surfaces of the gantry support member, as shown in FIG. 4C. Other groove and roller configurations between a base of the translation bracket 74 and the grooves of the support member may also be implemented, such as where a top and/or bottom surface of the base member both include rollers and/or where the rollers are horizontally aligned.

Further, to effectuate movement of the translating bracket 74 relative to the support member, a motor 25 and associated gearing 64b may be included, such as where the motor may cause a spindle or sprocket to spin in a circular motion, and associated gearing 64b may include one or more other sprockets that are configured to interact with one another to transform the circular motion of the motor into linear motion, in this instance, vertical, but it can also be horizontal along an X or Z axis. In particular embodiments, one or more of the grooves may include a first set of teeth elements, and the translation plate may include a second set of teeth elements corresponding with the groove teeth elements. In a manner such as this, movement of the translation plate 74 may be graduated. In particular embodiments, the motor 25 may be configured as a driver that drives a drive rod upwards or downwards, much like cam shaft driving pistons, which upward or downwards motion of the drive shaft causes the translation plate to move accordingly.

The inclusion of a plurality of positioning elements 22, such as coupled to a gantry support member 71, 72, will allow for double the amount of parcels to be picked and placed, as well as up to four or six or more times the weight to be picked up than in a single arm embodiment. Particularly, where the arms are to be used in concert, heavier weight and irregular shaped parcels can be more readily grasped. However, it is to be noted, that the deployment of a plurality of positioning elements makes the solving of the 3D Bin Packing Problem much more difficult as it doubles the work load of the analytics system, which is further complicated in instances requiring a multiplicity of positioning elements to work collectively together. Nevertheless, the analytics system presented herein has been specifically trained to generate instructions that direct the coordinated movements of each of the positioning elements both separately and collectively together along with the movements of the gantry, accounting for the appropriate weight distribution, object shape and grasping orientations, so as to firmly grasp, quickly move, and stably place objects in accordance with one or more picking and placing models. Further, by employing two positioning elements 22a and 22b, double the amount of work can be done, in half the amount of time, when automated and efficiently used, as compared to human laborers.

Particularly, as can be seen with respect to FIGS. 3C and 3D, in various embodiments, the positioning elements 20a and 20b may be configured for moving collectively together, or they may move independently from one another. For example, each positioning element 22a and 22b may be configured as a plurality of robotic arms that can be moved in conjunction with one another so as to be opened, as depicted in FIG. 3C, or moved so as to be closed, as depicted in FIG. 3D, such as for the purpose of grasping an object, such as a parcel or package. Once the package has been grasped, e.g., off of a conveyor system 60, via one or more of the positioning elements 22, the positioning element may be rotated away from the conveyor, toward the haul of a conveyance 100, and the positioning element and grasped object can then be translated, e.g., via a gantry 70, motorized base member 70a, or moveable bridging system 80, into a determined position within a shipping container or skid sled system 88, whereby the positioning element(s) 22, can then be re-engaged so as to place the package into the shipping container directly, or to the skid sled 88, which sled may then be moved into the shipping container, for transportation, as can be seen with respect to FIGS. 7A and 7B.

Likewise, once an object has been placed within a conveyance, the robotic positioning element 22 may rotate back away from the parcels placed in the haul, and toward the conveyor and/or injection system 60, and can then be translated back, e.g., via a gantry 70 or autonomously motorized base member 70a. However, it is noted that in various embodiments, such as where the conveyor 60 is configured as an extendable and retractable forking system 62b, a gantry 70 may or may not be included as part of the system 1. For instance, where the automated positioning elements 22 and gripper units 30 are coupled directly to the forking injection system 60b, e.g., via a motorized base member 70a, and/or a bridging system 88, where the bridging system 88 is extendable into the haul of the conveyance, an intelligent gantry system 70 need not be included. Particularly, in such an instance, a gantry unit 70 need not be employed, as the positioning elements 22 can operate directly from the combined injection 62 and motorized base 70a and/or bridging system 88 directly. However, in various instances, the positioning element may be coupled so as to be employed in conjunction with a translating platform 70.

Figure 3E:
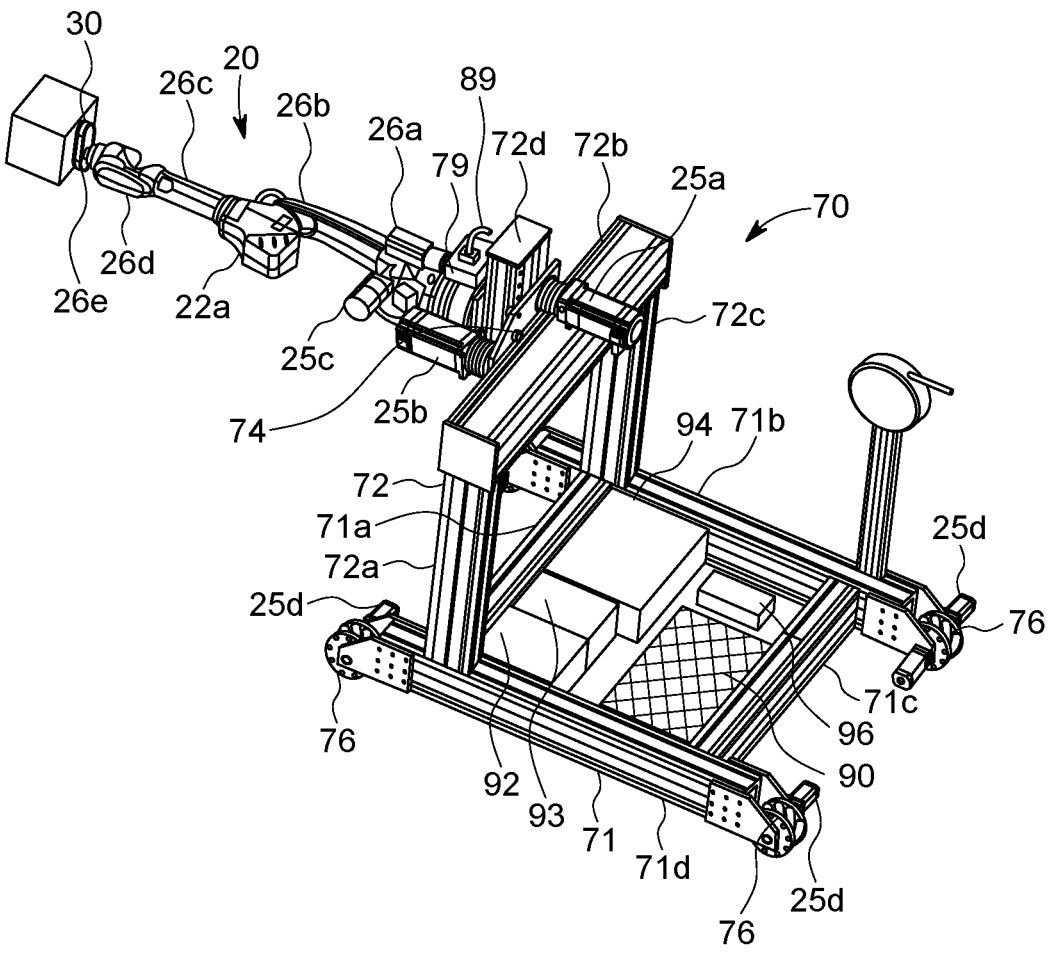
FIG. 3E presents a top-down, perspective view of an exemplary translating platform of the disclosure in combination with a positioning element, gripper, and grasped parcel.
Figure 3F:
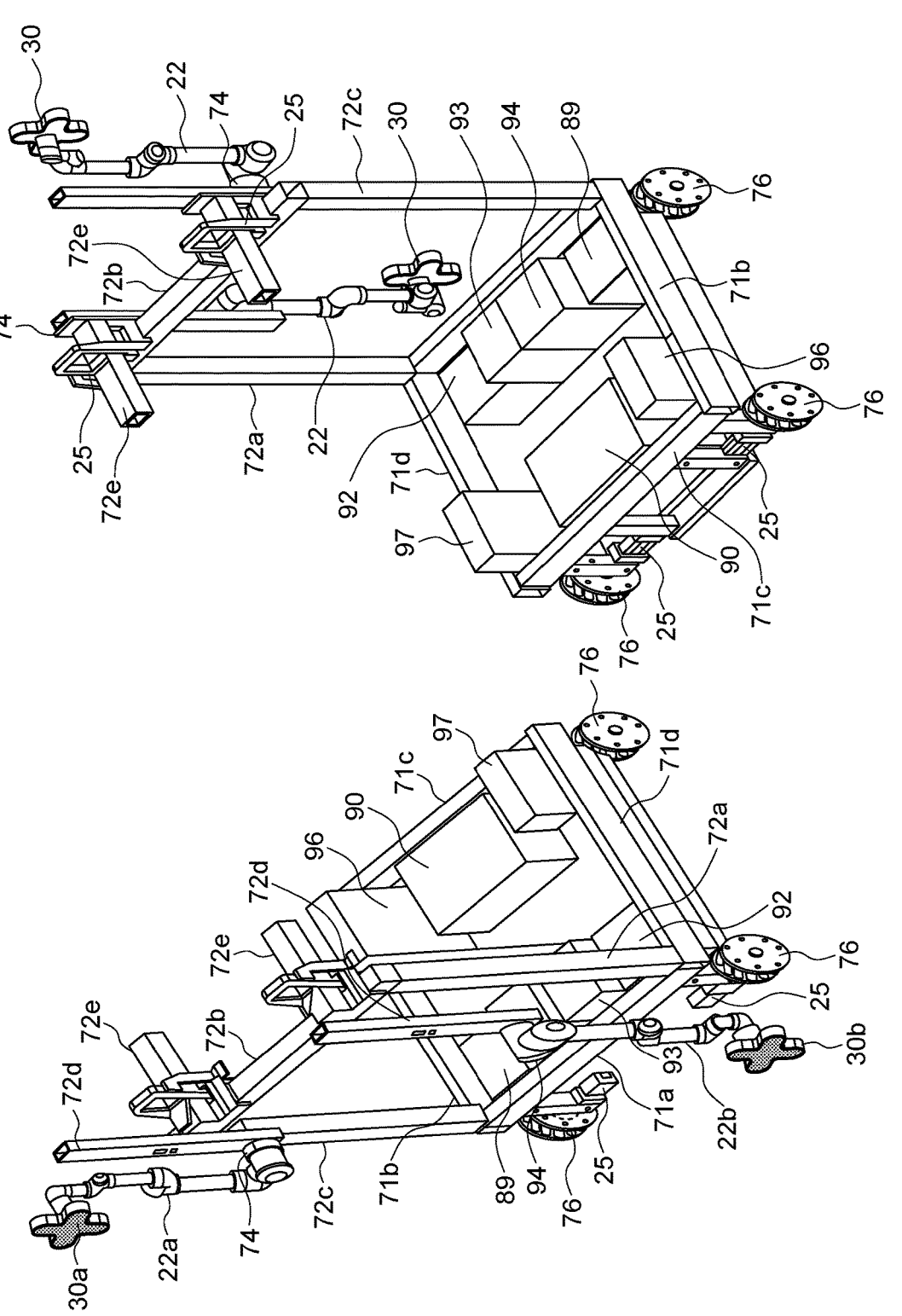
FIG. 3F presents a plurality of perspective views of exemplary translating platforms of the disclosure.

For instance, as shown with respect to FIGS. 3E and 3F, the autonomous loading system 20 may be coupled to a translating platform 70, e.g., a gantry, such by being coupled to one or more of a top horizontal gantry bar 72b, vertical gantry bar 72d, or transverse gantry bar 72e. The loading system 20 may also be coupled to side gantry bars 72a and 72c as well. Such couplings may be directly with the gantry bar or through being coupled with a translating coupling mechanism 74. In this regard, an autonomously controlled loading system 20 may be provided, where the loading system 20 may include a single positioning element 22 (as in FIG. 3E), or a plurality of positioning elements 22a and 22b (as in FIG. 3F). For instance, as depicted in FIG. 3E, the autonomous controlled loading system 20 may include a single robotic arm system (See FIGS. 4A and 4B) having a single robotic arm 22a, which may be mounted on to an autonomously controlled mobile gantry 70, such as by being mounted upon a perimeter frame element 71, 72, e.g., a horizontal gantry bar 72b or vertical gantry bar 72d or transverse gantry bar 72e. However, as depicted in FIG. 3F, the loading system 20 may include a plurality of robotic arms 22a and 22b mounted on to a perimeter frame element 71, 72 of the autonomously mobile gantry 70.

Particularly, as can be seen with respect to FIGS. 3E and 3F, an autonomous translating platform 70, such as a mobile positioner, e.g., gantry, may be composed of one or more housing or frames 71 and 72, which frames may each include a number of frame elements. For example, a bottom frame 70a may be present and composed of a front horizontal bottom frame member 71a, as well as one or more bottom side perimeter frame members 71b, 71d, and a back horizontal bottom frame member 71c. Hence, in various embodiments, the gantry frame 71 may include a base member 70a, which base member 70 may be composed of a plurality of base frame members 71a, 71b, 71c, and 71d. Particularly, the base member 70a may be composed of a plurality of perimeter frame elements, such as in an opposed relationship to one another, which may be in the configuration of a square, or rectangle, triangle, or other suitable shape.

In particular embodiments, each joint or corner of the base member 70a may be coupled to a wheel element 76, which wheel may be coupled to a motor 25d. In a manner such as this, the base member may form a motorized base member 70a. In certain instances, each wheel element 76 may be directly or indirectly coupled to a controller 26, and thus the base member may be configured as an autonomously controlled, intelligent base member 70*a*. In specific embodiments, as depicted in FIGS. 2B-2D, the intelligent base member 70*a* may be coupled to a forking injection system 60*b*, for use in an automated picking and placing operation utilizing a injection fork member 62*b*, and thus, may be configured as a motorized injection base 70*a*.

In other embodiments, the automated base member 70*a* may be associated with a side wall member 70*b*, so as to form an intelligent gantry 70. For example, like the base member, the side wall member 70*b* may be composed of a plurality of side wall members 72*a*, 72*b*, and 72*c*, where the base member 70*a* and side wall member 70*b* may share the front bottom side horizontal frame member 71*a*, such as where the side wall member 70*b* is normal to the side base member 70*a*. In particular embodiments, a side wall member 70*b* may be outlined by a plurality of vertical perimeter frame elements 72*a* and 72*c*, which vertical frame elements may be offset from one another, such as in an opposed relationship to one another, but may be coupled together by a horizontal frame element 72*b*.

In various embodiments, the horizontal frame element 72*b* may be configured so as to be coupled with one or more loading system 20 components, such as an automated positioning element 22, as depicted in FIG. 3E, or a plurality of positioning elements 22*a* and 22*b*, as depicted in FIG. 3F. In various embodiments, the side wall 70*b* frame elements may be configured as a square or rectangle, but may also be configured as a triangle, such as where the two vertical elements 72*a* and 72*c* are inclined toward one another, so as to form a triangle, e.g., which may be formed with or without a horizontal frame element 72*b*. Other suitable shapes and configurations may also be implemented. Consequently, in particular embodiments, the gantry 70 may be composed of a base member 70*a*, which may be constructed in the shape of a square, and may further include at least one sidewall member 70*b*, which may also be in the shape of a square. In such an instance, the sidewall 70*b* may be coupled to the base member 70*a* so as to be normal thereto, such as at a perimeter edge of the motorized base member 70*a*. In such an instance, the associated sidewall 70*b* may be configured such that the frame elements 72*a*, 72*b*, and 72*c* surround an opening through which a portion of a conveyor system 60 may be fitted, such as for ease of implementing a picking and placing operation. In certain instances, one or more of the base member 70*a* and sidewalls 70*b* may further include a flooring and/or covering, such as an equipment cover, spanning the distance from opposing frame elements. The flooring and covering may be useful, such as when the gantry is intelligent and includes a number of control elements, as depicted in FIGS. 3E and 3F.

Specifically, the autonomous picking and placing system 1 may include an autonomously controlled loading system 20, which may include an automated positioning element 22, such as positioned on an intelligent translating platform 70, e.g., gantry, for implementing a picking and placing operation. In such instances, the intelligent gantry system 70 and associated intelligent positioning element(s) 22, in association with an intelligent conveyor system 60, may all be configured to act cooperatively so as to implement a picking and placing operation, whereby parcels to be translated, e.g., by a conveyor system 60, may be positioned proximate a haul of a conveyance, such as by automated movement of the autonomous gantry 70, whereby parcels may then be placed within the haul of the conveyance, as can be seen with respect to FIGS. 2D and 2E. More specifically, each positioning element 22 may include a proximal portion and a distal portion, for instance, where the proximal portion may be configured for being associated with the automated translating platform 70, such as by the positioning element 22 being coupled to a horizontal gantry frame member 72*b*, such as via a suitably configured translation bracket 74 and/or rotational gantry carriage 79. Consequently, the autonomous positioning element 22 may be coupled to an auxiliary frame element, such as to a vertical auxiliary frame element 72*d* or to a transvers auxiliary frame element 72*e* of the gantry 70, such as in a moveable and/or rotational coupling.

In such an instance, as depicted in FIG. 3E, the proximal portion of the positioning element 22 may include a gantry carriage 79 that is configured for coupling the proximal portion of the positioning element 22 to an auxiliary vertical frame element 72*d* in a manner that the positioning element 22 is capable of rotating along an axis that is normal to the vertical frame element 72*d*. The vertical frame element 72*d*, however, may be coupled to a horizontal support member 72*b* of the gantry via a moveable translating bracket 74. In this manner, the moveable bracket 74 may be translated left and right, thereby moving the associated positioning element left and right. Likewise, the rotational gantry carriage 79 may be translated up and down along the vertical frame element 72*d* in a manner analogous to the translating bracket 74. Thus, the gantry carriage 79 may be configured in a manner similar to the translating bracket.

In this manner, the proximal portion of the positioning element 22 may be associated with a variety of different coupling mechanism configurations, such as a translating bracket 74 and a gantry carriage 79, or a combination of both. In such an instance, the coupling mechanism may be configured for associating the positioning element 22 with a gantry frame element 71 or 72, e.g., a horizontal gantry member 72*b*, a vertical auxiliary gantry member 72*d*, or an offset auxiliary gantry member 72*d*, such as in conjunction with a linear guide and roller configuration, as described above. Where the coupling member is configured as a translating bracket 74, one or more motors 25, gearing 64*b*, and/or controllers 25 may also be included, such as for effectuating lateral movement, e.g., along all three axes. Further, where included as a coupling member, the gantry carriage 74 may include a plurality of sprockets, e.g., gears 64*b* and motors 25, which can be positioned in an offset and/or in line manner, or may be positioned in a transverse manner to one another, and may be configured for allowing an associated component, e.g. positioning element, to rotate in relation to that which it is coupled.

Figure 4A:
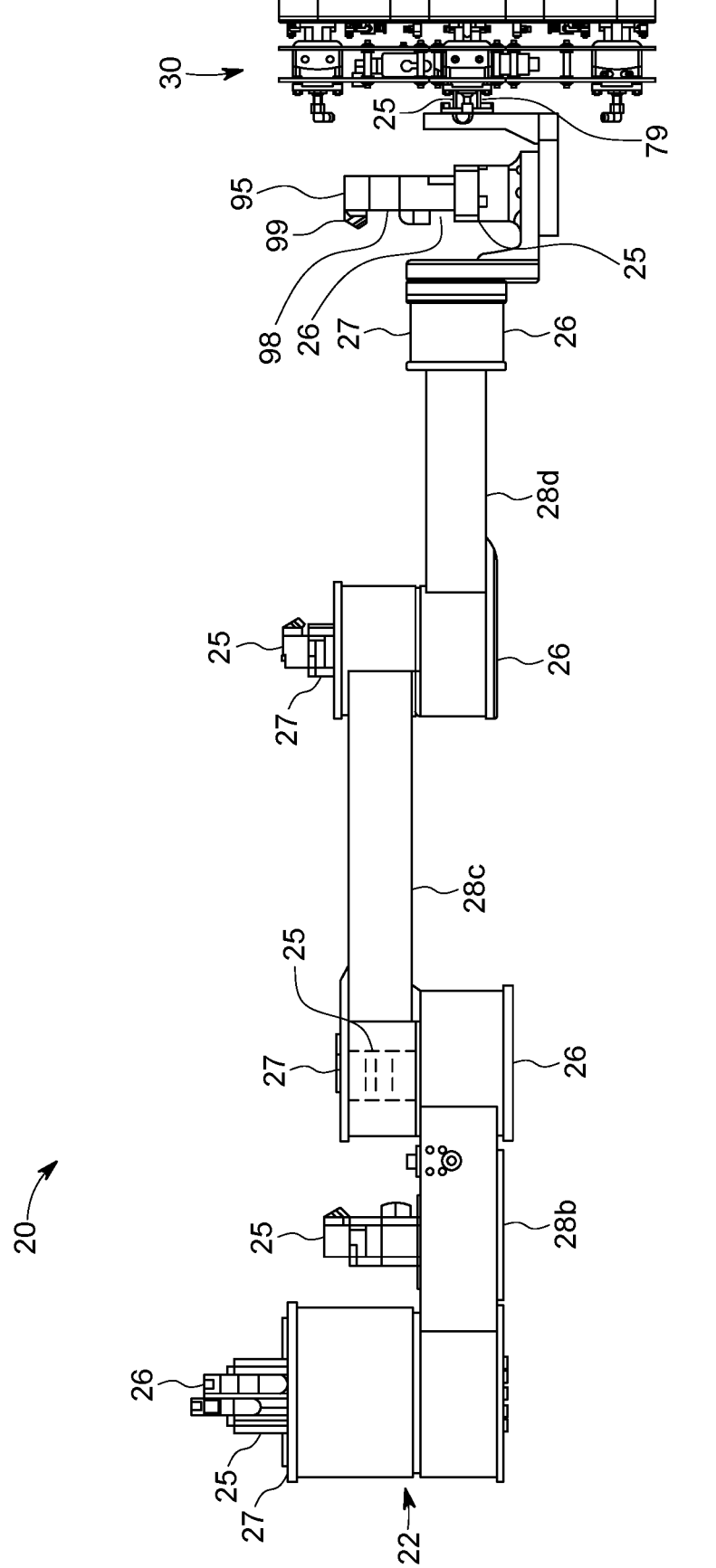
FIG. 4A presents a side view of an exemplary positioning element of the disclosure, configured as a robotic arm coupled to a gripper instrument.
Figure 4B:
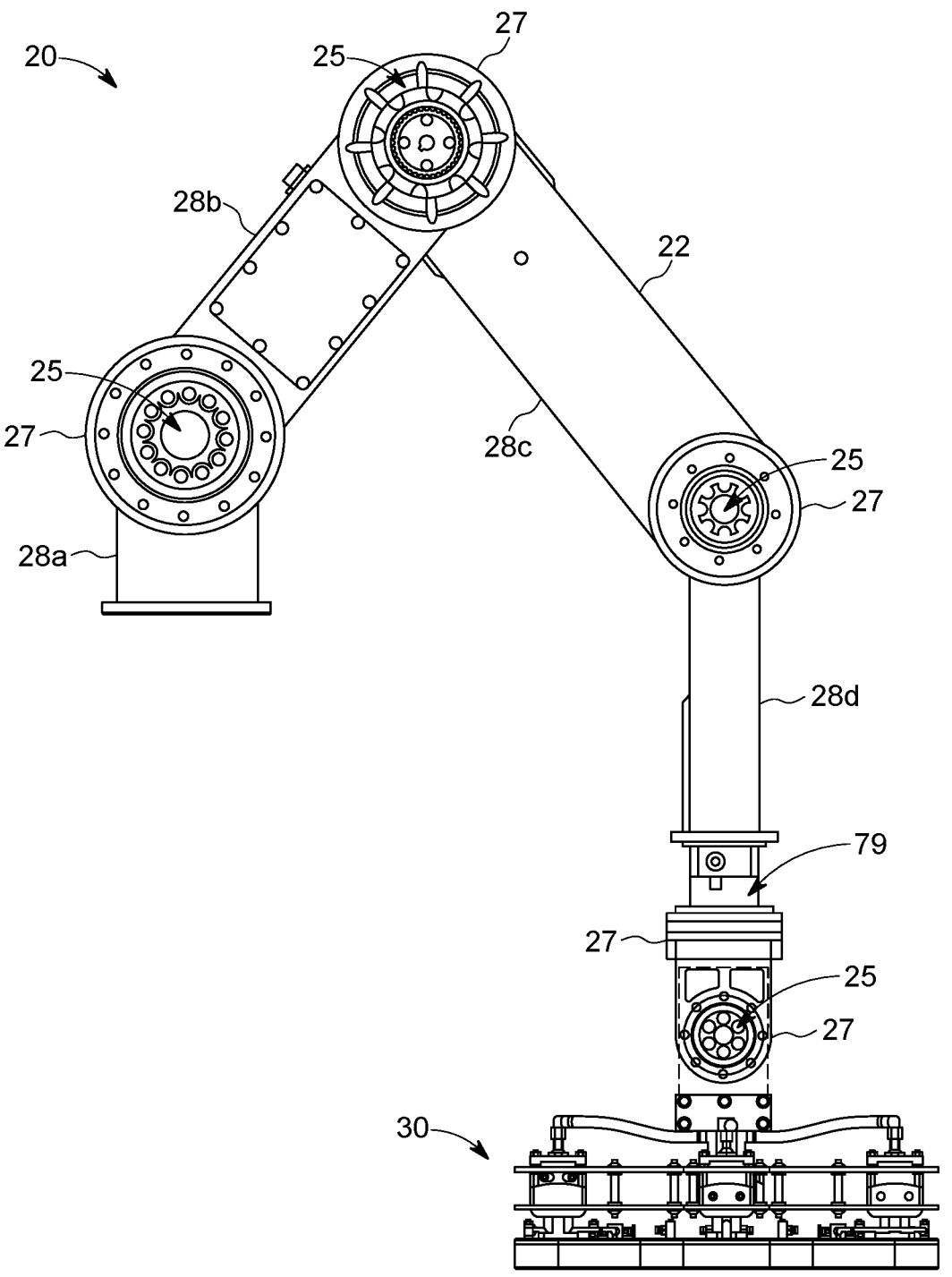
FIG. 4B presents another side view of an exemplary positioning element of the disclosure, configured as a robotic arm coupled to a gripper instrument.

Collectively, the combined translating bracket and rotational gantry carriage may be configured to allow for movement of the positioning element base in the vertical, horizontal, as well as the in and out directions, as well as for allowing rotational movement. Hence, where the positioning element 22 base forms a rotational coupling, e.g., as configured as a gantry carriage 79, rotational movement of the positioning element 22 base may be allowed. Additionally, diagonal movement as well as movement in and out of the plane can also be effectuated via movement of one positioning element segment, e.g., 22*a*, in relation to another, e.g., 22*b*. Likewise, as described above, the distal portion of the positioning element 22 may be associated with an autonomous gripper instrument 30, as shown in FIGS. 4A and 4B. As indicated, in certain embodiments, the positioning element 22 may be autonomous, and thus, may include one or more control units, such as a sub-system master control unit 65, as well as a plurality of component controllers 26 along with one or more motors 25, such as positioned at respective joint portions 27, wherein the controller 26 may be configured for directing the movements of one or more motors 25.

Accordingly, in one embodiment, one or more motors 25, such as a mechanical, electric, or digitally controlled motor and/or gear box 64*b*, may be provided and associated with one or both of the gantry elements 70 and the positioning elements 22. Particularly, in a particular embodiment, the coupling mechanism between the gantry 70 and the positioning element 22, and/or between the positioning element 20 and the griper 30, may be associated with one or more motors 25 and/or one or more gearing assemblies 64*b*. In particular instances, the coupling may further be configured as a rotational coupling akin to the gantry carriage.

For example, a first one or more motors 25 may be provided, such as between the gantry 70 and the positioning element 22, such as where the one or more motors 25 are configured for driving the movements of the positioning element 22 with respect to the gantry 70, e.g., horizontal, vertical, and/or transverse gantry members, as well as directing the movements of the gripping element 30 relative to the positioning element 22. For instance, a second one or more motors may be provided, such as between the positioning element 22 and the gripper element 30, where the one or more motors may be configured for driving movements of the positioning element and/or gripper with respect to the gantry 70 and/or an object to be grasped. Hence, in various embodiments, a plurality of motors may be provided for moving the positioning element along one or more of a horizontal 72*b*, vertical 72*d*, and/or transverse 72*e* gantry member, so as to allow the positioning element to move in the X, Y, and Z planes, as well as to move in a rotational movement around those X, Y, and Z planes. Further, in certain instances, a plurality of motors may be included for moving the gripper 30 in relation to the positioning element 22 such as along a vertical or horizontal or Z-axis as well as rotationally with respect thereto.

Particularly, as can be seen with respect to FIGS. 3E and 3F, the autonomous positioning element 22 may be coupled to the gantry 70 via a coupling mechanism that may further be associated with one or more motors 25, such as an electric motor, which motor(s) may be configured for driving movement of the positioning element 22 such as in a vertical, horizontal, transverse, or rotational direction, such as via an associated gantry frame element. Further, in various embodiments, the motor 25 may be configured for driving rotational movement as well. In certain embodiments, the gantry 70 may include a cable reel, such as where the cable reel is coupled to a cable reel post and/or the motors and gears, and may be configured for assisting in the movements of the gantry and/or associated positioning element 22 and its components. Accordingly, in particular embodiments, the translating platform 70, autonomous loading system 20, and/or gripper instrument 30, may each include a dedicated sub-system master control unit 65, such as for controlling the various components of the sub-system, such as via one or more, e.g., a plurality, of component dedicated controllers 26, such as gantry, positioning element, as well as gripper instrument controllers.

More particularly, as can be seen with respect to FIGS. 3E and 3F, the translation platform 70 may include an entire automation system 90, such as for controlling the overall movement of the retractable conveyor system 60, e.g., with respect to the gantry 70, the movements of the gantry 70, the positioning element 22, and the gripper 30, all in relation to one another. The automation system may be in communication with a system wide master control unit 92, which may be embodied by one or more server cores, such as including a multiplicity of CPUs, GPUs, QPUs, and the like. The system wide master controller 92 may receive all data collected by the system, may aggregate and integrate that data, and then feed the aggregated and integrated data into a system wide analytics system 91 for analyses as well as the generation of one or more picking and placing models. In such an instance, the control unit 92, in conjunction with one or more analytics modules 93 of the analytics system 91, may then generate discrete picking and placing operations that are to be implemented by one or more, e.g., each of the various sub-systems of the picking and placing system 1. In such an instance, operational instructions can then be sent to each sub-system control unit 65, which instructions can then be parsed and directions may then be fed to the various associated sub-system controllers 26 and/or associated motors 25 implicated by the instructions.

In this regard, in specific embodiments, the translating platform 70 may include a sub-system master controller 92*a* and a sub-system master analytics module 93*a*, both of which may also be associated with the system master controller 92, such as via communications module 89. In such instances, the analytics module 93*a* may be configured for receiving instructions from a system wide analytics system 91, as well as for receiving condition data from all of the various sub-system control units 65 and controllers 26 of the various system components that interact with the gantry 70. The condition data received by the various analytics modules 93, 93*a* may include position, movement, orientation, operational, as well as condition data of each component of the autonomous picking and placing system 1. This data may be fed into the analytics module 93*a* of the gantry 70, along with the instruction data, and the gantry control unit 92*a* may take this data and generate on-the-fly instructions for directing the movements of the intelligent gantry 70 as well as the positioning element 22 and gripper 30.

Hence, in a manner such as this, the global analytics system 91, which may be in communication with the mobile analytics module 93*a* of the gantry 70, may collectively determine what fine movements should be performed by which elements, in which orientations, at what time, and during what duration so as to effectuate a given picking and placing task. For instance, the overall analytics system 91 may be a stand-alone system wirelessly coupled, via a gantry communications module 89, to a sub-system master control unit 92*a* of the translating platform 70 as well as to a gantry associated analytics module 93. In such an instance, the analytics processing system 91 may be configured for determining one or more picking and placing models, which models may then be transmitted to a communications module 83 of the intelligent gantry 70 for interpretation by the analytics module 93 and implementation by the gantry master control unit 92*a*.

Accordingly, in various embodiments, in implementing a picking and placing model, finely controlled motorized movements of the positioning element 20 and gripper 30, in accordance with the model, must be effectuated. Consequently, to assist in performing these actions, the gantry 70 may include an automation control unit 94, such as a robotic automation controller, such as for assisting in the directing of the robotic arm 22 and associated griper 30. In various embodiments, the automation control unit 94 may be a small or heavy duty arm automation controller. Additionally, as explained herein, a vacuum and/or compressor unit 96 may also be included for effectuating the movements and engagements of the gripping instrument 30. One or more battery units, e.g., rechargeable battery units 97, may be included, such as for powering the gantry, positioning element, gripper, and other components of the system.

Further, as discussed above, the autonomous picking and placing system 1 may additionally include an autonomously controlled loading system 20 that may be configured as an intelligent positioning element 22, as set forth in FIGS. 4A and 4B. Particularly, in various embodiments, the intelligent positioning element 22 may be configured as a robotic arm. In particular embodiments, the intelligent robotic arm 22 may be coupled with an autonomously controlled intelligent gripping instrument 30, as set forth in FIGS. 5A-5F. Together the robotic arm 22 in combination with the gripper unit, may be configured for acting collectively in a corresponding manner for effectuating the picking of parcels, e.g., off of a conveyor system 60, and for further effectuating the placement of the picked parcels within a conveyance 100, as depicted in FIGS. 2D and 2E. More particularly, herein presented with respect to FIGS. 4A and 4B is an autonomously controlled intelligent positioning element 22, configured as a robotic arm, which as depicted may be composed of a number of arm segments 28.

For instance, in one embodiment, the positioning element 22 may be configured as a robotic arm, which robotic arm may be composed of one or more, e.g., a plurality, of arm segments 28. The plurality of arm segments 28 may be coupled together by one or more joint members 27. In particular embodiments, the positioning element 22 may be automated, and thus, one or more, e.g., each, of the joint members 27 may be coupled with a motor 25, so as to mechanize the movements of the arm segments 28 in relation to one another. In certain embodiments, the positioning element 22 may be intelligent, and thus, one or more of the motors 25 may be coupled to a controller 26, for directing the operations of the motors 25, thereby directing the movements of the robotic arm 22.

Likewise, to better effectuate the directions and movements of the positioning element 22, a sensor module 95 may be included, such as incorporating one or more distance scanners 99 therein, along with an image capturing device 98. In such instances, the image capturing device(s) 98 of the positioning element 22 may be configured for capturing images, e.g., photos, videos, and the like, of the environment within which the positioning element 22 operates, so that a continuous stream of object, position, and movement data are capable of being streamed into the system 1, in part by the imaging 98 and scanning 99 devices, which may then be communicated to an analytics module 91 of the system via associated communications module 89. In response thereto, the analytics system 91 may then generate instructions, which can be fed back to one or more of the intelligent loading system or translation system master control units, and/or associated controllers 25 for interpretation and implementation thereby.

Specifically, as set forth above, data collected by the various positioning element 22 data collectors may be augmented by associated data collected by the various data collectors of the intelligent gantry 70, where included. For example, in like manner, the intelligent gantry 70 may include one or more image capturing devices 98 as well as a sensor module 95 including a distance scanner 99. This information, as well, may be transmitted to the analytics system 91 for analysis thereby, aggregation with the positioning element 22 derived data. Likewise, the intelligent gripper 30 may also include one or more image capturing devices 98 as well as a sensor module 95 including one or more distance scanners 99 for collecting corresponding data from the perspective of the gripper unit 30, which may also be transmitted to the analytics system 91 for analysis thereby, aggregation with the positioning element 22 and/or gantry platform 70 derived data. Collectively these data may be employed by the analytics system 1, and instructions consistent with a picking and placing model may be generated for directing the movements of one or more of the intelligent gantry 70, associated positioning elements 22, as well as intelligent gripper units 30.

Such instructions, once received by the various controllers 26 of the intelligent gantry 70, intelligent positioning element 22, and intelligent gripping instrument 30, may be parsed, interpreted, and individual component instructions may be generated and communicated to respective component controllers for implementation thereby. With respect to the positioning element 22, once received by the respective controllers 25 of the positioning element, the instructions may be implemented so as to direct the movements of each of the arm segments via each of the associated motors 25. Particularly, each of the robotic arm segments 26 may be joined to one another via a moveable joint mechanism 27. In various embodiments, the joint 27 may be a pivot or hinge joint, which will allow the coupled arm members to move, e.g., pivot, one in relation to another, such as in an arc defined by a plane, such as along a vertical or horizontal plane. In particular embodiments, the pivot joint 27 is configured for allowing the coupled segments to move in relation to one another in a plurality of planes, such as along an X, Y, and/or Z plane.

However, in particular embodiments, the joint may be coupled with a rotational element 73, which will allow the joint to both pivot as well as rotate. In various embodiments, the rotation joint may allow the pivot point to rotate in a circular movement so as to allow rotating along one plane, while at the same time allowing pivoting along a second plane. In specific embodiments, the joint 27 may be configured as a swivel joint, such as a ball and socket joint, which will allow the two connected components to swivel, rotate, and bend one in relation to one another. In particular instances, the movements of the robotic arm segments 28 may be coupled by joint members 27 in such a manner that they may move about 6-Axes, e.g., where the positioning element 22 is configured as a 4-6 segment, 6-axis robotic arm. In various instances, the movements may be graduated, so as to be more precisely and finely controlled, such as degree by degree. In such instances, the control instructions can direct the prices movements and orientations of the positioning element 22 within space and in relation to one or more objects to be picked and placed.

As depicted in FIGS. 4A and 4B, the intelligent robotic arm 22 may be composed of any number of arm segments 28, such as 2, 3, 4, 5, 6, or more. Each segment may be of any suitable length, such as from about 2, 3, 4, or 5 centimeters up to about 1, 3, or 4, or more meters, such as from about 8, or 9, 10 cms to about 2 m, including about 30 or 40 cms, to about 1 m or 2 m, for instance about 50 or 60 cms to about 80 or 90 cms, including about 65 to about 75 cms, including about 70 cms. Collectively, the robotic arm may be from about 250 mm to about 10 m or more, such as from about 400 or 500 mm to about 3 or 4 m, for instance, about 1000 mm or 1500 mm to about 1 or 2 m, including about 3000 or 4000 mm to about 6000 or about 8000 mm, including about 5000 mm. In particular embodiments, each robotic arm segment 28 is of uniform length and/or size, but in other embodiments, the robotic arm segments may be of different lengths and/or sizes. The maximum load weight may be from less than about 5 Kg to about 200 Kg, such as from about 10 or 20 or 23 or 25 Kg to about 100 or 150 Kg, for instance, about 30 or 40 Kg to about 70 or 80 Kg, including about 50 to 60 Kg.

For example, as depicted, the robotic arm may be composed of about 4 arm segments 28a, 28b, 28c, and 28d, which may be coupled by three joint members 27, such as where the joints 27 allow the arm segments 28 to both tilt, pivot, rotate, and/or swivel with respect to one another. In this instances, the arm segments 28 may be of variable length, such as where the first arm segment 28a may be configured as a base member and may thus be shorter, but may also be wider and thicker than the subsequent arm members. In such an instance, the base arm member 28a may be about 100 to about 300 mm, such as bout 150 to 250 mm, including about 185 to 200 mm in length, and may be configured to both couple the robotic arm 22 to a support member, such as in a moveable and/or rotational coupling, but to also support the weight of all of the subsequent arm members 28.

The second and third arm members 28b and 28c may be configured to give the arm length, and the joints 27 between may be configured to allow them to bend in the same or in opposite planes. In various instances, the joints may also have a rotational fitting to allow the two members to rotate with respect to one another. Any number of middle arm segments may be included, dependent on the length of the overall arm desired and the weight to be picked up, with the caveat that the greater then length, the less the leverage will be, and therefore, the stronger the arm segments must be or the lighter the weight they can support. In particular embodiments, the medial arm segments 28b and 28c may be of similar or different lengths, such as where the first medial segment 28b may be about 300 to 500 mm, such as a bout 400 mm in length, and the second medial segment may be about 400 to 600 mm, such as about 500 mm in length. These two arm elements may be switched.

A distal or terminal arm segment 28d may also be included, such as where the terminal arm segment may be configured so as to be coupled with a gripper instrument 30, and thus may include a joint element that allows bending in all three planes and/or rotational movement. In some instance, the rotational movement allows for the bending in all directions. In particular embodiments, as depicted, combined joint members may be included such as where a first joint allows for rotational movement, and a second joint allows for pivoting movement. Such a combined joint configuration can be provided at any coupling interface. In certain instances, the length of the terminal arm segment 28d may be from about 300 to 600 mm, such as from about 350 to 550 mm, including about 425 to 525 mm, such as about 529 mm in length.

As indicated, the robotic positioning element 22 may be automated, and thus, each joint member 27 may be associated with a motor 25, which motor 25 may be coupled with a controller 26, for effectuating the fine movement of each arm segment 28. In certain instances, the motor 25 may be an external motor (as depicted), or may be configured for being internalized within the arm segment 28 and/or joint member 27. For instance, in particular instances, a control unit 65 may be positioned externally at a distal portion of the robotic arm 22, such as where the control unit may include or otherwise be associated with a sensor module 95 including a number of distance scanners 99, one or more image capturing devices 98, as well as a dedicated gripper joint motor 25 and associated controller 26, such as for coordinating movement of the robotic arm 22 with that of the gripper mechanism 30. One or more battery units may be included, such as where the battery unit may be configured to be retained within each arm segment internally (or externally). In particular embodiments, the control unit 65 of one robotic arm may be in communication with the control unit 65 of a second, or third, or fourth, etc. robotic arm and/or gantry 70 and/or motorized injection base 70a so that all of these components may act collectively in correspondence with one another.

Accordingly, each of the arm segments 28 may be coupled with a combined controller 26/motor 25 configuration, such as where the motor may be about a 100 to 1000V, such as a 200 to 800V, for instance, a 300 to 600V, including a 400 or 500V motor, such as where the current may be a continuous amperage from about 1 or 1.2 to about 10 amps, such as between about 1.25 or 1.5 to about 4.7 to 5 amps, such as between about 2 or 3 to about 6 or 8 amps, including about 4 or 4.5 amps. In particular embodiments, the weight of the motor may be about 0.9 to about 1.5 or about 1.9 to about 3.7 kg. Power consumption may be from about 50 or 100 to about 800 or 1000 W, such as from about 200 to 700 or 750 W, including about 300 to about 400 W. In various embodiments, the torque may be from about 1 Nm to about 10 Nm, such as from about 2 or about 4 to about 6 or about 8 Nm. And in particular implementations the torque may be about 0.96 to about 7.2 Nm, such as from about 1.91 to about 3.82 Nm. In particular instances, the mass may be from about 1 to about 10 kg, including about 2 to about 8 kg, such as about 4 to about 6 kg. Likewise, one or more of the controllers 26 and/or motor 25 may be associated with gearing, such as where the gear rations may be between 50 to about 300, such as about 100 to about 200, including about 150 or 154. For instance, in one embodiment, there may be from about 2 to about 10 gears, such as about 4 to 8 gears, including about 5 to 6 gears, where each gear may have a ratio of 100 or 150 to 500, such as about 200 to 400, including about 200, and the weight of the gearing may be from about 1 or 1.5 to about 20 kg, such as from about 5 or 6 to 15 kg, including about 8 to about 12, even about 10 kg. In a particular embodiment, the weight may be about 3.6 kg.

Further, as indicated, in particular embodiments, the robotic arm 22 may be associated with a base member, such as at a proximal portion of the arm, which base member may function to couple the robotic arm to an action surface, such as a surface of a gantry 70, motorized injection base 70a, a conveyor and/or injection portion surface 60, and a bridging system 80. In certain instances, the base may be coupled to a surface via a moveable coupling member, such as to form a pivot and/or rotational mount. In a manner such as this, in relation to the base member, the robotic arm positioning element may be configured for moving in a 360 degree arc, and may further rotate around an axis normal to the base member. And further, as discussed above, at a distal portion of the robotic arm 22 may be coupled to a gripper unit 30, such as through a pivoting, rotational, and/or swivel joint connection 27.

Figure 5A:
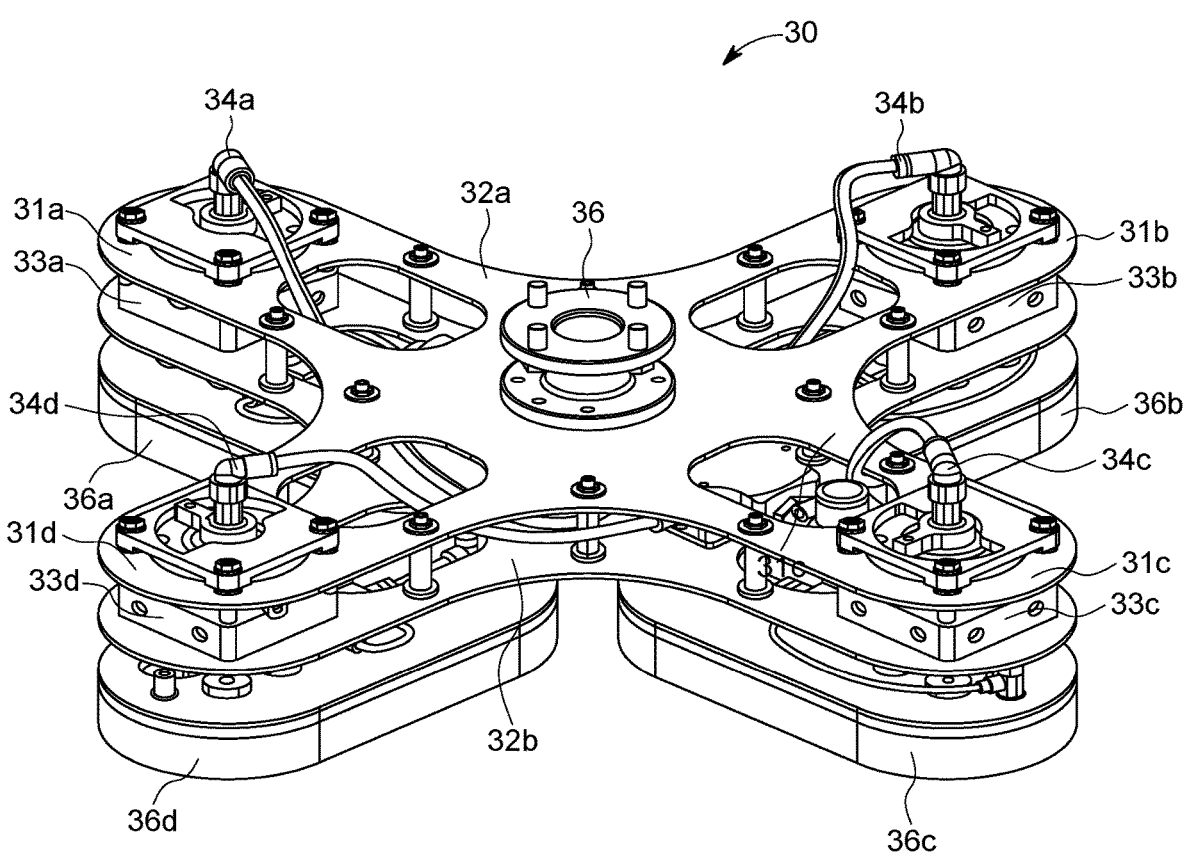
FIG. 5A presents a perspective of an exemplary gripper instrument of the disclosure in its retracted configuration.

Accordingly, as can be seen with respect to FIG. 5A, the system 1, e.g., autonomous positioning element 22 of the system, may include, or otherwise be coupled with, an autonomous gripper unit 30, whereby the gripper unit 30 may include a frame plate 32 that may be coupled to one or more gripping interfaces 36. The frame plate 32 forms a structural backbone for the gripper 30, and may be formed of any suitable material such as metal, a metal alloy, a plastic, such as polyethylene, polypropylene, poly-carbonate, carbon fiber material, a combination of the same, and the like. In various embodiments, the frame plate 32 may be an elongated member which may be in the shape of an oval, polygon, square, or have an "X," cross, "Y," or circular configuration.

In the embodiment set forth in FIGS. 5A-5G, the gripper 30 includes two-frame plates 32, including a top frame plate member 32a and a bottom frame plate member 32b, which are in an offset relationship to one another, such as to accommodate one or more actuators 33 there between, such as a pneumatic actuator. As depicted, top, side, and perspective views of the gripper unit 30 are shown in both the expanded and the contracted configuration. Particularly, each frame member 32a and 32b, as set forth in FIG. 5A, include two oval-like segments 31 that are in a transverse relation to one another so as to from a plurality of arms 31a-31c and 31b-31d that form a cross or an "X" configuration. In this configuration each arm or leg segment 31 includes one or more, e.g., a plurality of, openings, such as where a first opening is configured for receiving one or more actuators 33 and/or gripping interfaces 36, and a second opening, which may be configured to receive a vacuum unit 34 therein. In various embodiments, the leg segments 31a and 31c as well as 31b and 31d may be configured for moving in relation to one another, such as from an expanded to collapsed configuration, whereby in the collapsed configuration the gripping interfaces may be configured for wrapping around one or more surfaces of the object.

In particular embodiments, the arms 31 of the frame members 32 may include one or more vacuum unit 34, which vacuum unit 34 may include a a manifold which may be configured for applying a force, such as a suction or a blowing force, to an object in contact with the gripper, so as to grasp the object with the applied vacuum force and release it with a blowing force. In various embodiments, the unique X-configuration design of the gripper 30, may be composed of independent arms 31 that can function collectively together, independently and individually, or a mixture of both. In such an instance, since each arm 31 may be associated with an individual vacuum unit 34a, 34b, 34c, or 34d, this can create up to four times the suction force, depending on the number of vacuum units included and engaged, of a typical device that has previously been used to pick up objects.

This configuration makes the gripper 30 particularly useful for connecting with and picking up small objects, but also particularly useful, e.g., in the expanded configuration, for picking up larger objects. Further, this configuration lends itself to more readily pick up round, curved, or cylindrical items as well, such as when the independent arm elements 31 are configured for collapsing on each other, e.g., around an object, much like the fingers of a hand collapse to make a fist. Additionally, given the compressible nature of the gripping interface 36, as the suction force is increased, the gripping interface 36 compresses, flattening out against the surface of the object to be grasped, thereby increasing the surface area of the gripping interface 36, and consequently making a much greater and stronger grasping force that has hereto fore not been achievable with previous devices.

So being, the gripper 30 may include arm elements 31 that may or may not be configured for being movable in relation to one another and/or may or may not include a vacuum and/or blowing unit 34 that may be configured for acting in cooperation with the arm elements 31, which may or may not be moveable with respect to one another. For instance, in various embodiments, each leg element 31 may be configured for moving in relation to one another, such as including a pivot joint such as for dividing each leg into two segments and further allowing one leg segment to pivot in relation to the other, much like fingers collapsing around an object. In particular embodiments, the pivot joint may be positioned proximate the cushioning element of the gripping interface 36, so as to allow the cushioning and compressible element 36 to move towards the object to be grasped.

Accordingly, in various instances, the grasping interface 36 need not be motorized, but its extension can be effectuated through the application of a suction or blowing force, as described herein. However, in various embodiments, the arms 31 of the gripper instrument 30 may be configured for moving, one leg element 31 in relation to another, and in such an instance, a controller and motor configuration may be included, so as to allow the leg segments 31 to move, e.g., bend, in relation to another. Particularly, as indicated, one or more, e.g., each, leg may include a pivot joint, such as dividing the leg into two segments, such that one leg segment can pivot or bend in relation to another. Thus, the joint of the bendable leg segments may include a motor and respective controller for allowing one leg segment to pivot in relation to the other.

However, in other instances, the gripper interface 36 need not be motorized, but rather movement of the gripper 30 may be effectuated through the application of a vacuum or blowing force, such as applied via a pneumatic actuator 33. Nevertheless, in particular embodiments, the gripping unit 30 may include one or both of pneumatic actuators 33 as well as one or more motors 25, which may be configured for actuating the collapsing or other movements of the arm elements 31 of the frame member 32, such as in their gripping function. In such an instance, during the gripping action, the vacuum unit 34 may assist in the grasping. Hence, one or more motors may be included so as to further automate and mechanize the grasping function.

Nevertheless, in an alternative embodiment, the frame member 31 need not have collapsible arm elements 31, but rather, they may be stationary, or moveable but without the operation of a motor. In such an instance, the grasping function may be performed by the vacuum unit 34. In either of these instances, the gripper 30 may include an on-board and/or off board computing controller for directing the operations of the gripper 30 and its various components. Further, with respect to performing a gripping function, each of the arms 31 of the frame members 32a and 32b of the gripper unit 30 may include a gripping interface 36 that is configured for coming into contact with an object to be grasped and moved, e.g., oriented and collapsed, around the object to thereby grasp the object, such as between the arms 31 of the frame members 32, e.g., in conjunction with the application of a vacuum 34.

Figure 5B:
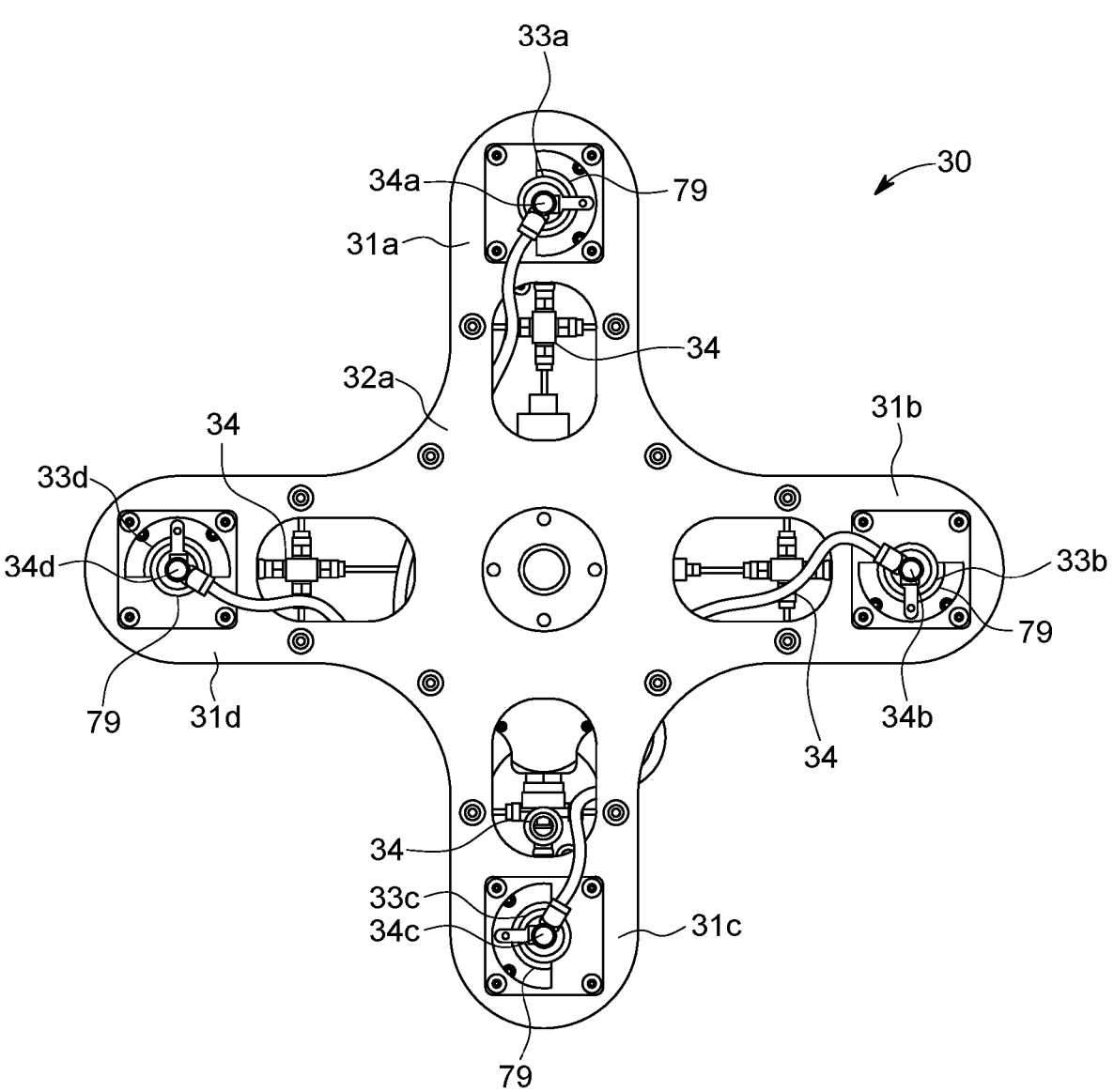
FIG. 5B presents top down view of an exemplary gripper instrument of the disclosure in its retracted configuration.
Figure 5C:
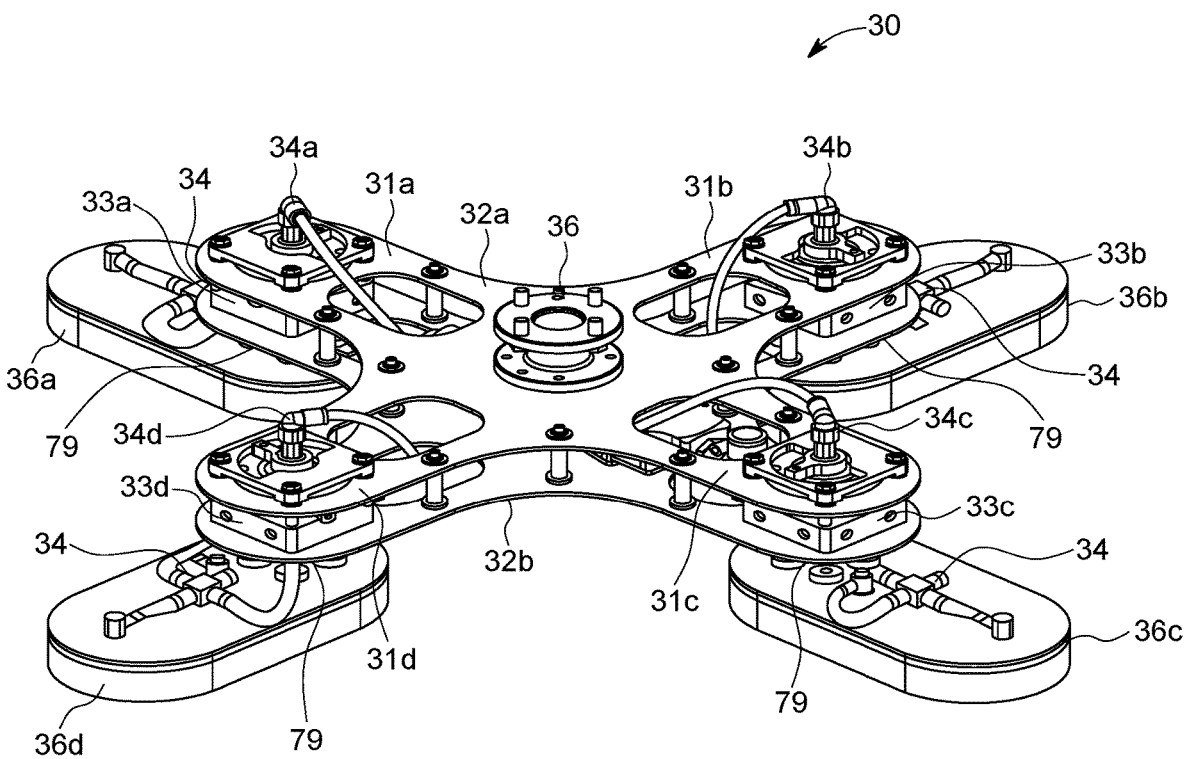
FIG. 5C presents a perspective of an exemplary gripper instrument of the disclosure in its extended configuration.
Figure 5D:
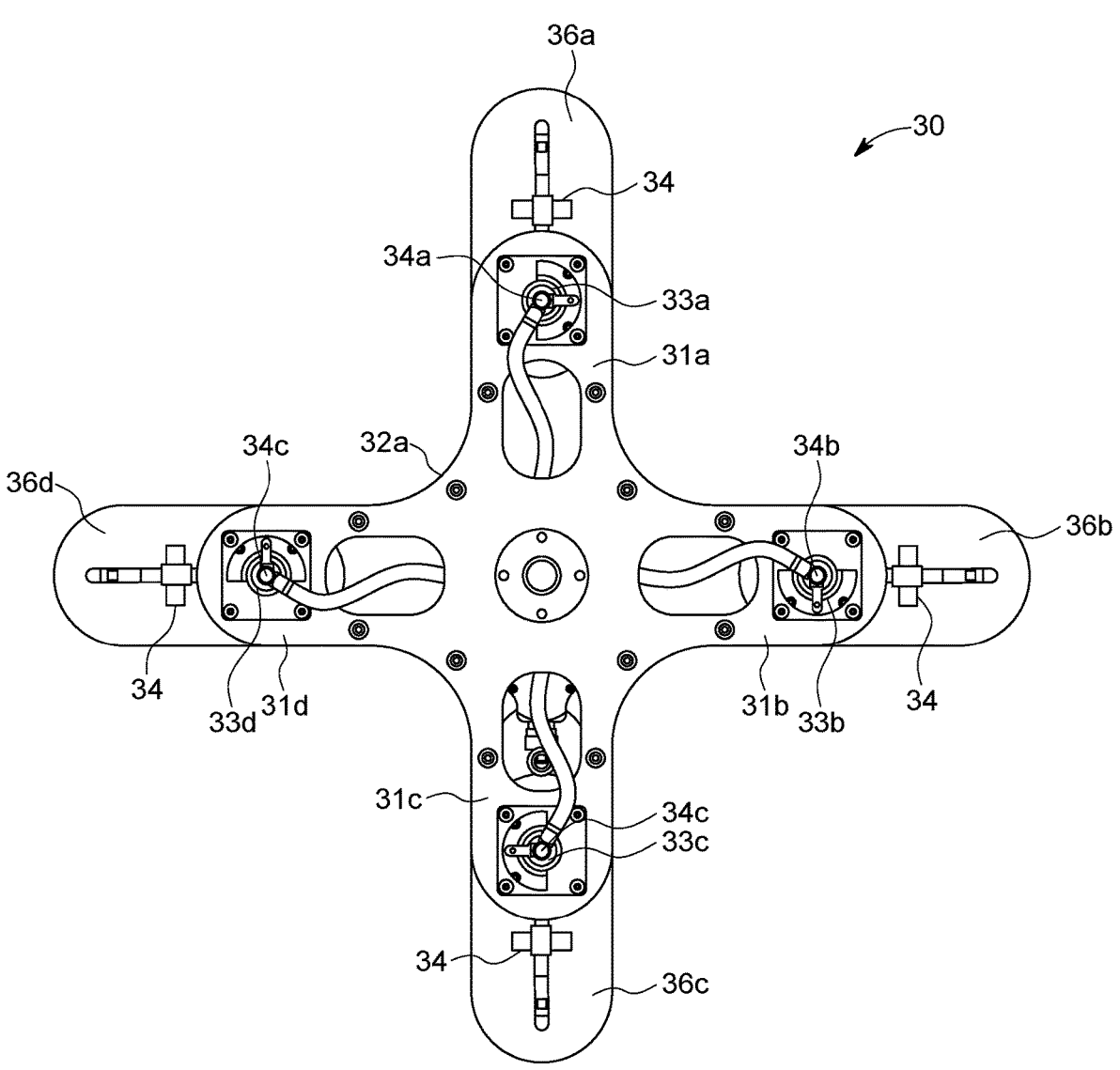
FIG. 5D presents top down view of an exemplary gripper instrument of the disclosure in its extended configuration.
Figure 5E:
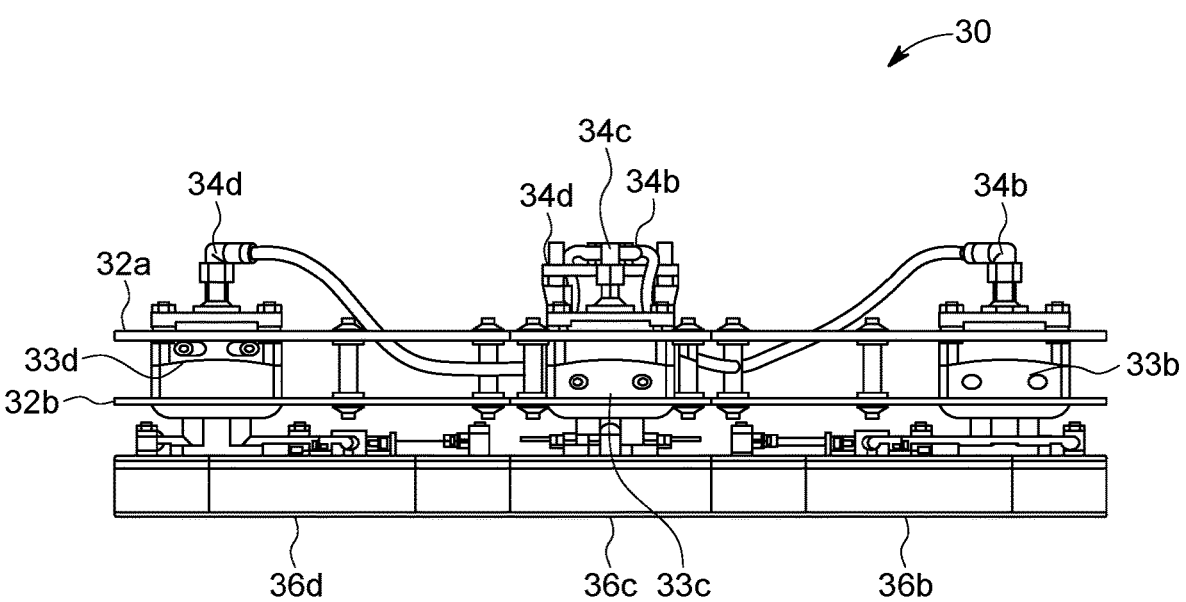
FIG. 5E presents a side view of an exemplary gripper instrument of the disclosure in its retracted configuration.
Figure 5F:
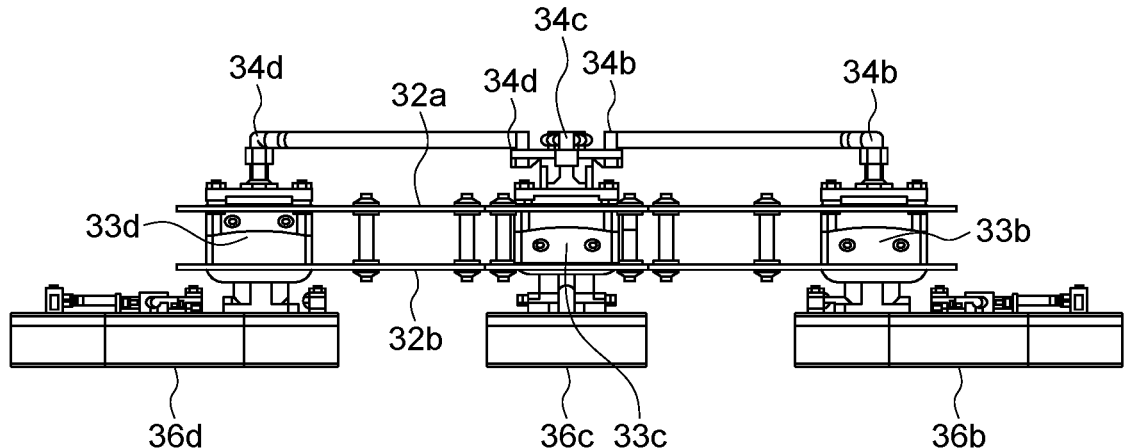
FIG. 5F presents another side view of an exemplary gripper instrument of the disclosure in its rotated flipper configuration.
Figure 5G:
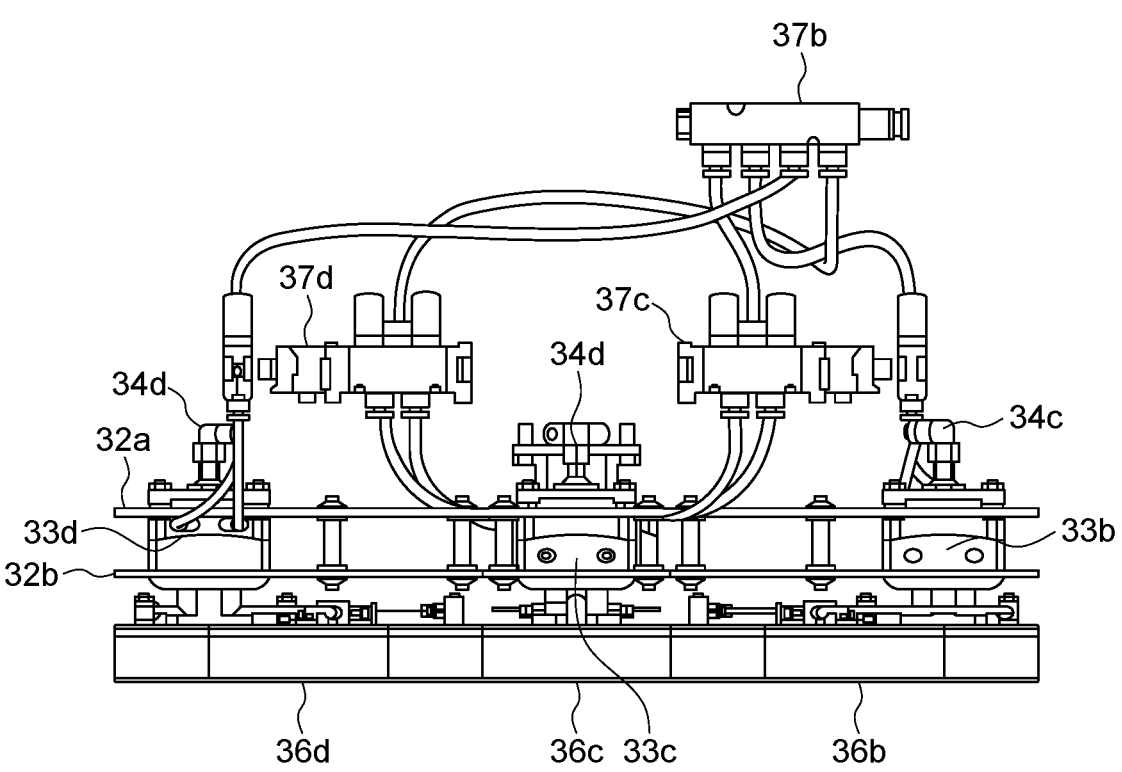
FIG. 5G presents a further side view of an exemplary gripper instrument along with an associated vacuum manifold.

FIG. 5A presents a perspective view of the gripper instrument 30, and FIG. 5B presents a top down view, where the grasping interfaces 36 are in their retracted configuration. Likewise, FIGS. 5C and 5D present the same perspective and top down views, respectively, but with the grasping interfaces 36, in their extended configuration. FIGS. 5E, 5F, and 5G provide a side view. FIG. 5I provides a top down view of an exemplary gripping interface 36 configured as a cushioning and compressible element. Likewise, as can be seen with respect to FIG. 5I, the gripping interface 36 may include several component parts that together form a secure, compressible, but forceful grasping interface, such as including a compressible and/or magnetic layer 36a, an intermediary plate layer 36g, a spacer layer 36f, and an outer plate member 36e. See FIG. 5I.

Figure 5H:
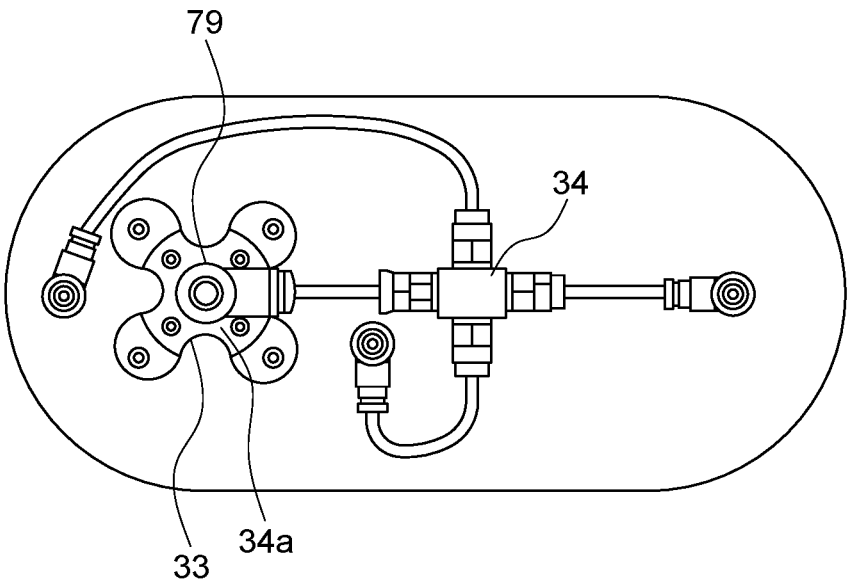
FIG. 5H presents a top down view of a flipper of the gripper device.
Figure 5I:
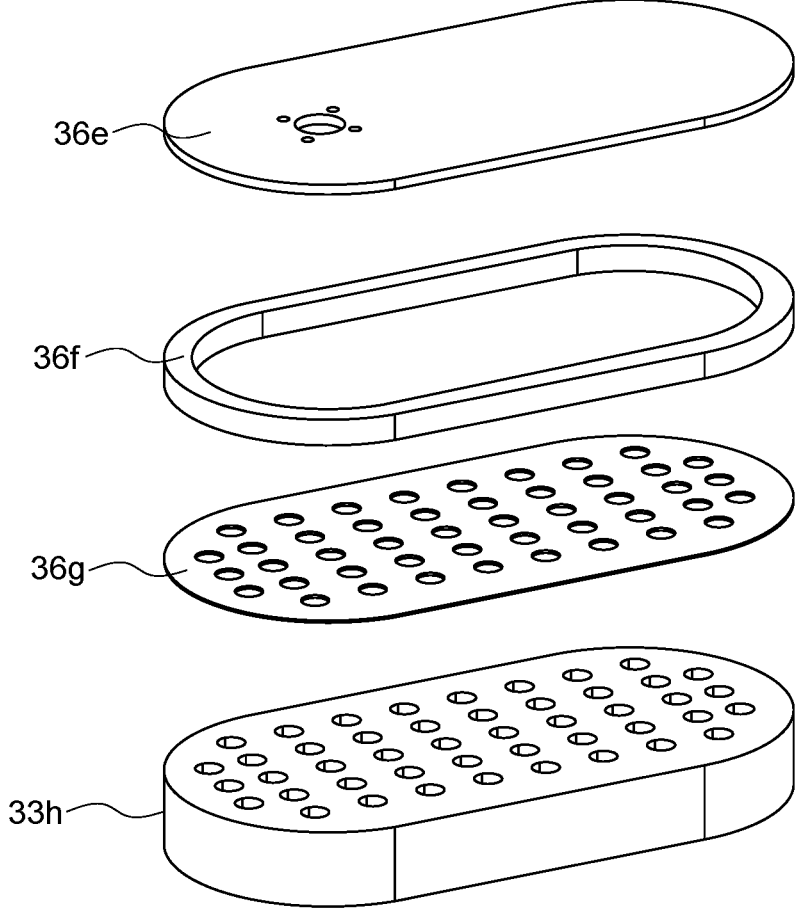
FIG. 5I presents a diagram of an exemplary flipper element of the gripper device of the disclosure.

For instance, as can be seen with respect to FIGS. 5A, 5C-5G, the automated gripper 30 may include a plurality arms 31*a*, 31*b*, 31*c*, and 31*d*, which may include gripping interfaces 36*a,b, c*, and d, which as can be seen with respect to FIGS. 5H and 5I, may include a compressible layer 36*a* that is configured for responding to one or more forces being applied to the gripping interface 36, by compressing and thereby increasing the surface area of the compressible layer 36 in a manner to more closely and firmly grasps the object. In such an instance, a plurality of forces may be applied, such as a compressive force may be applied by the arm elements 31 being collapsed around the object, and/or a vacuum force may further be applied, such as via an associated vacuum pump and/or manifold 34 through one or more openings, e.g., holes, in the cushioning compressible layer 36. Likewise, a countervailing force may also result from one or more non-compressible surfaces of the object being grasped. In this manner, these opposing forces creates a grasping interface that securely grasp around the object to be moved and placed.

The cushioning layer of the gripping interface 36 may be composed of any compressible and/or foamable material, which may include one or more through-holes that are configured for allowing a suction or blowing force to be applied, via the vacuum 34, through the gripping interface 36, and by which suction an object, such as a parcel, may be contacted and thereby grasped or otherwise be coupled to the frame member 32. A reverse blowing force may also be applied, so as to release the grasped object. In certain embodiments, the compressible layer 36 may include, e.g., be impregnated by, or otherwise be associated with, one or more magnets, whereby objects containing or coated with a metal may further be attracted to the frame member 32, such as by a magnetic force, e.g., in addition to the vacuum and or compressive forces.

As seen with respect to FIG. 5I, the gripping interface cushioning layer 36 may include both a top-plate layer 36*e* and an intermediary plate layer 36*g*, which plate members may be offset from one another by a spacer layer 36*f*. Together the plate layers may be configured for providing structural integrity to the grasping interface 36. Particularly, the top cover plate 36*e* may be made of a firm, but flexible material, such as fiberglass, polypropylene, or carbon fiber. Meanwhile, the intermediate layer may be less flexible so as to form a solid surface that may function to maintain the structural integrity of the compressible layer 36*a* during the application of the various different forces. More particularly, the intermediate plate layer 36*g* may be composed of a non-compressible, metal material, such as steel, aluminum, and the like.

In various embodiments, one or more of the plate layers may include one or more through holes, such as in alignment with the holes, when present, in the cushioning layer 36, so as to allow a vacuum force to pass through the intermediate plate layer 36*b* and/or the compressible layer 36*b*. In particular embodiments, the intermediate layer 36*g* may be composed of a perforated plate, e.g., a metal plate. As indicated, one or more spacer layers 36*c* may also be included, such as to offset one or more outer plate layer 36*e* from one or more inner plate layers 36*f*, and to form a leakproof seal therebetween. The spacer layer 36*f* may be composed of any compressible material that is capable of forming a seal, such as a urethane or polyurethane and the like. Through-holes may be provided through each of these layers, however, in various instances, the top-plate 36*e* may not have through holes, so as to direct a suction and/or compressible force into the cushioning layer 36*e*. In particular instances, the spacer layer 36*f* may be made of a compressible material, such as a polyurethane material, so as itself to be compressible, and the outer plate member 36*e* may be composed of a carbon fiber material.

Nonetheless, as can be seen with respect to FIG. 5I, the outer, top plate layer 36*e* may include an opening with which a vacuum unit 34 may be coupled, and through which opening a vacuum force, e.g., suction, may be applied. In such an instance, the suction force can be applied through the opening and can spread throughout a chamber formed between the compressible spacer 36*f* and the two plate members 36*e* and 36*g*. Specifically, when applied via the vacuum unit 34, air traverses through the opening and into the chamber filling the chamber, the air may then escape out of the through holes in the various interface layers, contact the surface of the object to be grasped, and the compressible foam layer 36*a* may be compressed and spread out against the object surface. The object is thereby grasped and a leakproof seal is formed between the object and the grasping interface 36, which in turn forms a vacuum between the object and the gripping interface 36.

Accordingly, as can be seen with reference to FIGS. 5E and 5F, the gripping fixture 30 may include a vacuum unit 34 that is configured for applying a vacuum, e.g., suction, force in association with the gripper 30, such as for coupling the gripper 30 with an object to be grasped. In such instances, the vacuum unit 34 may be composed of a vacuum manifold and port 34*a* that may be coupled to a vacuum pump, compressor, and the like, which is configured for generating a suction or compressive force that may be applied to and through the vacuum manifold and port 34*a*. For instance, the vacuum unit 34 may be coupled to a compressor unit, such as positioned on the positioning element 22 or an associated gantry 70 and/or bridging system 80.

As can be seen with respect to FIG. 5H, the vacuum manifold 34 may include one or more ports, such as ports 34*a*, 34*b*, 34*c*, 34*d* that are configured for coupling the vacuum manifold 34 to the gripping interface 36, such as via one or more of an actuator 33 and/or an opening in the outer plate 36*e* of the gripping interface 36. In these regards, actuation of the vacuum and/or compressor actuator 33 and/or vacuum manifold 34, causes the gripping interface 36 to extend away from the gripper arm, and may further apply a suction force to a surface of a parcel when the gripping interface 36 contacts the parcel. In specific embodiments, the actuator may be a pneumatic actuator, such as where the pneumatic actuator 33 may be coupled to one or both the vacuum and/or compressor device, and further may be coupled to the gripping interface.

Hence, as can be seen with respect to FIGS. 5C and 5D, when the vacuum and compressor are applied, compressed air may be supplied to the pneumatic actuator 33, which then directs that air to the gripping interface 36 causing one or more of the interfaces to extend outward, such as in a grasping operation. Once contact is made with the object to be grasped, a suction force can then be applied to compress the gripping interface 36, thus causing the object to be firmly grasped. Grasping, therefore, can include both application of a compressive or blowing force, for extending the grasping interfaces, and then applying a suction or vacuum force, for the grasping of a parcel, where the two forces can be applied sequentially through the same line and actuator 33, or separate lines and actuators can be included.

As can be seen with respect to FIG. 5G, there may be a multiplicity of gripping interfaces 36*a*, 36*b*, 36*c*, and 36*d*, and consequently there may also be a plurality of actuators 33*a*, 33*b*, 33*c*, and 33*d*, and thus, any combination of actuation and grasping interfaces can be activated at any given time. Such actuation may be effectuated through a plurality of fittings and associated tubing 37a, b, c, d, which fittings and tubing are configured for directing compressive, suction, and/or blowing forces from a compressor and/or pump unit, e.g., positioned externally of the device, to each fitting associated with each respective vacuum and port 34a, 34b, 34c, and 34d, each respective actuator 33a, 33b, 33c, and 33d, as well as each respective grasping interface 36a, 36b, 36c, and 36d. Which actuator 33a-33d will be activated determines which associated gripping interfaces 36a-36d will be actuated, at what time, during what duration, and in which orientation and configuration, and this is determined by the analytics platform 91 of the system 1, and will be accounted for by the picking and placing model.

The specific picking and placing model to be implemented may call for a plurality of gripping interfaces 36a-d, to be deployed, such as for grasping a box, or a single or a pair of grasping interfaces, e.g., in a line, to be deployed such as when grasping a flat envelope. Likewise, the width of the parcels can also be calculated and used to determine how far each grasping element 36 should be extended to firmly grasp the parcel in a manner that maximizes stability of grasping and moving the parcel such that the parcel does not break away from the gripping device 30. The model may also determine which segments of which arms may be pivoted, or hinged, and to what degree and what amount of force, so as to more firmly grasp the object to be picked and placed.

For example, as can be seen with respect to FIG. 5F, in one embodiment, the autonomous gripper instrument 30 may include an actuator element 33, such as a pneumatic actuator, which actuator 33 may be configured for coupling a port 34a, 34b, 34c, or 34d of the vacuum unit 34 with the gripping interface 36, via respective port interfaces 34a-d. As depicted, the actuator element 33 may be a rotary and/or pneumatic actuator that may include a through hole spanning through the actuator, such as where the rotary pneumatic actuator may be configured for directing air to or from the gripping interface 36 via its coupling port 34 with an associated vacuum pump or compressor. In this manner the actuator 33 may be employed to extend and retract the gripper interface relative to the arms 31, as dictated by the configuration of the parcels. In various embodiments, the gripper interfaces may be configured as an extendable, retractable, and/or rotatable flipper-like unit. In particular embodiments, the arm segment holding the flipper may be composed of a plurality of segments coupled by a hinge, pivot, and/or even a rotational joint so as to allow one segment to bend in relation to another, much like a finger, so as to better grasp objects to be picked up. For instance, in various implementations, the gripper unit may be configured of two arm elements that are in opposed relationship with one another so as to form an "X", whereby each distal portion of the arm element includes a moveable joint coupling that will allow the distal portion to pivot (and/or rotate) in relation to the proximal segment, much like fingers, so as to better grasp objects.

In such an instance, the implementation of a grasping function may be performed by one or both the activation of a motor to effectuate the collapsing or closing of the fingers, e.g., around the object to be grasped, and/or then a vacuum suction may be applied so as to fully grasp the object, e.g., via a suction force being applied through the gripper, such as through a vacuum manifold and associated vacuum tubes coupled with the various components of the gripper unit. In this configuration, the arms and/or fingers of the gripper unit may include a moveable, cushioned element, e.g., a flipper, which can contact the object and be compressed thereby. In various instances, the flipper may be associated with a vacuum element, and thus, may perform the function of a vacuum pad. Specifically, as discussed in greater detail herein below, there can be any number of arms and/or fingers of a gripper unit, and likewise, there can be any number of motors and vacuum manifolds, but typically for each actuating finger element of the gripper unit, there may be a corresponding motor and/or vacuum manifold and/or ports or valves, e.g., air solenoid valve and/or ejector venture. Hence, there may be one, two, three, four, five, six, or more different arm and/or finger elements of the gripper unit, dependent on the type, size, and/or configuration of parcels to be picked and placed. And when there are a variety of parcels of different sizes and/or configurations to be picked up, a plurality of gripper units, and associated positioning elements may be provided.

Particularly, in a typical implementation, there may be four articulating arm and/or finger elements to the gripper unit, each arm (and/or finger) element being coupled with an associated actuator, e.g., motor, and a vacuum manifold, such as where the motor may be a quarter, half, three-quarter, or full turn motor. In other embodiments, the motor may be a an electronic and/or digitally controlled motor. A controller, e.g., a processing unit, may also be included and be associated with the gripper unit, which controller may be configured for receiving instructions, such as from an analytics module of the system, which instructions direct the movements and orientations of the various elements of the positioning element, gripper unit, arms, fingers, and/or flippers. Additionally, as indicated above, the system may include a sub-system of image capturing devices, which imaging devices can collect data regarding the objects to be grasped and in what order.

The analytics system may then employ that data so as to derive a picking and placing regime. In that regard, pursuant to the generated picking and placing regime, the analytics module may develop instructions for when and how each of the various objects are to be grasped and picked up, and in such instances, the instructions may include activations of the motors for a period of time so as to allow the movements of the various arm elements from one set of coordinates, e.g., representing the orientation that the arm and gripper are currently in, to another set of coordinates, e.g., representing the orientation that the arm and gripper are directed to be in so as to be able to be in an orientation to grasp and pick up a parcel. Hence, there may be any number of individual motors, e.g., positioned at joint features of the positioning element arm and finger elements. For instance, in certain instances, there may be 2, 3, 4, 5, 6, or 10 or more arm and/or finger segments of the positioning element, and likewise 1, 2, 3, 4, 5, 6, or 9 or more motors, where each motor may be configured for controlling the movements of the positioning segments forming a joint of the positioning element.

In such instances, the coupling between the joints may be configured so as to allow planar movements in all of X, Y, and Z directions as well as rotational movement, such that the positioning element is configured to implement the instructions so as to position the gripper element so as to be in the orientation necessary for grasping the object to be picked up, in correspondence with the various dimensions of the parcel, in an orientation that allows for the most efficient picking and packing. Likewise, once in the appropriate orientation, the instructions can further direct the arms and/or fingers of the gripper to move into an appropriate configuration for grasping the object in between the arm and/or finger elements. For example, each arm and/or finger element may be moveably coupled with a suction element or flipper.

In various embodiments, there may be 1, 2, 3, 4, or more flipper elements, e.g., as many as there are arm and/or finger elements, where each flipper assists the gripper unit to grasp and hold onto the object to be picked up. Each flipper may be individually controlled so as to be extended outward are brought inward so as to be made wider or smaller dependent on the size of the object and better grip it. A suction element may also be included so as to better connect with and hold the object once grasped. In a manner such as this, the gripper, arm, and finger elements may have a variety of variations, such as 4, 8, 16, 24, and the like, dependent on the number of finger element.

Specifically, where there are four arm elements and four flippers, there may be 16 different variations for the arm and/or finger elements with respect to the flippers. For instance, the flipper may be configured for moving relative to the finger element and/or gripper overall. Particularly, the flipper may be configured for extending outwards from the arm and/or finger element, such as along the axis, and may rotate, e.g., in a circular manner, such as around an axis normal to the extended axis. Additionally, the flipper may be configured for tilting upwards and downwards.

In any of these instances the movements may be initiated by one or more of a motorized unit and/or vacuum/suction element. In this manner the various flippers may be in, out, halfway in and out, rotated, e.g., left and right, and tilted up or down, and the like, and each flipper for each finger element of the gripper may be individually and independently controlled via its own controller and associated motor and/or suction elements, and thus, the gripper can have a large number of different configurations. More specifically, dependent on the size and shape of the objects to be grasped in the most efficient manner the various elements of the gripper can be extended, rotated, and/or tilted so as to ensure a tight grasp of large, medium, small, or even tiny boxes. A suction and/or vacuum force may also be applied to the parcel. Particularly, for small boxes, only one flipper may be activated, whereas for medium boxes two or three flippers may be activated, for large boxes all four flippers may be engaged and extended, and for vary large boxes two positioning elements, e.g., robotic arms, can be employed in conjunction with two or more gripper units.

In various embodiments, the gripper unit may be movably coupled, such as in a rotational and/or ball joint coupling mechanism, e.g., rotational tool flange, to the positioning element so as to be able to move in a 360 degree arc about the various axes of the positioning element relative to the gripper unit. In a manner such as this, e.g., via the rotational wrist joint, the flippers can be positioned so as to almost form a circular, triangle, square, or rectangular configuration, e.g., where each flipper is positioned 90 degrees relative to the other, and the like. Other angles may also be implemented between two flippers, such as 20, 45, 60, 90, 120, 180 degrees in the positive or negative direction. Likewise, only one flipper or two flippers can be employed so as to form a line, three flippers can from a "Y", and four flippers can from an "X".

As indicated, in various embodiments, the gripper unit, and/or flippers themselves, may be associated with a vacuum or other suction element, such as a vacuum tube, where the vacuum tube is coupled to the flipper in a manner that it can move and rotate along with the gripper, arm elements, and/or flipper unit. For instance, in one embodiment, the gripper unit may include four arm elements, such as where each arm may be associated with a flipper element. In particular embodiments, each arm element may be moveably connected to a central hub feature, such as via a pivot joint, so as to form a clasping action. Likewise, the flipper element may be extendable and/or rotated with respect to the gripper arm.

Additionally, each gripper arm and flipper may be coupled to a vacuum unit, which may include a plurality of support members for retaining a vacuum manifold therebetween, e.g., associated with the gripper hub, such as by a number of fittings, and a plurality of ports and valves, e.g., air solenoid valves, may also be included. The number of ports and valves may be equal to the number of flippers, such as where each flipper forms a vacuum pad. Hence, where the gripper unit includes four flippers, the vacuum manifold may include four, or even eight ports.

Further, each flipper may include its own individual manifold, which itself can have one, two, three, four, or more ports and associated vacuum tubes. In various embodiments, the flipper may be coupled to the arm element through a movable coupling which may include an adapter, which may be electronically and/or digitally motorized. Collectively, the vacuum unit may be configured to supply air, e.g., so as to push the flippers out, and a vacuum, e.g., pneumatic air, may be applied to bring the flippers back in. A suction force can also be applied so as to better couple the vacuum pad of the flipper and be compressed thereby.

Thus, the various manifolds and actuators of the gripper may be controlled by the central hub manifold, controller, and associated tubing, such as where the manifolds feed the tubing to the actuators, all of which may be turned on and off through air, vacuum, suction, and/or pneumatic forces being applied by the manifold. Each of these elements may further be controlled by one or more electric or digital motors. However, in various embodiments, the vacuum and pneumatic actuators may be employed such as where increased reliability and decreased weighting is desired. In fact, in various instances, such configurations make the orientating, actuating, and grasping more accurate, and faster with regard to opening, closing, and re-aligning. Further, the use of vacuum/pneumatic forces allows the gripper unit to be more compact, and more capable of being fitted into tighter, abnormally configured spaces and/or for grasping abnormally shaped objects. Likewise, the extendable and retractable flipper units allow the gripper to take on a wide variety of shapes and configurations. Hence, any number of the gripper interfaces or flippers 36 of the gripper device 30 can be employed at any given time, in a variety of different configurations, dependent on the type of parcel to be picked and placed. In various embodiments, a motor and/or controller may be included and used for moving the grasping interface, e.g., "flipper," outwards and inwards.

For instance, if the parcel to be picked up is a flat envelope, only a single gripper interface 36 need be employed. If the envelope is long, only a couple of the interfaces, e.g., 36a-36c, or 36b-36d, or the like, may be extended and used to grasp the parcel. However, where the parcel is a box, such as in the shape of a cube, three or four of the gripper interfaces 36a, b, c, and/or d, may be extended and used to grasp the box, such as where all of interfaces may be positioned on the same side of the box, or where one or more, e.g., all, of the gripper interfaces 36a-d are positioned on different sides of the box. Any combination of the gripper interfaces 36a-d may be deployed alone or in combination to any combination of surfaces of a parcels. For instance, each gripper interface 36 may be individually controlled, e.g., via the application of a compressive force or air to respective, dedicated actuators 33*a-d*, or may be controlled in sequence, or at the same time as others. Hence, in these regards, any individual gripping interface 36 can be activated alone or in combination with any number of other interfaces, dependent on the shape, size, and/or weight of the parcel to be grasped. Likewise, where a pivot joint is included, a motor and controller may be included in association with each arm member, and the pivoting of the various segments one with respect to another may be individually controlled.

Accordingly, gripper interfaces 36*a* and 36*c*, which form a first elongated arm 31*a-c*, may be activated at the same time, via the application of compressed air to respective actuators 33*a* and 33*c*, so as to be extend the gripper interfaces 36*a* and 36*c* so as to grasp a flat, light weight envelop. Likewise, gripper interfaces 36*b* and 36*d*, which from a second elongated arm 31*b-d*, may also be extended in concert, at the same or a different time as those of the first arm, such as where the parcel to be picked up is larger and/or heavier, therefore, requiring a much larger, firmer gripping interface. Additionally, where a square box is being picked up, two same side gripper interfaces, e.g., 36*a* and 36*b*, may be configured to engage a first surface on a first side, and another two gripper interfaces, e.g., 36*c* and 36*d*, may be configured to engage a second surface on a second, opposed side of the box, such as where there is an automated, e.g., motorized, pivot joint connecting the two sets of arm portions together. In such instances, the parcel may be grasped by a compressive and/or friction force. And once in contact with the surfaces, a vacuum force can be applied to further grasp the parcel.

In particular instances, the gripping interfaces 36 are extended to a precise length, and the gripper device 30 is positioned in a precise orientation, such that one or more, e.g., all, of the suction force being applied is directed at the center mass of the parcel, as defined by one or more imaging components 98 of the system and in accordance with a generated picking and placing model produced by the analytics module. Accordingly, the gripper instrument 30, e.g., one or more arm members 31, may include one or more image capturing devices 98, sensor modules 95, including distance scanners 99, as well as a communications module 89, as well as a controller for directing the operations thereof. In a manner such as this, the movements, directions, orientations, as well as the amount of suction force being applied can be fine-tuned and regulated. The orientation and force being applied is important so as to ensure that the forces being applied are applied to the center mass of the parcel and are maximized. Maximizing the force applied to center mass in turn allows the positioning element 22 and gripper 30 to more firmly grip and transport much heavier and more oddly shaped parcels.

For instance, where the parcel is curved, various combinations of the arms 31*a-d* of the gripper device 30 may be deployed outwards and pivoted downwards, so as to allow the respective gripper interfaces 36 to wrap around the curved parcel, such as on opposed sides of the object, or together along a single plane of the curved parcel. Hence, in such an instance, one or more portions of each arm 31 may be coupled together by a pivot joint and/or actuator, such that each arm 31 may be composed of a plurality of segments that are joined by a pivot joint. In particular embodiments, it is only the gripper interfaces that are extended and/or in contact with the parcel to which the vacuum or compressive force is applied. Hence, a unique aspect of the gripper unit 30 is that its shape, size, and configuration can be changed, e.g., dependent on a picking and placing model, to accommodate and firmly grasp a wide variety of parcels, having a wide range of shapes, weights, and configurations.

As can be seen with respect to FIG. 2A, the positioning element 22 functions to position the gripping fixture 30 into proximity of an object, e.g., a package, to be grasped. Once in proximity of the package, the positioning element 22 may then orientate the gripping fixture 30 in an orientation to facilitate grasping, whereby once in proximity, and in the correct orientation with respect to the package, the gripper 30 will grasp the package and a vacuum and/or a compressor unit 34, will create a suction to further secure the grasped package, and once grasped, the object may then be moved and positioned into a conveyance for packing and later transport, as can be seen with respect to FIGS. 2D and 2E. For instance, with respect to the gripper unit 30, the gripper unit 30 may be configured for grasping, or otherwise gripping, an object, such as in one of a multiplicity of selectable orientations.

The gripper unit 30 may be configured to grasp and hold a broad range of parcels from a variety of different orientations, including regular and irregularly sized and shaped objects, including cylindrical shaped objects, such as round or curved objects, e.g., tires. In various embodiments, the gripper 30 can be configured to grasp an object, such as in between a plurality of one or more opposed gripping arms 31, which gripping arms 31 may be configured for holding the object through one or more of a vacuum or compressive force, and/or opposed forces and/or friction, as described above. As depicted in FIG. 5G, a unique element of the gripper unit 30 is a compressive or suction element 34*a*, which may be an internal or external compressive or suction element, which is configured for applying a compressive air to extend the gripping interface 36, and then a vacuum, e.g., a constant or variable vacuum or compressor, to the object to be picked and placed, such as in addition to, or substitution for, a gripping force being applied by the gripping arms 31 of the gripper device 30.

Particularly, as discussed above, the arms 31 of the gripper 30 may include a gripping interface 36 that is configured for contacting one or more surfaces of the object. In various embodiments, the gripping interface 36 may be composed of a porous and/or malleable or otherwise compressible material, e.g., foam, such that as a suction is applied by the vacuum and/or compressor unit 34, the suction actually flows through the one or more ports 34*a* of the interface. In such an instance, a compressor may be actuated to extend the gripping interface outward, at a determined distances, such as determined by the picking and placing model, and then a constant vacuum may be applied through the foam, enabling the body and/or the articulating elements to grasp and hold objects of small or large size and of different shapes and configurations, such as in the effectuation of a picking and placing operation in accordance with a picking and placing model.

In view of the above, in one embodiment, provided herein is a computing system, process, and computing system process for generating a picking and placing model, such as for the purpose of determining one or more parameters by which the picking and placing operation is performed, e.g., in an optimized manner. For instance, one or more processes may be implemented for developing and executing a model generation algorithm or protocol, such as for generating the optimized picking and placing model. Once generated, the model, and parameters to be deployed therein, may be used by the hardware of the system for optimally picking and transporting parcels and packages, from a first position, e.g., at a conveyor system, and orientating and placing the picked parcels at a second location, e.g., at a conveyance.

Particularly, as can be seen with reference to FIG. 1, in performing a picking and placing operation, one or more algorithms may be employed to identify relevant object, movement, and/or environment parameters, use those parameters to generate an optimized model that may then be implemented by the autonomous picking and placing system 1 so as to efficiently and effectively load a conveyance in a manner that minimizes void space at the sat time as decreasing load time. For example, after receipt of the generated model, such as by a suitably configured analytics platform 91 of one or more server systems 10 of the picking and placing system 1, one or more control units 25 associated with the various components of the system 1 may be instructed to execute control instructions consistent with the optimized model so as to drive the movements of the respective components of the system 1 for the implementation of the model. In particular embodiments, one or more sub-models may be generated in developing the optimized model, which sub-models may be stored within one or more databases 12 of the system and may then be tested and/or implemented, e.g., in real life or virtually, and the performance thereof may be evaluated against a projected probability of efficiency.

More particularly, low and high variability box picking and packing regimes may be generated and used to present easy and difficult scenarios to be tested, either virtually or in real life, and the projected throughput may be measured. Further, past use case scenarios, from prior implementations of the picking and placing models, may also be subjected to testing to determine if different variations of implementation could lead to greater efficiencies, particularly as the system continues to learn and grow so as to better achieve throughput efficiency. Such throughput may be measured in a variety of different ways so as to ascertain the performance of the sub-model, such as in combination with the implementation system 1, particularly, with regard to generating an optimized model. In these regards, efficiency may be measured in a variety of different manners, such as by performing one or more comparative calculations, for instance, by calculating the area of an empty storage space, such as in a warehouse, conveyance, skid sled, or the like, and then calculating the amount of space utilized for the packing of parcels. In a manner such as this, void space can be determined, where the less void space present in an area, the greater the efficiency, but also the more difficult it will be to further place parcels as the available positions becomes more and more limiting.

Consequently, by employing the systems and methods disclosed herein, utilization, in opposition to void space, may be substantially increased such as up to about 70% or 75% utilization, up to about 80% or 85% utilization, up to about 90% or 95% utilization even up to about 97%, 98%, 99% and even up to 100% utilization. Particularly, void space may be reduced by about 5% to 100%, such as by about 10% to about 95%, such as about 15% to about 90%, such as by about 20% or 25% or 30% to about 70% or 75% or 80% including about 50% to about 60%. In making a performance determination, one or more variables and/or parameters of the objects to be picked, packed, and/or the environment into which they are to be placed, may be determined or assumed and used in the evaluation process, such as in the generation of one or more optimized models. For instance, a minimum, average, and/or maximum height, length, width, circumference, shape, carrying weight, and/or other dimensions and the like of the package, may be assumed, when performing a predictable performance probability outcome, and in some instances may be limited, such as based on limitations in the gripper and/or positioning element, e.g., robotic arm.

In these regards, one or more simulations of one or more aspects of a picking and placing model may be run, based on one or more package dimensions, such as with regard to height, length, weight, shape, and the like, such as where the movements of the robotic arm and gripper are pre-determined with respect to the picking and packing process, and the efficiency and effectiveness may be calculated and compared to a real-life implementation of the model. In certain instances, various models may be run where different dimensions of parcels, such as between light weight and heavy weight parcels, may be assumed and may be tested so as to determine a best fit in a picking and placement operation. The best performing model may be selected, and/or an improvement to the model may be suggested, such as where a previously implemented model stops performing at maximal predicted efficiency. For instance, in certain implementations, as discussed in greater detail herein below, ROS programming may be employed to interface the parcel placement models (software) with the hardware (robot). As indicated, using the models developed herein, successfully packing a container for shipment with increased efficiency and decreased time may result in greater than about 90%, greater than about 95%, greater than about 98% void utilization and placement of over 1000, 2000, or even about 2500 parcels per hour or two.

More particularly, as indicated, in various embodiments, the system may include a computing architecture that includes a control system, having one or more processor implemented controllers, which control system may be implemented by one or more server sand/or processing units, such as a central processing unit, graphics processing unit, quantum processing unit, and the like. For instance, the computing architecture may include one or more server systems 10 and/or one or more computing devices 15, one or more memory devices 17, one or more interfaces with respect thereto, and one or more input/output devices 18. Particularly, in various embodiments the computing architecture of the system may include one or more servers 10 and/or a processing units 15 that may be implemented by one or more Central Processing Units ("CPUs"), Graphics Processing Units ("GPUs"), Quantum Processing Units ("QPUs"), Field Programmable Gate Arrays ("FPGAs"), or Application Specific Integrated Circuits (ASICs).

In particular embodiments, a processor of one or more of the control units may be implemented as one or more integrated circuits and/or may include one or more microprocessors, which microprocessors may be coupled to, or otherwise be associated with, an accompanying digital signal processor(s). In certain implementations, one or more coprocessors, one or more multi-core processors, or one or more controllers may be provided. Processing circuitry, and various other processing elements, may be included, such as implemented as one or more integrated circuits such as, for example, an application specific integrated circuit, e.g., an ASIC or structured ASIC, or a field programmable gate array, e.g., an FPGA, or some combination thereof.

The one or more processors, e.g., a plurality of processors, may be embodied in a single electronic device or may be distributed across a plurality of electronic devices collectively configured to function as the circuitry of the computing architecture. The plurality of processors, such as implemented in one or more CPUs, GPUs, and/or QPUs, may be in operative communication with each other, e.g., by respective communications modules, and may be collectively configured to perform one or more functionalities of the circuitry of the computing architecture, as described herein. In one embodiment, the processor may be configured to execute instructions stored in a memory device or a database otherwise accessible to the processor. The referenced instructions, when executed by a processor, may cause the circuitry of a computing device to perform one or more of the functionalities described herein, e.g., such as in the generation or implementation of a picking and placing model.

Accordingly, whether configured by hardware, firmware, and/or software methods, the processor may include an entity, e.g., article of manufacture, capable of performing operations disclosed herein in accordance with the embodiments of the present disclosure, where the computing architecture is configured accordingly. For example, when the processor is embodied as an ASIC, FPGA, CPU, GPU, QPU, or the like, the processor may include specifically configured hardware for directly performing various of the operations disclosed herein, or the processor may be organized as one or more processing engines that are configured for implementing instructions for conducting one or more operations described herein. For instance, in one embodiment, when the processor is embodied as an executor of instructions, such as may be stored in an associated memory device, the instructions may specifically configure the processor, or one or more processing engines thereof, to perform one or more algorithms and operations described herein. Consequently, the processor used herein may refer to a firmware, re-programmable firmware, or a programmable microprocessor, microcomputer or multiple processor chip or chips that may be configured by software instructions (applications) to perform a variety of functions, including the functions of the various herein described embodiments.

In some devices, multiple processors may be provided dedicated to wireless communication functions and one processor dedicated to running other applications. In various instances, software applications may be stored in an internal memory before they are accessed and loaded into the processors. The processors may include internal memory sufficient to store the application software instructions as well as the models generated herein. In many devices, the internal memory may be a volatile or nonvolatile memory, such as flash memory, or a mixture of both. The memory may also be located internal to another computing resource (e.g., enabling computer readable instructions to be downloaded over the Internet or another wired or wireless connection). Hence, in certain embodiments, the computing architecture 10 may include one or more processors implemented in one or more servers 10 and/or computing devices 15.

For instance, in one embodiment, a first client computing device 15 having a display coupled therewith and/or including a communications module for generating and transmitting communications via an associated network connection, may be provided. Particularly, a first client computing device 15 having a processor configured for running a client application 16 associated therewith may be provided. In various embodiments, the processor, such as via the client application 16, may be configured for accessing and/or otherwise receiving the images captured by the image capturing device 98, processing those images, parsing one or more details thereof, and for generating one or more representations of the objects, e.g., parcels, to be grasped, translated, and positioned, and/or one or more representations of the space into which the object is to be positioned.

In certain embodiments, the processor may be configured for executing a set of instructions 16, e.g., client application, may be configured to generate a client dashboard having a graphical user interface including an input interface through which input interface one or more of the models may be viewed, and by which a user of the system may engage the system, such as to configure and/or interact with the model generation and/or implementation process, or just view the process as it is occurring over time, e.g., real-time. In various embodiments, one set of input devices may include one or more touch activated interfaces, such as a keyboard, or the like. In other embodiments, the interface may be one or more image capturing and/or processing system 95, such as an image capturing device 96 having its own or a shared image processing unit 98.

In particular embodiments, the processing unit(s) 98 may be communicably coupled to the memory device 17, an interface of the I/O device 18, and the image capturing and/or processing unit 98 thereof. In particular implementations, a set of processors may be configured as a server system 10, such as for receiving the raw or processed images, or other data, from the image capturing device 96 and/or an associated computing device, such as the above referenced client computing device 15. In such instances, the server system 10 may be configured for processing the captured or otherwise collected data, e.g., the raw or preliminarily processed image data, and for evaluating the data, such as for the purpose of generating one or more models, or for comparing one or more models to a real-time or projected use case.

In a manner such as this, a real-time loading strategy or plan can be developed, such as in accordance with a generated model, which model can be continuously updated over time as packaging progresses and the interior conditions of the packaging space changes with the addition of each new package being placed therein. In certain instances, the processing may involve parsing images, identifying objects within those images, determining dimensions of those objects, determining dimensions of available spaces as well as determining one or more particular spaces into which the objects are to be placed, the dimensions of that space, and from this data generating a first model as to how best to grasp the object and orientate it, as well as a second model as to how to position and place the object within that space in relation to all the other objects already positioned into that space.

A further model may be developed for the purpose of defining the most efficient path by which to translate the object from a first position, such as on a conveyor built, to a second position, such as within a conveyance that will be used to ship the object to another destination. In certain instances, one or more models may come into conflict with one another, or with a real-time image, and in such an instance, one or more processors of the computing architecture may be configured for analyzing and resolving the conflict. In particular instances, resolving conflicts within images, object dimensions, and/or packing processes may involve making a number of complex calculations in a very short amount of time, which may include determining a closest fit and/or best likelihood determination and/or resolving issues or conflicts with respect thereto.

In view of the above, a computing device 15 of the computing architecture 10 may include one or more, e.g., a plurality of, processing engines, such as a plurality of processing engines configured for parsing collected data, generating one or more models with respect to the collected or otherwise received data, and determining progression towards completing one or more objectives for implementing the model in the real world. Accordingly, the computing device 15 and/or server 10*a* may include a first processing engine configured for implementing instructions for collecting or otherwise receiving processed or raw data, such as raw image data. A second processing engine may also be included and be configured for implementing instructions for recognizing one or more objects within the images, such as one or more parcels for being packed within a confined or otherwise bounded space.

A third processing engine may further be included and be configured for implementing instructions for defining the identified objects within the images, such as mathematically. For instance, objects identified within an image may be defined by their shape, size, orientation, and dimensionality, such as within three-dimensional space. In various instances, the space itself may be defined, such as with respect to its dimensionality as that dimensionality changes over time as more and more packages are positioned within that space.

A fourth processing engine may additionally be included such as where the processing engine is configured for implementing instructions for the purpose of generating one or more models, such as a model for grasping an object, e.g., off of a conveyor belt in a determined orientation, moving the object, e.g., from the conveyor belt to a space that needs to be filled by the object, for orientating the object within the space so as to be particularly placed within an opening having a defined position that may be filled. A fifth processing engine may also be provided, such as where the processing engine is configured for implementing instructions for determining progress toward implementing a model, and further identifying one or more instances where the model may no longer be working, and in such instances, generating one or more corrective measures by which to modify or otherwise correct the model so as to achieve an effective and efficient packing of the space with retrieved objects. A further processing engine configured for implementing instructions for determining relevant variables that may need to be changed to implement or correct a model, to compare a present model with a past model, e.g., such as by retrieving a past model from a repository, and based on various calculations being made, changing a weighting factor of one or more variables in such a manner so as to change the model, and thereby change the processing of packing and/or package placement. In certain instances, additional processing engines may be provided and configured for implementing instructions for performing a first likelihood that a first model is working versus the potentiality of correcting the model so as to derive a modified model that works better, such as to perform a selected objective more effectively and/or efficiently. In such an instance, the likelihood determination may be based at least partially on a comparison of a first relative weighting of variables pertaining to a first model to a second relative weighting of those variables pertaining to a second, revised model.

Likewise, in various embodiments the system may include a database 12 that may be implemented by one or more memory devices 17 and/or libraries 19, e.g., a structured database, may also be included. For instance, a memory device 17 may be included such as where the memory device may include suitable logic, circuitry, and/or interfaces that are adapted to store the referenced sets of instructions that are executable by the one or more processors so as to perform the aforementioned operations. In various instances, the memory 17 may include one or more of a hard disk, random access memory, cache memory, read only memory (ROM), erasable programmable read-only memory (EPROM), electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In one embodiment, a memory device of the disclosure may be integrated with a processor, such as on a chip device. For instance, the memory device 17 may be configured to store a first, second, third, "n", sets of pre-stored features, such as within a first, second, third, "n" library 19, where the first set of pre-stored features correspond to unique features of a first type of package, and the second set of pre-stored features correspond to unique features of a second type of package, and so on for third, fourth, fifth, "n". Particularly, the first and second set of pre-stored features may correspond to Scale Invariant Feature Transform (SIFT) descriptors that are used to uniquely identify an object (e.g., a first type of package versus a second type of package to be loaded).

Accordingly, in various embodiments, a structured database containing one or more searchable libraries 19 may be provided, wherein each library 19*a-n* may include one or more of data pertaining to one or more standardized shapes, sizes, dimensions, and the like, of packages, one or more standardized shapes of conveyance spaces, and may further include one or more models for packing the various standardized shapes of objects to be packed within the one or more standardized shapes of the packaging space of typical conveyances. For instance, the database may include a number, such as 6, 12, 18, 24, 30, 45, or even 60 or more unique box shapes and sizes. Specifically, the dimensions for these boxes may be pre-set within the database, and may be used in determining one or more packing models by which a learning module, e.g., a deep learning module, of the artificial intelligence platform of the system, can engage in one or more substantially instantaneous testing regimes whereby different combinations of box sizes can be packed in relation to one another, within a defined space, in a manner that achieves greater and greater levels of packing efficiency.

Each model can be tested against the ever-evolving reality of the packing space as it changes with each addition of a parcel being positioned within the growing stack of previously placed parcels. Particularly, it is known that as a stack of parcels grows, only a limited number of positions exists within which a new parcel may be positioned, such that the placement of a new parcel within the stack, then limits the potential possibilities wherein a new parcel can be positioned. Given that there is a pre-set number of defined package options for filling available positions within the dimensions of the previously packed stack, the system can generate a model whereby new parcels on a conveyor belt to be packed can be identified, their shape identified as compared to the database of pre-set package sizes and dimensions, and one or more models for the placement of the new package within the stack can be tested against a desired efficiency level. Implementing this testing regime, e.g., implementing a self-play deep and/or reinforced learning model, can lead to an increased packing efficiency, such as above 50%, above 60%, above 70%, above 80%, and even above 90%.

In various instances, each of the defined shapes and dimensions, etc. of the objects may be weighted in accordance with its best fit in comparison to a standard, and based on that weighting, determining one or more weights being applied to a model with respect to how closely given the shapes of the objects, e.g., packages, to be loaded, the packing in real-time approximates the model. Consequently, if need be, the weighting may be changed, if a certain set point, such as a set point indicating deviance from the model, is reached, a different model may be retrieved or generated so as to be a better fit for a given packaging schema currently being implemented. In a manner such as this, the loading process may be fluid and dynamic, such as by being successively updated.

The system 1 may also include an input device 18, such as for capturing, retrieving, collecting data and may further include an image capturing device 98 such as for capturing image data, e.g., from within or outside of the system, and for transmitting that data, via one or more cloud based network connections 14, into the system 1, such as to a server system 10 and/or one or more processing units 15 and/or data storage unit 12 associated therewith. In one particular implementation, an input device 18 of the system may include one or more, e.g., a plurality, image capturing devices 98. In such an instance, the image capturing device 98 may be an electronic and/or digital device that is capable of generating an image based on light signals received from a defined field of vision. In one embodiment, the image capturing device 98 may be configured to generate an image based on reception of light signals in the visible or infra-red light spectrum. The light signals received by the image capturing device may correspond to a light generated by an illumination source on the image capturing device, such as via ambient light. In other instances, the illumination source may be from a component external to the image capturing device.

In various instances, the image capturing device 98 may include a lens assembly, containing one or more lenses, and a sensor assembly, containing one or more sensors. For instance, in various embodiments, a lens assembly may be provided, such as where the lens assembly may include one or more optical components. In one embodiment, the lens assembly may include components for directing a light signal on to a sensor assembly. Particularly, the lens assembly may include one or more lenses, diffusers, wedges, reflectors, or any combination thereof.

Likewise, the image capturing device 98 may include a sensor assembly 95 having one or more sensors, such as an image sensor, for instance, a color or monochrome 1 D or 3D CCD, CMOS, NMOS, PMOS, CID or CMD solid state image sensor, that may be configured to generate images and/or measure distances based on received light signal. For instance, a depth sensor may be provided, such as in association with the image capturing device, such as where the depth sensor is configured to capture depth information of a defined field of vision, such as with respect to objects within that FOV. For example, the depth sensor may include one or more of a structured light-based depth sensor, such as an Infra-Red (TR) sensor, a time of flight-based depth sensor, and/or the like. In various instances, the sensor module 95 may include one or more distance scanners 99.

Further, an image processing device 98 may be included as part of, or may otherwise be associated with, an image processing system 91. For instance, an image processing unit 15 may be included along with suitable logic and/or circuitry that enables the image processing unit 15 to process the images captured by the image capturing device 98, e.g., by one or more cameras. In various instances, the image processing unit 15 may be configured to identify the shapes and sizes of objects and the spaces into which they a to be particularly placed, regardless of the fact that the dimensions of the shapes of the objects, e.g., parcels, are constantly changing as is the space into which they are being packed. Particularly, the image processing unit 15 can be configured for determining a size, shape, orientation, dimensionality, as well as a type of package being prepared for being onloaded onto or into a storage facility or conveyance, such as based on the contents contained within the images captured.

The image capturing device 98 may also include a communications module 89 for receiving instructions, such as from a control module 65 of the system 1, which instructions can be generated by the system itself, or by a system operator, e.g., using a system input device 18. Particularly, an input/output (I/O) device 18 of the system may include or otherwise be associated with an I/O device interface. An input device of the system may include suitable logic, circuitry, and/or interfaces that may be adapted for receiving and transmitting data input and information from one device to another, such as from a keyboard, touchscreen, or other data entry device, such as from a client application running on a mobile computing device. In various instances, any of the components of the system, such as an image capturing device, may be configured as an input device so long as it is coupled to a data collection instrument, and includes a communication device for transmitting the collected data. In these regards, the I/O device may include a control unit for controlling the operations of the input and/or output device.

In these regards, the I/O device interface may be configured to send/receive data, e.g., instructions or messages, to and/or from, the image capturing device 98, one or more autonomous loaders 20, a conveyor belt 62a or injection fork 62b system, a conveyance 100, and the like. In particular embodiments, the I/O device may be configured for generating and/or receiving instructions, such as for generating and implementing the picking and placing model for the packing of parcels in a conveyance to be shipped, which in turn, may require the generating of one or more images for modeling the environment in which the picking and placing operations are to take place. Once the instructions have been received, the image capturing device may capture a plurality of images, such as a stream of images, from one or more fields of vision, and may further collect depth measurements for one or more objects within the environment with respect to one another.

In particular instances, the I/O interface may include a Data Acquisition (DAQ) card, an electrical drives driver circuit, or other interface device that is configured to communicate with one or more of the other components of the system. In such instances, communications conducted via the I/O device may be performed in accordance with one or more device communication protocols, such as, one or more of an I2C communication protocol, Serial Peripheral Interface (SPI) communication protocol, serial communication protocol, Control Area Network (CAN) communication protocol, 1-Wire® communication protocol, and the like. In these regards, in implementing a generated picking and placing strategy, one or more components of the autonomous loading system will need to be finely tuned and precisely aligned to implement the packing strategy.

Consequently, various of the components of the system may include one or more sensors 95, such as distance scanners 99, velocity sensors, accelerometers, gyroscopes, and the like for determining movement, speed, acceleration, and orientation, and likewise, these components may include one or more controllers 26 for analyzing the sensed data, and a communications module 98 for transmitting the sensed and/or analyzed data. Therefore, in various embodiments, each component, and/or sub-component of the system, may include or otherwise be associated with one or more control units 65 and/or processing controllers 26. And as indicated, a control unit 65 of the system may include, or otherwise be associated with, one or more processors, as well as, one or more inputs and/or output connections, e.g., I/O interfaces, which may include a keyboard, touch-screen interface, BLUETOOTH® interface, as well as an image capturing device 98, which device may further be associated with an image processing unit 15. Particularly, the I/O connections may include, but are not limited to one or more of a computer based communications mechanism such as a USB, Ethernet, Power Line Control (PLC), API, and the like, and/or a wireless communications protocol such as Zigbee, WiFi, Bluetooth, Low Energy Bluetooth, Cellular, Dash7, RS232, and the like.

In various instances, the autonomous picking and placing system 1 may include a picking and/or packing side automated positioning element 22, e.g., segmentally controlled robotic arm, which is configured for imaging an object as it comes into view, such as at a storage location, and/or as it traverses on a conveyor belt. As the imaging occurs, data is received and transmitted to an analytics platform 91 of the system, whereby a picking, orientating, and placing model is generated and/or tested, and a picking and placement strategy may be developed and implemented. When implementing a picking, orientating, and placing model, the autonomously controlled loading system 1 may orientate itself and then grasp an object, such as at a storage location, e.g., by a picking side positioning element 22, or off of a conveyor belt 62b, e.g., by a placing side positioning element 22, and in a determined orientation for transport. The object may then be translated from a first position, such as at a storage location or at the conveyor belt 62, to a second position, such as to the conveyor belt 62 or into a conveyance 10 meant to convey loads across distances from one location to another.

For instance, in various embodiments, a method for imaging, modelling, grasping, and moving objects, such as parcels, positioned at one location to a second or third location is provided. In various instances, the first location may be a storage location where parcels are stored prior to sale and shipping, whereby a first positioning 22 and/or gripping element 30, which may be coupled to a first moveable gantry 70 or bridging system 80, may grasp and move the parcel from the first location to a second location, such as at a conveyor belt 60 for translation of the parcel to a packing location, such as at a skid sled 90 or conveyance 100. Further, as the parcels are translated along the conveyor system 60, a second positioning 22 and/or gripping 30 element, which may also be coupled to a second gantry 70 or automated injection base 70a, may grasp the parcel, as it moves along the conveyor system 60, e.g., belt system, and may then move a parcel proximate a position into which the parcel is to be placed for shipment, such as within a moveable skid sled 90 and/or conveyance 100 for shipment. When orientating and positioning the grasped parcel into a position within which parcels are to be stacked for shipment, e.g., within a pile of packages, the gripping device 20 and/or positioning element 30 may be manipulated into a precise orientation for efficient placing and packing, such as in an orientation determined by one or more other parcels that have already been loaded and/or arranged at the second location.

As indicated, as can be seen with respect to FIGS. 2D and 2E, the configurations and movements of the gantry 70, automated base member 70A, positioning 22, and gripping elements 30 with regard to the picking and placing of parcels, may be performed in accordance with one or more generated packing strategies and/or models thereof. Likewise, as can be seen with respect to FIGS. 6A and 6B, the configurations and movements of intelligent bridging 80 and skid sled 90 systems along with associated positioning 22 and gripping elements 30 may also be automated with regard to the picking and placing of parcels in accordance with generated picking and packing strategies and/or models thereof.

Specifically, when generating and implementing a model for picking and placing of parcels, such as for shipping, various components of the system, such as automated gantry 70, 70a and bridging system 80, may include a number of imaging elements 98, which may capture a plurality of images of parcels, as they travel along a conveyor system 60. The images may be preprocessed, such as by a processing element and/or controller 26 of the imaging device, and the raw or processed images may be transmitted to an analytics platform 91 of the system. Particularly, in these instances, one or more image capturing devices 98 may be provided and be configured for receiving instructions, such as from a system operator, for the capturing of one or more images, such as of one or more parcels, within one or more field of vision.

In particular instances, the one or more image capturing devices 98 not only captures images of one or more parcels, they may additionally capture environmental data, such as depth information, of not only the various parcels, but also all of the components of the system as well as other objects that are within at least one field of vision. Once the images and environmental data have been obtained, one or more control units 65 associated with the one or more image capturing devices 98, may then preprocess the data, collate and integrate the data, and may then transmit the data to a central server of the system. For instance, when capturing images of parcels as they translate along the conveyor system 60, a multiplicity of cameras may capture a plurality of images of the parcels, from a number of different angles and orientations. In various instances, one or more of the image capturing devices, e.g., cameras, may be positioned, e.g., mounted, on any of the components of the system, such as gripper instrument 30, positioning element 22, gantry 70, automated base member 70a, conveyor belt 62, bridging apparatus 80, or other stationary or moveable mounting device. In particular implementations, the coupling mechanism by which a camera is coupled to a moveable platform may include a moveable and/or rotational and/or swivel connection that allows the camera to move and/or rotate as the camera captures images.

Once the images are received at the analytics system 91, the independent images from the one or more cameras can be collected, aggregated, collated, and integrated together to produce a near-real life construction of the picking and placing space(s), including all of the components of the system present therein, as well as the environmentally salient features thereof. Further, this data may then be employed by the analytics module 93 so as to generate a model for strategizing an optimal placing and packing operation to be implemented by the autonomously controlled loading system 20. Accordingly, a key feature of the autonomous picking and placing platform 1 is a dynamic image capturing system that is configured for capturing and/or streaming images of one or more picking and placing environments, such as including a storage space, a conveyor space, and a loading space. Once captured, the images, e.g., still pictures and/or video, may be transmitted to one or more computing architectures, for processing thereby.

For instance, upon receipt of the images, e.g., by a server 10 of the platform, the captured images, depth information, and/or environmental data, may be analyzed, a control unit 65 may then determine whether the captured images include a parcel to be picked and placed, what the dimensions of the parcels are, e.g., relative to other parcels on the conveyor and/or the stack into which they are to be placed, and the orientations and angles of the various components positioned in the environment. For example, in one embodiment, one or more image processing units 65 of the platform may be configured to employ one or more object identification techniques for identifying an object, its dimensions, what orientation it is in, how fast it is moving within the space, and from and to where it is moving. Such techniques may include one or more transforms, filters, neural nets, scales and/or the like, such as a Houghs transform, Gabor filtering, Convolution Neural Network (CNN), scale invariant feature transform (SIFT), speeded up robust features (SURF), and/or the like, so as to determine the characteristics of the objects and components present within the captured images.

Particularly, the image capturing devices 98 along with associated processing units may be configured to determine one or more unique features in the captured image, such as by employing a SIFT technique, whereby the bounds and dimensions of a parcel along with its orientations and movement characteristics may be defined and characterized. Specifically, when imaging, identifying, and/or characterizing a parcel, such as moving on a conveyor belt 67a, one characteristic that may be determined is the position of the parcel, e.g., over time, such as during its translation. In this regard, a processing unit 65 of the system, such as at the image capturing device, 98 and/or a remote server system 10 associated therewith, may be configured for determining one or more, e.g., a series, of positions of parcels, such as with respect to other parcels or other components of the system within a field of vision.

Figure 6A:
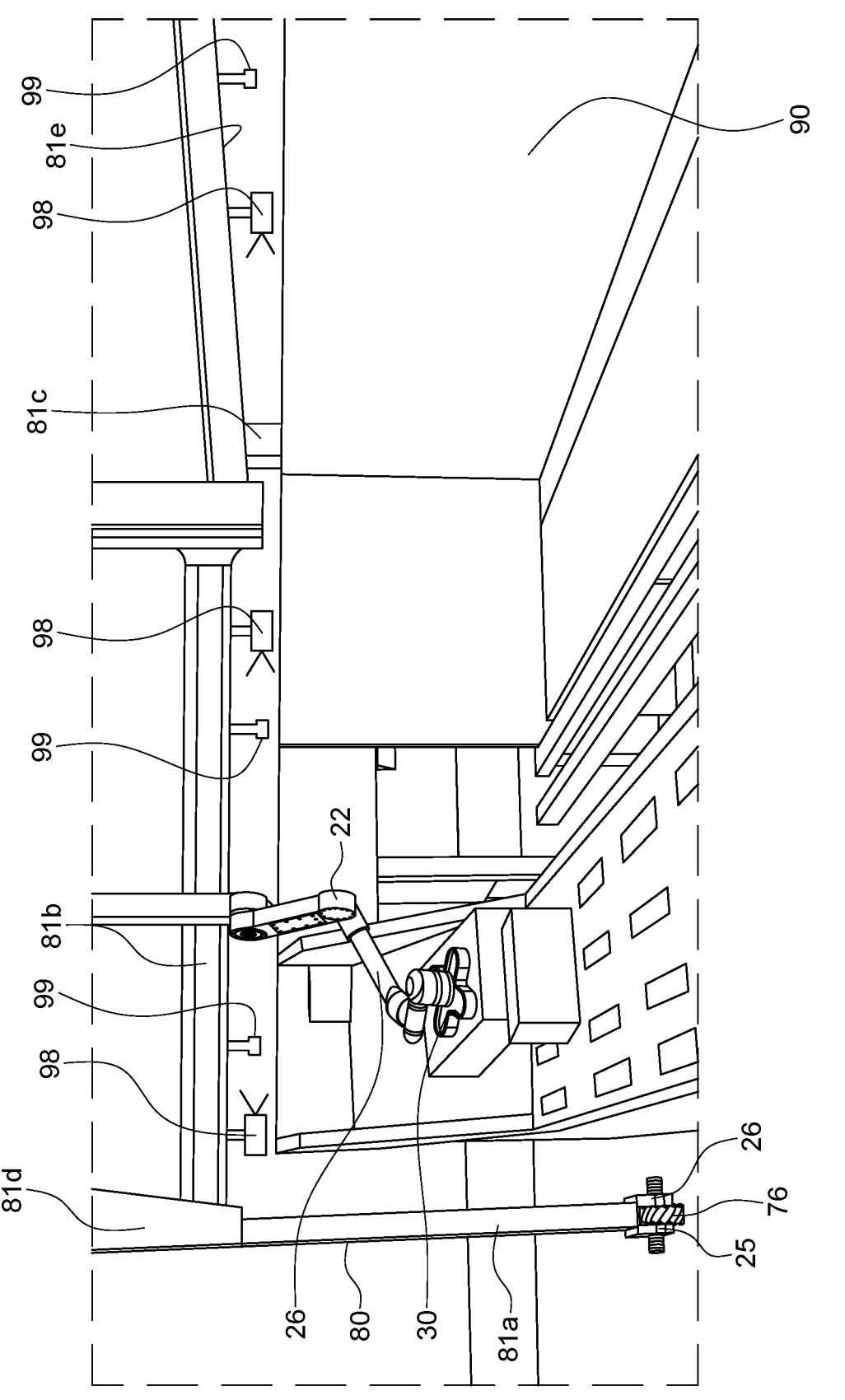
FIG. 6A presents a representation of an exemplary work environment for beginning the implementation of a picking and placing model as described in the disclosure.
Figure 6B:
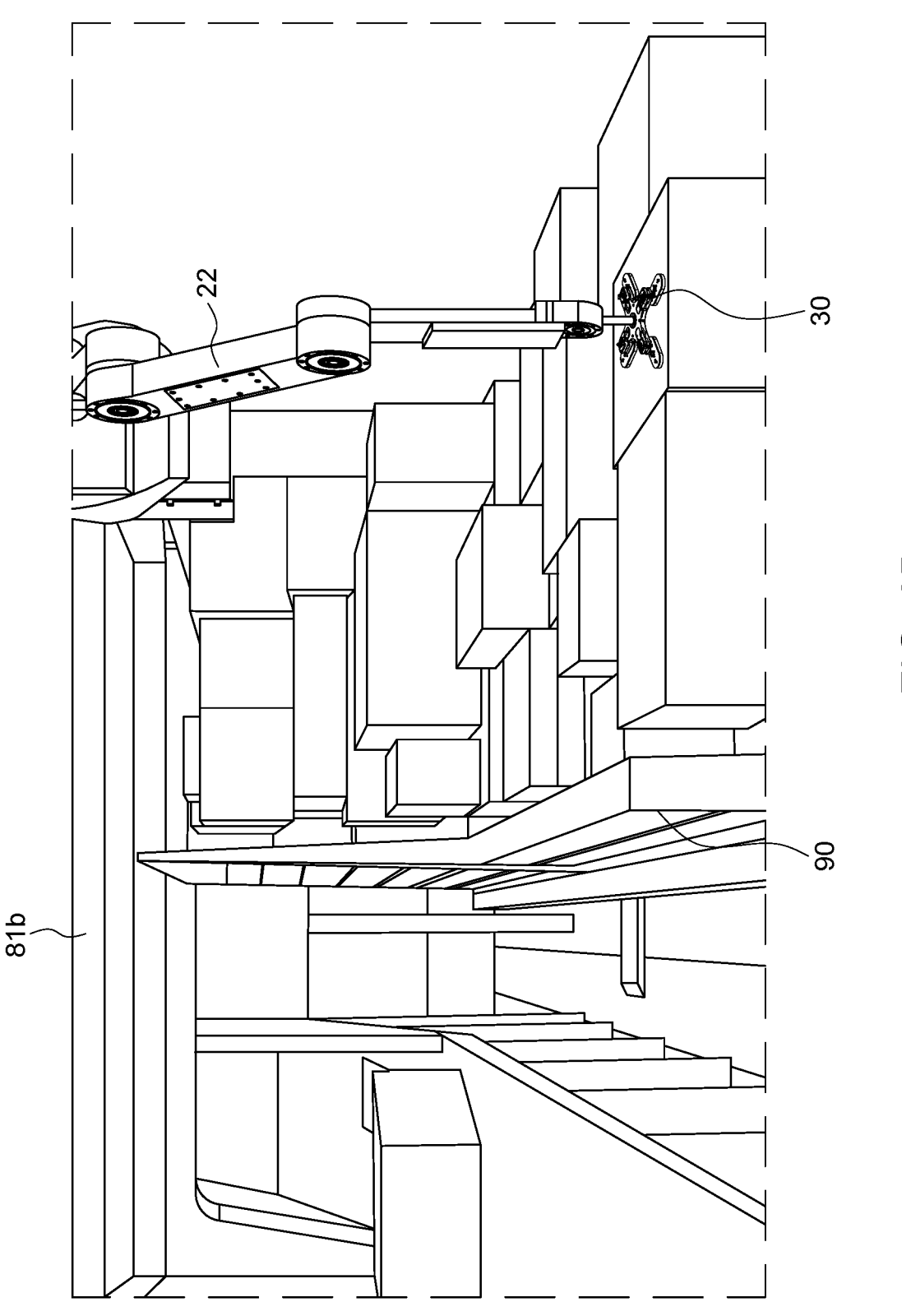
FIG. 6B presents a presents the work environment of FIG. 6A but towards the end of the end of the implementation of the picking and placing model.

More particularly, using the images, environmental, and distance data, such as including the depth information captured by one or more image capturing devices, the position of a parcel to be grasped may be determined such as with respect to one or more of the positioning elements 22 and/or gripping 30 devices along with one or more of a skid sled 80 and conveyance 100. More specifically, the distance from a parcel to a gripping device 30 of a positioning element 22 may be determined and continuously updated, such as in real time, so as to better allow for the grasping and positioning of a parcel, such as with regard to an associated skid sled 88 (as depicted in FIGS. 6A and 6B) and/or conveyance (as configured in FIGS. 3D and 3E) configured for transporting parcels. In certain instances, the environment, along with the conveyor belt 67a, positioning elements 22, gripping devices 30, and parcels moving along the conveyor belt 67a may be defined such as with regard to their one, two, or three dimensional coordinates, so as to define each element in space and/or with regard to movement within that space.

Specifically, a current position and/or line of movement may be defined such as with regard to a coordinate system, such as a Cartesian or Polar coordinate system. In such instances, a position of a parcel may be defined by coordinates defining the bounds of the parcel, e.g., with regard to one or more X coordinates, Y coordinates, and Z coordinates within a coordinate system, such as over time. This data may then be used to determine the position of a parcel as it moves, e.g., toward a positioning element or conveyance 100 and/or skid sled 90 of the system, such with regard to linear motion of the parcel along a given, e.g., X axis. Likewise, the parcel's height and width may also be determined such as in relation to the bounds of its packaging along a Y and Z axis, e.g., via measurements taken over time and at different orientations by a distance scanner, such as including an infra-red laser.

Accordingly, the system 1 may be configured to determine one or more dimensions and one or more distances along one or more axes within an environment, so that a controller 26 associated with a positioning element 22 having a plurality of gripping instruments 30 associated therewith will know how far it has to travel, at which height, and with what width between the gripping instruments are needed for grasping and moving the parcels from the conveyor belt such as for placement of the parcel at a precise location within the conveyance for transport. Hence, all of these distance and movement data may be made with respect to the system determining the dimensions and movement characteristics of the parcels, with respect to the dimensions and movements of the components of the system employed for grasping and moving of the parcels for placement, e.g., in accordance with a determined placement model. For instance, various of the components of the system may include distance scanners 99 and/or controllers 26 that are configured for measuring relative distances and/or determining the relative motion and distances of the parcel moving on the conveyor belt 67a in relation to the movements of the gantry 70, or automated base unit 70a, the positioning element 22, and the gripping instruments 30, as they move to contact and grasp the parcel.

This movement data may be fed into the analytics system 91, where it may then be employed in the generating and/or updating of one or more of the picking and placement model(s). Along with the generated models, the analytics platform 91, may generate instructions for directing the movements, motions, and orientations of the various components of the system with regard to the system implementing the model instructions. In this regard, a real time feedback loop may be created so as to continuously update the model as it is implemented in real time, so as to allow for real time changing of model parameters as necessitated as environmental conditions change, such as due to the movement of various objects within that environment.

Particularly, as can be seen with respect to FIGS. 6A and 6B, presented therein is an autonomous bridging system 80, wherein the bridging system 80 includes a plurality of frame members 81 that are coupled to one another so as to form a mobile cube framework structure that surrounds a conveyor system 60. For instance, as depicted the bridging system includes four vertical frame elements or posts, e.g., 81a, 81c, 81f, and 81h, which vertical frame posts are separated frame one another, but connected by four corresponding horizontal support elements, 81b, 81d, 81e, 81g. Accordingly, these horizontal support members 81b-g may be configured to form a frame surrounding a conveyor belt 67a, whereby one or more positioning elements 22 may be moveably coupled to the posts and/or support members via one or more moveably translation brackets 74 in a manner that will allow the associated positioning elements to move around a conveyor system 62 in all of a horizontal, vertical, as well as in and out directions, such as along an X, Y, and Z axis. Hence, upon receipt of received instructions, the intelligent bridging system 80 may be moved and/or adjusted so that the positioning elements 22 and gripper units 30 may positioned proximal a conveyor belt portion 62a, whereby parcels being translated on the conveyor belt 67a may be grasped.

More particularly, the received instructions may be transmitted from the analytics platform 91 to control units 65 and/or controllers 26 of the moveable conveyor system 60, the intelligent bridging system 80, the autonomously controlled loading system 20, such as the positioning element 22 and gripper instrument 30, the translating platform 70, automated base 70a, and the like, for implementation thereby, such as by one or more of the controllers 26 and motors 25 associated with the various components of the system. For example, the generated instructions received by one or more controllers 26 can direct the motors 25 of a moveable bridging system 80, positioning element 22, and/or griper(s) 30, such as positioned within a warehouse, such as where the positioning element 22 is associated with the automated bridging structure 80, to move from a retracted to an expanded condition so as to be positioned proximate a parcel to be grasped, and further to move from an expanded to retracted condition so as to grasp and move the parcel, such as from a conveyor belt 67a to a position for placement, e.g., within a skid sled 90, as seen in FIG. 6B, and eventually within a conveyance for transport 100. Specifically, with respect to the positioning element 22, a control unit 65 and one or more controllers 26 of an autonomous bridging system 80 may receive instructions that direct the bridging system 80 to position itself so that an associated positioning element 22 may move along one or more longitudinal axes, such as along a forward or reverse direction, or along a side to side direction, and even an up and down direction, so as to position the positioning element 22 proximate a conveyor belt 67a translating parcels.

Once positioned proximate the conveyor, e.g., belt, system 60a, a sub-system positioning element master controller 65, of the positioning element 22 may receive instructions for moving the positioning element 22 horizontally, e.g., along a horizontal braiding support element 81b, 81g, and/or inwards or outwards along support elements 81d and 81e, as well as vertically, up and down, e.g., along a vertical post elements 81a, 81c, 81h, or 81f, such as in the implementation of a picking and placing model. For example, as indicated above, a translatable 74 and/or rotational 79 coupling mechanism for coupling the positioning element 22 to the bridging member may include one or more sprockets, with one or more gears, along with one or more motors and/or drivers, whereby upon receipt of the control instructions, the motor may push the driver to turn the gears, which in turn moves the automated bridging system and likewise the positioning element horizontally, vertically, and/or rotationally. This same or a similar configuration can be used to move the positioning element with respect to the gantry and or a portion thereof, as shown in FIGS. 3, as well as to move the positioning element with respect to one or more bridging elements, such as shown in FIGS. 6A and 6B.

For example, as shown, the system may include one or more bridging elements 81 of a bridging framework 80 that may be configured for assisting the movement of one or more positioning elements 22 along the bridging framework 80 with respect to one or more of a conveyor belt 67a and/or a skid sled 90, whereby the positioning element 22 may move along one or more axes of the bridging structure 81 to the conveyor belt 67a to pick up a parcel, and then move proximate a skid sled 90 or other conveyance for placement. Likewise, in a similar manner, in particular embodiments, the coupling device between the positioning element 22 and the one or more gripping instruments 30 may also include one or more sprockets, with one or more gears, along with one or more controllers, motors and/or drivers. Upon receipt of the control instructions, the motor may push the driver to turn the gears, which in turn moves the gripping instrument 30 relative to the positioning element 22 horizontally, vertically, and/or rotationally, such as about one or more sprockets of the one or more gears, e.g., of a gear rack assembly. In such an instance, rotation of the gears causes movement of the positioning elements 22 and/or gripping instruments 30. Further, in various instances, where a plurality of positioning elements 22a and 22b are being employed one or more motors, sprockets, gears, and/or drivers may be employed to drive the opening and closing of the gripper instruments 30, such as with respect to one another, e.g., for opening and closing, such as for grasping an object.

Consequently, with respect to positioning of the positioning element(s) 22, e.g., robotic arms, and/or gripper(s) 30, with respect to an object to be grasped, one or more imaging devices 98 and/or distance scanners 99, and/or other position sensors 95, can be used to give real time movement and location data so as to locate the positioning element 22 proximate a parcel, and for opening up the arms of the gripper element 30 to the correct width of the object to ensure a complete grasping of the object between the arms of the grippers 30. In particular embodiments, to further assist in grasping objects, an actuator of the gripping instrument 30 may be configured for initiating the vacuum or suction unit, e.g., including a vacuum generator, to apply a vacuum or suction to the parcel to more strongly grasp the object to be moved.

In certain embodiments, the gripping interface may include magnets, where the parcel may be coated with a magnetic strip, and/or the gripping interface may include vacuum cups for being depressed and further grasping the object when a suction force is being applied. In particular instances, the suction force may be applied to the vacuum cups in a differential manner. Once positioned proximate a stacking of parcels to be transported, such as within a skid sled 90 or conveyance 100, the parcel to be placed within the stack can be orientated and positioned within the stack at the appropriate position, the vacuum may be ceased, and the parcel may be placed.

Particularly, once a parcel has been identified and/or characterized, such as with respect to its dimensions along with its speed and direction of motion, the characterized parcel may be identified, typed, classified, and then may be compared to one or more models of previously determined parcel types, having predetermined characteristic features to which the features of various other parcel types can be compared. In such instances, a pre-fabricated model may be generated and stored within a database of the system whereby for each parcel having dimensions and/or characteristics of a pre-determined parcel type, a previously generated model may be used for the picking and/or placing of parcels that fit within the pre-determined parcel type and/or the previously generated placement model associated therewith. Specifically, the image processing unit employs the one or more determined features of the parcel to the characteristics of a class of types of parcels, stored within a database of the system having the same or similar feature characteristics. In this regard a percentage of matching between a parcel identified, e.g., on a conveyor system, to a set of model parcels stored within a database may be determined. Once typed and identified, the parcel may be fit within a model, e.g., based on type, such as in a nearest neighbor or best fit model. However, if it is determined that the identified and/or characterized parcel does not fit in to a previously determined parcel type, or within a previously generated model, then a new parcel type and a new placement model may be defined and generated.

As can be seen with respect to FIG. 6B, in various embodiments, a stack or pile of parcels is produced. This stack of parcels may be produced within a container or a trailer of a conveyance itself, or on a conveyance, such as in an automated skid sled 90, as depicted, which is then conveyed into the container or trailer 100, or other transportation element. In either instance, the conveyor belt system 60, gantry 70, motorized base 70a, bridging system 80, positioning element 22, and gripper 30, as well as one or more imaging 98 and distance scanning 99 systems, may be configured for reaching into, or otherwise being positioned approximate to a skid sled 90 and/or trailer 100, whereby the parcels and/or one or more skid sleds 90 may be positioned and/or stacked. For instance, as depicted, a bridging system 80 and retractable conveyor system 60, e.g., a revolving carousel conveyor system, may be positioned, e.g., autonomously, proximate a skid sled 80, which in turn, may be positioned proximate a van, trailer truck, container, or other conveyance to be loaded with parcel laded skid sled 90.

Alternatively, as depicted in FIGS. 2D and 2E, in various embodiments, a conveyor system 60, such as a retractable injection system 60b, may be provided along with an associated intelligent gantry 70 or motorized, automated base 70a. In such an instance, the gantry 70 or automated base 70a may be moved, in accordance with a picking and placing operation, so as to be proximate a skid sled 90 or haul of a conveyance 100, and in doing so, the collapsible injection system 62b can be moved from a retracted and folded configuration, to an expanded, and extended configuration, whereby the injection elements may be extended into the haul of the transportation vehicle, as depicted. For example, the gantry 70 may be a motorized gantry that is configured for autonomously moving in a manner to extend the injection portion 62b and position it next to where the loading and unloading can take place. In such an instance, the gantry 70 may include one or more positioning elements 22 and/or gripper instruments 30 that are configured for unloading the injection portion 62b as the parcels are translated as the injection portions 62b are moved from a contracted to an extend configuration. Particularly, the automated gantry 70 may be loaded and moved from the warehouse to the conveyance 100, such that as the parcels are grasped and moved off of the injector they may immediately be stacked into the conveyance. In other embodiments, as can be seen with respect to FIGS. 6A and 6B, the parcels may be loaded onto a skid sled 90, in a similar manner, and the skid sled 90 itself may be positioned and stacked into the conveyance 100.

In various embodiments, once the container, trailer, van, or other transportation element is filled, e.g., substantially filled with parcels to be transported, the container, trailer, and/or van can be stacked, one on top of the other. For instance, the system may include a series of motorized lifts that are extendable upwards or downwards, whereby once a first trailer or container is loaded, a first platform of lift may be raised upwards, where a second platform containing a second trailer or container may be retained, and into which the retractable conveyor belt may be positioned, such as for the loading of the trailer. Likewise, once the second trailer is loaded, the lift may be raised again, and a third platform containing a third trailer may be positioned for loading. In various embodiments, the trailers may be of different sizes, such as at a standard length of about 33' to 52' trailers or vans, which in accordance with the methods set forth herein may be loaded or unloaded in the fastest most efficient way possible to reduce voids. Such trailer or van stacking can drastically reduce the footprint of any delivery company, as they may be stacked 3, 4, 5, or more high, and 3, 4, 5, or more wide, while still leaving space open for retrieving each vehicle as desired. Hence, instead of having to back up every van to the conveyor system, they can be stacked vertically, thereby cutting the filling and loading process of the trailers or vans section by greater that 50%, greater than 60%, greater than 75%, 85%, or even greater than 95%.

With respect to the artificial intelligence module, in one aspect, a cloud accessible artificial intelligence module is provided. The AI module may be configured for being communicably and operably coupled to one or more of the other components of a processing facility, e.g., pipeline of processing engines, and/or one or more of the components of the moveable, retractable conveyor system, autonomously controlled loading system, translating platform, and bridging system, as disclosed herein. For instance, the AI module may work closely with a suitably configured workflow management module of the system so as to efficiently direct and/or control the various processes of the system as well as the movements of the automated mechanical components of the system disclosed herein.

Accordingly, provided herein, is an AI module that is configured for acting as an interface between an object, such as a parcel, moving along a conveyor, and a bin, into which the object is to be placed, whereby the automated mechanical components of the system are manipulated to effectuate the transfer of the object to the storage and/or conveyance bin, in accordance with one or more derived models generated by the system. For instance, in various instances, the system may be configured for receiving input data such as visual input data that the system analyzes so as to generate object characteristic and/or dimension data. Such visual data may also include object placement data, which data characterizes potential placement positions for grasped object. Image data may be captured by one or more image capturing devices, e.g., cameras of the system, which cameras may be activated upon the activation of the conveyor system. In certain instances, the system may know the objects and their dimensions before they come into view, such as in an Off-line, Bin Packing Problem, but in many instances, the dimensions and/or characteristics of the objects to be placed are not known by the system prior to coming into view of the imaging elements.

In such an instance, the workflow manager of the system may be configured for receiving and analyzing the input data, e.g., visual image data, and other such data, and performing one or more analyses on the data so as to determine one or more characterizations of the data, such as dimension data, configuration data, and the like, which data may be compared with any prior placement data, so as to build a data structure whereby where to place a current object having come into view may be determined. For example, in various embodiments, the methods and/or systems herein disclosed may be adapted for correlating an object's dimensions and/or configuration and orientation data with the dimension characteristics of one or more potential placement spaces.

Accordingly, presented herein is a system and process for receiving and analyzing input data, building and storing a data structure within a database, such as a structured database, and efficiently searching the database to retrieve and display results. In particular embodiments, the structured database may be configured as one or more libraries, and the process may include searching the data structure, identifying one or more results fitting the search criteria, and correlating data. Particularly, the correlating process may include correlating dimension and/or characteristic data, e.g., of an object to be picked and placed and/or of data defining the dimensions of a space into which the object may be placed, and the like, with one or more databases of models. The database of models may include previously applied or newly generated models, and the various models thereof may be compared with one or more rules databases, such as containing the rules by which the comparisons are to be made.

Accordingly, in various embodiments, components of the system may include one or more of a server, including a processor, a database, such as a structured database, one or more sources for object related data, a graphical user interface for generating and/or presenting one or more virtual representations and/or modeled simulations, and the like. The data or files, e.g., image data and files, may be captured by the system components or may be transmitted to the system from an outside source to a repository of the system using any suitable transference protocol, which repository may be searchable, such as via a browser. The GUI may be configured for searching the plurality of image data and files, such as via use of the one or more generated index files. The server may be a plurality of servers, such as a cluster. In various instances, the system may be configured for running a plurality of workflows, e.g., pertaining to a plurality of objects to be placed, and may, therefore, include a workflow manager for implementing one or more of the analyses described herein, which in some instances, can be implemented in a processing pipelined configuration.

Accordingly, as disclosed herein, the system may not only be configured for receiving image data and sensors, e.g., movement data, of an object to be picked, but in various instances, the system may further be configured for correlating the received data with a database of stored condition and/or treatment data and/or obligation and/or rules data. The image data may include individual images or a stream of images, e.g., video, captured from various viewpoints of the various image capturing devices of the system. Therefore, there may be tens to hundreds to thousands of images of an object traversing along the conveyor system. In such an instance, the workflow manager of the system may be configured for implementing one or more deterministic rule systems, so as to derive results data pursuant to its analysis of the object characteristics and dimensions, and/or potential placement data, as well as the image, model, performance, and rules data. For example, in certain embodiments, the system may include a variety of different databases, which various databases of the system may be configured so as to have a structured and/or relational architecture, which may further be adapted to include one or more constructions.

In a first instance, these constructions may be represented by one or more table structures. For instance, a series of tables may be employed by which correlations may be made by the work management system (WMS) in an iterative fashion. Particularly, in particular use models, a first correlation may be made with respect to an object the dimensions of which are standardized or previously characterized, which dimensions may be included in one or more tables, or other data structure, such that when viewing an object, its dimensions may substantially be inferred with immediacy by performing a lookup. Another table may then be employed to correlate the object's dimension data with a database of potential placement data that is predicted to have space dimensions suitable for fitting the object in a manner that minimizes excess space. Likewise, with the appropriate feedback entered into the system, a further table may also be included and used to correlate the progress of the picking and placement operation, along with its parameters, such as the rules governing the system and its weighting regime.

A key may be used to correlate the tables, which key may be accessed in response to a command or condition precedent, such as the next object coming into the field of view of the imaging system. The key may be any common identifier, such as a dimension, a shape, an identifier, a tag, such as an RFID tag, and the like, by which one or more of the tables may be accessed, correlated, and/or a question answered. Without the key, it becomes more difficult to build correlations between the information in one table with that of another. However, the key can be generated by observation and analysis of the system. Accordingly, a key aspect of the present technology is a data structure for answering a query, such as with regard to whether an object can efficiently be fitted within an identified space, wherein the data architecture may be structured and searched in response to the query.

In a typical architecture the database may be a relational database, such as a Structured Query Language (SQL) database, which may be implemented via a relational database management system (WMS). For example, in one implementation, the SQL database may be a document and/or an image based database, such as where one or more tables, e.g., look up tables (LUT), form a structure wherein data may be stored, searched, relations determined, and queries answered. Particularly, in various embodiments, an image or table based database may be presented, searched, and used to determine relationships from which answers to one or more queries, e.g., potential placement position, may be determined.

For instance, typically, SQL databases have a relational architecture. These constructions may be represented by a table structure. A series of tables, for instance, may then be employed by which correlations may be made in an iterative fashion. For example, with respect to the proposed dimension and/or placement analyses, discussed herein, a first table may be used to store dimensions of standardized parcels, or dimensions of parcels the dimensions of which have become standardized by use of the system. Thus, a first correlation may be made with respect to determining the characteristics of an object, e.g., parcel, coming into view, and comparing those characteristic's, e.g., shape and dimensions, to a first table of standardized parcels, to quickly determine if the viewed parcel has dimensions that have been standardized. A second table may be used to store standardized space dimensions for spaces into which standardized parcels may be placed, and may include or otherwise be associated with a second table that may include non-standardized table data, e.g., storing the dimension data defining spaces into which parcels may potentially be placed.

Thus, a placement operation may include correlating one or more tables with one or more other tables, such as a table of parcel dimensions, e.g., characterizing a parcel having come into view, with a second table, such as a table characterizing the dimensions of potential suitable placement spaces. A further table may be employed, such as a table containing the rules and weighting regimes by which the correlation analyses are to be performed when determining where a particular object is to be placed, which in some instances, may include the generating of a model by which one or more, e.g., all, potential placements may be tested so as to determine the best fit. In a manner such as this, one or more objects can be characterized, e.g., as standard or non-standard, potential placement positions for the objects may be evaluated, and/or one or more rules by which an actual placement can be made can be modeled, tested, and/or performed. Another table may then be employed to determine whether the actual placement performed as predicted, or if one or more negative conditions results, in view of which data, one or more rules or weighting regimes can be modified, so as to achieve better results in the future.

The object manufacturer, boxer, or shipper may select their own identifier, e.g., key, for the object, so as to identify a standardized object, or the system can generate its own record locater by which the object can be identified and/or standardized. This process can be iterated over time so as to generate a list of standardized object and/or placement space types. Such identifiers may serve as a key that may be used to correlate the tables, which key may be accessed in response to question, prompt, or command. The key may be used so as to access, search, and correlate data from the one or more of the tables such as in response to a query or question entered or otherwise initiated by the system, such as where the query is akin to determining what the best fit for an object within a storage environment given the dimensions of the other objects within that environment and their relative configurations one in relation to another.

As discussed in further detail herein below a further data architecture that may be used to structure a database may be a knowledge and/or nearest neighbor graph or a data tree, where various data elements may be stored in a compressed, but correlated fashion, and/or in a hash table, as described herein. Specifically, in certain instances, the database to be deployed by the system may have a graph or tree based architecture, which database may be structured and used to determine the results for one or more queries. In various instances, the graph may be configured as a knowledge graph.

Particularly, a knowledge graph architecture may be employed to structure the database, so as to enhance the performance of computational analyses executed using that database. In other instances, the data structure may be a knowledge tree. In any instance, reinforced learning may be employed so as to build the data structure. In certain instances, the sophisticated algorithms disclosed herein, are adapted for structuring the infrastructure of one or more data bases, e.g., relational databases, so as to enable more efficient and accurate searching such as via performing graph or tree based analyses, as well as for performing table based analyses.

Consequently, in one aspect, devices, systems, and methods of using the same to build a searchable, relational data structure, such as described herein, are provided. For instance, in one instance, the machines and methods disclosed herein may be employed so as to generate and/or otherwise collect data, such as for the evaluation of the dimensions of one objects in relation to the dimensions of one or more spaces into which the object may be positioned, such as in a manner to reduce void space. Specifically, the machines and methods disclosed herein may be used to generate a searchable data structure for storing that data, e.g., dimension data, in a relational architecture. In various instances, additional data may be generated or otherwise be transmitted into the system, such as via a suitably configured network connection and/or API, which data may also be configured for being stored in the relational data structure, such as where object size, dimension, and other characteristics are known beforehand.

For instance, in another aspect of the disclosure, the system may include an artificial intelligence (AI) module that may be configured to provide a more comprehensive analysis on generated and/or provided data. For example, the AI module may be configured so as to implement one or more machine learning protocols on the data, e.g., image data, attained by the system that are devised to teach the AI module to perform one or more correlations, such as between various parcel and space dimensions and/or one or more rules by which a placement operation is performed so as to position the object within a suitable space.

Specifically, the AI module may be configured for receiving one or more inputs and may be adapted for building and structuring a database. For instance, in a first step, data, such as image or dimensions data, may be collected, cleaned, and then be prepared for analysis. In various embodiments, the data may be labeled and/or categorized, such as with respect to metadata, such as for providing a relational structure to the database. And once the database is structured, it may then be populated with data, in accordance with determined or inferred relationships.

In certain instances, a machine learning protocol, as disclosed herein, may be employed so as to determine relationships between data points, e.g., object and space dimension data, entered into the database of the system. Such relationships may be determined based on known facts, and as such the learning may be supervised learning, e.g., such as where the data, e.g., object dimension data, entered into the database is categorized in accordance with one or more categories and/or labels. Accordingly, this is useful for when the dimensions of the objects to be placed are known.

However, in other instances, relationships may be determined based on unknown, e.g., inferred, facts, such as when the dimensions of the objects to be placed, or the spaces into which they are to be placed, are not known, but are inferred based on dimensions analyses performed by the system. Particularly, known or inferred factors may be used to label, categorize, and store data, such as within a data structure of the system, which may be informed by the query being sought to be answered, e.g., will this object fit within this or another space. Hence, knowing factors by which to label and categorize the data being stored makes building the storage architecture more efficient.

As indicated, in other instances, the learning may be inferred, such as in an unsupervised learning. For instance, in certain instances, the data to be stored may not be known, relationships between the data may not have been determined, and the query to be answered may also not be identified, and in such instance, the system may be configured to finding answers to all of these questions. In such instances, the data to be stored is unsupervised, and as such, patterns in data to be stored and their relationships, such as commonalities between data points, may be determined, and once determined such patterns may then be used in forming the architecture that structures the data storage. For example, in various embodiments, the AI module may include programing directed at training the system to more rapidly, e.g., instantly, recognize inputs and determine how any given output was achieved based on the type and characteristics of the inputs received, such as with respect to analyzing the images of the objects to be placed that have been captured by the system. The system, therefore, may be configured for learning from the inputs it receives, and the results it outputs, so as to be able to draw correlations more rapidly and accurately based on the initial input of data received.

Typically, the input data may be of two general types. In a first instance, the data may be of a type where the output, e.g., the answer, is known. This type of data may be dimension, configuration, and/or weight data, such as for objects that are known prior to coming into view of the system, this data may be input into the system and used for training purposes. The second type of data may be data where the answer is unknown, and therefore, must be determined, e.g., inferred, such as where the dimensions, configuration, and/or weight data of the object is not known until it comes into view, at which time it needs to be estimated by the system. This data may be any form of data, but in various instances, may be data pertaining to a characterization of one or more objects, such as describing one or more dimensions, such as length, height, width, or other characteristics, such as weight, configuration, orientation, and the like.

As indicated, this data may be known beforehand, or it may be determined, e.g., estimated or inferred, by the system. Where such data is to be inferred, it may involve comparing image data of an unknown object coming into view against a data structure of known characterized objects to determine a percentage of similarity, and likewise, once characterized the known or inferred object characteristics can be compared against the inferred characteristics of a potential placement space. Effect or result data, such as feedback data, may then be collected so as to determine if the space was a true fit, e.g., resulted in a maximal reduction of void space, or if it did not, and it can be determined that an alternate placement would have resulted in a better fit. Dependent on the fit calculation, one or more rules and weights can then be re-proportioned so as to better effectuate placements going forward. These effects data may be used to enhance the AI module's ability to learn from the first type of input data, known input data, so as to better predict the outcome for the second kind of unknown, inferred data, so as to better correlate placement operations, especially where the object characterization data is unknown prior to coming into view of the system.

Specifically, based on historical evidence, e.g., from a plurality of prior placement operations having been accurately or inaccurately performed, the AI module may be configured to learn to predict outcomes based on previously observed data, such as with respect to comparing the characteristics of a present object to be placed to the characteristics of various other objects having previously been placed, and with regard to the spaces into which they were placed, and the resulting percentage of void space reduction that resulted from that placement as compared to the predicted reduction expected to have been achieved if placed in an ulterior position. More specifically, a rapid and efficient placement platform is presented herein, wherein the platform is configured to correlate known or inferred characteristics of an object to be placed with the known or inferred characteristics of the dimensions of spaces, such as within a storage or conveyance environment, wherein the object may be placed. In such an instance, one or more object profiles may be generated for various of the objects encountered by the system, whereby a number of different classes of objects can be defined, either by being previously known or inferred and/or tested. Likewise, one or more space profiles may be generated for various of the spaces encountered by the system, whereby a number of different classes of space dimensions can be defined, such as by being previously encountered and inferred and/or tested. Particularly, in combining these two datasets, the AI module may be configured for determining the various interrelationships between them. Accordingly, at the heart of the AI platform may be a structured architecture, such as a graph or tree based data structure, which may be configured for receiving image data, such as from objects and spaces encountered by the system in performing placement operations.

In various instances, other data may be entered, collected, or retrieved by the system, such as where the system may be connected to various box manufacturers and shippers, so as to retrieve standardized box dimensions therefrom, and any type of other data useful in accordance with the systems and methods disclosed herein. As indicated, the system may be configured for employing the received data in one or more learning protocols, such as for machine learning, for example, deep reinforced learning. For instance, machine learning may be implemented by training the system to instantly recognize how an output was achieved based on the type and characteristics of the input received. The present system is configured for learning from the inputs it receives, e.g., object visual characteristic data, and the results it outputs, e.g., void space reduction data, so as to learn to draw correlations more rapidly and accurately based on the initial input of data received.

The system, therefore, receives a first set of data wherein the outcomes are known, e.g., the dimensions of the objects to be placed and/or the spaces into which the objects are to be placed, are known, and placement models are generated and placement procedures are performed, tested, and evaluated against known placement solutions where the optimal outcome efficiencies have previously been determined and are known. This data is employed by the system to generate one or more rules by which a test result, e.g., a test placement efficiency result, may be obtained, and once obtained the result can be compared to the known determined efficiency outcome. Consequently, the system is configured to train itself to better recognize correlations between data points within the database more accurately, e.g., with less false positives, and more efficiently, and to make predictive outcomes.

In such a manner as this, the machine learning algorithm may learn behaviors, determine accuracy, and may be used by the artificial intelligence module to analyze further sample sets with respect to answering one or more search queries, such as a query requiring the AI module to infer correlations between nodes, e.g., data points, and connections, e.g., relationships. Hence, once the AI machine learns the behavior, the learned behavior may then be applied to a second type of data, so as to train an inference engine, which inference engine may be used to answer one or more unknown variables, such as with respect to characterizing a parcel coming into view. The more the machine learns from the first, known type of input data, the better the inference engine becomes at predicting the outcome for the second, inferred kind of input data.

Specifically, based on historical evidence, the artificial intelligence module may be configured to learn to predict outcomes based on previously observed data. With respect to the placement efficiency goals to be achieved, object characteristic data, and/or placement space data known by the system, may be used to determine efficiency levels, and this data may then be used to measure the efficiency of placement operations where one or both of object and space characteristic data is unknown, but inferred. Hence, the present pick and placement analysis platform is configured to correlate observed but unknown object dimensions with observed but unknown placement space dimensions, where a specific placement efficiency is desired to be achieved. In such an instance, the object and space dimension data can be defined and described, such as mathematically, in such a manner that their character profiles can be completely delineated. Particularly, in order to combine these data, their interrelationships may be determined.

Accordingly, in a first step, a graph database, e.g., nearest neighbor or knowledge graph may be constructed. For example, in this instance, the knowledge graph may be composed of three typical elements, which basically include a subject, a predicate, and an object, these may form nodes, and the relationship between the nodes must be determined. Any particular data point may be selected as a node, and nodes may vary based on the queries being performed. In this instance, objects and/or placement spaces and their dimensions may form the nodes of the data structure, e.g., the graph based structure.

There are several different types of relationships that can be determined, e.g., between object nodes and space nodes. For instance, relationships may be determined based on their effects, e.g., they are effect based; or they may be determined based on inferences, e.g., relationships that are unknown but determinable, such as a correspondence or non-correspondence of their dimensions. Particularly, each effect and/or relationship may be characterized by different properties or characteristics, which characteristics may be used to generate weights, probabilities, make assumptions, and the like. Such properties may be used to populate the graph, e.g., knowledge graph, with data points that may form the nodes of the graph.

More particularly, to better determine causal and/or predictable outcomes the various different relationships may be weighted, such as based on the degree of certainty, correspondence, number of commonalities, number of instances sharing the node, number of common relationships, and the like. In various embodiments, a schema may be formed, such as where the schema is an architecture that is used to give structure to the graph. Hence, the construction and implementation of a dynamic data structure, e.g., knowledge graph, may be at the heart of the pick and placement analysis platform.

For example, as indicated above, with respect to constructing a knowledge graph, any particular data point may form a node. For instance, on one portion or side of the graph parcel characteristics, such as dimensions and weight, may be input as nodes. Likewise, on another portion or side of the graph placement space characteristics, such as dimensions and orientation, may be input as other nodes, and relationships between them may be defined and/or demarcated, e.g., as edges. In between these two nodes may be a third node, e.g., a series of third nodes, such as including one or more rules, weights, models, correlations, and the like.

Specifically, when building a data structure, such as a knowledge graph or data tree, characteristic data of parcel shapes, sizes, orientations, along with the shapes, sizes, and orientations of the spaces into which the parcels are fitted may be input into the data structure as nodes. Additionally, efficiencies, which may be determined by fit characteristics, and which may include percentage reduction in void space, may also be input as nodes. One or more other nodes, such as for placements that did not work out, or models, such as models that worked or didn't work may be populated within the knowledge graph. Further, one or more rules and/or weighting regimes may also be included.

Once these two or three or more sets of nodes have been established one or more queries may be input into the system, from the presence of which the relationship(s) between the two original nodes may be determined. For instance, in one example, a first set of nodes may be represented by the characteristics and/or dimensions of an object, e.g., a parcel to be placed, and a second set of nodes may be represented by the characteristics of one or more placement positions. In such an instance, one or more third nodes may be input to the system and generated within the graph, such as where the third node may be one or more rules that mediates between the parcel nodes and the space nodes, such as with regard to configuring one or more models for transferring the parcel to a placement position.

A series of relationships may then be determined by analyzing various points of connection between a combination of these items. Particularly, in a particular instance, one node may represent a parcel's dimensions, a second node may represent dimensions of a selected placement space, and a third node may represent one or more rules for evaluating and/or weighting the likelihood that parcel can be placed in the space with an increased reduction in void space. Likewise, this process may be repeated for multiple parcels having the same or similar characteristics and/or spaces having the same or similar characteristics, so as to generate a placement model for the grasping and placing of parcels as they come into view on a conveyor. Hence, in a manner such as this, the correlation between parcel's dimensions and the proposed space dimensions may be determined.

Accordingly, a step in building a pick and placement data structure, such as a graph, may be to define one or more anchor nodes, these represent the two bounding elements between which all the various commonalities can be defined and explored. A further step may be to define all the possible known correspondences between the two anchor nodes, which may be represented in the graph as a further node, such as a rules node. These known correspondences may be built around detailing the effects caused by and/or the characteristics of one node or the other. These may form the known and/or observable relationships between the nodes. From these known relationships, a second type of relationship may be explored and/or determined which relationships may be built on inferences. Further, to better determine causal and/or predictable outcomes the various different relationships may be weighted, such as based on the degree of certainty, number of commonalities, number of instances sharing the node, number of common relationships, and the like.

Hence, in various embodiments, the construction and implementation of a dynamic data structure, such as a knowledge graph, may be at the heart of generating the parcel and space characteristic, such as for generating placement models. As indicated, the various processing platforms of the global system may be coupled together, so as to seamlessly transfer data between its various components. For instance, as indicated, the generating, receiving, and transferring of parcel and/or space dimensions, as well as evaluation data from determined correspondences between the two, e.g., results data, from one part of the system, or outside of the system, to the artificial intelligence module may be performed in a substantially seamless manner, such as via a hyper-interconnect.

Particularly, the AI module may be configured for receiving object characteristic data from an outside source, or may determine such characteristics via inference, or comparison of image capture data to one or more object models, this data may be input into the AI module, and be used to generate one or more nodes within the data structure, e.g., knowledge graph. Furthermore, the system may further be configured for generating one or more placement models, based on generated correspondences between parcel and the space characteristics, as well as the expected efficiencies to be achieved by their implementation in the placement process, which placements can then be used as models for other such placements of parcels having the same or similar characteristics, configurations, and the like, and the resultant efficiencies can then be used to fine tune the models, e.g., iteratively. Particularly, these model and efficiency data can then be input into the data structure as data points, which can be analyzed in relation to the characteristic data of parcels and their placements to better assess placement qualities, re-weight various nodes, and update the model(s).

More particularly, once the knowledge graph architecture has been constructed, it can continually be updated and grown by adding more and more pertinent data, e.g., regarding each parcel being placed in each corresponding space, into the knowledge structure, building more and more potential nodes and/or relationships. In such an instance, the bounding nodes may be of any combination of nodes, and as such, in certain instances, may be user selectable. For instance, in various embodiments, the system may be configured for being accessible by a third party, such as by warehouse owners and/or shippers and/or object recipients, as well as by those overseeing the administration of the system, and the like. In such an instance, the user may access the AI module, e.g., via a suitably configured user interface, upload pertinent information into the system and/or determine the relevant nodes by which to bound an inquiry, e.g., by clicking on or drag and dropping them via a dashboard interface, and may formulate a relevant question to be answered by the AI module.

Accordingly, the system itself or a user may review and/or select the bounding nodes, and then the system may generate an appropriate data structure, e.g., knowledge map, employing the selected nodes, and determine the relationships between the nodes, from which relationships various inquiries may be queried and answered, or at least be inferred, e.g., by the AI system. Particularly, with these data the AI module may generate one or more suitable data structures, e.g., knowledge graphs (and/or add to an already existing knowledge graph), from which knowledge graph(s) the bounding nodes for the parcels, their characteristics, and one or more potential placement dimensions, may be selected and relationships between them determined. A workflow for determining characteristics of one or more objects and/or characteristics of one or more spaces, generating placement models, evaluating efficiency predictions may be worked up, a query, e.g., a proposed placement query, may then be run, so as to determine the space into which the object can be positioned with in the least amount of time and with the greatest reduction in void space. Likewise, a series of other similar workflows may be engaged in, such as for each parcel coming into view, so as to determine an entire picking and placement regime so as to pack an entire bin, or until there is no further objects to be placed.

A predictive model may be initiated on the data to determine one or more relevant query results pertaining to one or more of the generated work ups, which results can then be combined, compared, and one or more trends identified, such as with respect to overall efficiencies achieved by the various placement models employed. Likewise, the system may include a large database of images of objects and their sizes, dimensions, weights, and other characteristics, as well as the characteristics of spatial configurations, and placement models, efficiency scores, and timing data, which the system can use for performing deep reinforced learning. In any of these instances, these characteristic and results data may be uploaded into the system and may be populated into one or more data structures, e.g., knowledge graphs of the system, whereby various nodes may be identified and/or correlated from which data correlations and various relationships may be determined, inferences assessed, calculations performed, and predictions made and/or reported.

For instance, in such a manner, this data, as well as any other relevant data, along with all properties relevant to a particular query to be analyzed, may be uploaded into the system, and be used to form a constellation of nodes. These nodes, e.g., in a nearest neighbor or knowledge graph, may be employed to determine various relationships pertinent to the objects and/or the object's placements and spaces. These relationships may be determined by querying the system and allowing it to generate the appropriate connections from which an answer may be inferred. Once populated in a manner such as this, one or more queries may be run against the data so as to isolate various sub-profiles that may then be mined for relevant relationships, correlations, and/or relevant characteristic data.

Specifically, these relationship, correlation, and characteristic data may then be employed by the AI module so as to determine one or more other correlations and/or perform one or more calculations with respect thereto, and thereby derive and propose one or more picking and placing operations. Specifically, these data may be employed so as to determine a picking and placement regime to be implemented, which placement regime may include the generation, implementation, and evaluation of one or more placement models to be tested and/or performed.

The results of the picking and placement regime may also be entered into the system and tracked over the course of time. In various embodiments, these results may be used to generate a collective knowledge graph of a plurality of previous placement models over a longer period of time. In such an instance, pertinent data may be entered into the system, any relationships between them may be determined by the AI module, such as relationships that are common between them, e.g., relationships between two or more characteristics of an object or placement space, may then be determined.

More particularly, in one use model, a relationship between two properties, e.g., property A: the characteristics, e.g., dimensions, of an object to be placed, and property B, one or more characteristics of a proposed placement space, may be determined by the system. Then one or more rules for performing a placement operation may be identified, generated, and/or employed for the performance of a placement operation. And this data for one object can then be compared to other such data from objects and/or spaces with the same or similar characteristics, whereby one or more predictions may be made as to whether void space will be decreased, e.g., maximally decreased, by placing the object in the identified space, and to what extent.

Specifically, a series of historic data for all objects placed and for all spaces into which those objects are positioned, may be entered into the system, e.g., such as from a plurality of placement operations, such as 10,000, 100,000, 1,000, 000, 10,000,000, 100,000,000 placement operations or more. The machine learning platform of the system may then analyze the placement procedures. In a manner such as thins, one or more correlations and/or relationships between the two properties may be determined, such that if a given property, e.g., characteristics of A, are entered into the system, and a second property, e.g., space characteristics B, are entered into the system, than a third condition, e.g., relationship C, such as whether a given object will fit within an identified space, and if so, how efficiently, may be predicted.

Particularly, where a prediction is to be made, a historical context may be generated. Such historical context may be useful where previous instances of conditions A and B have resulted in a positive outcome C, then conditions A and B may then be used to weight and predict the outcome of a subsequent occurrence of conditions A and B leading to the positive outcome C, such as where output C may be inferred, taking the predictive weights between the two into account. In such an instance, when evaluating the inputs with reference to properties A and B, a relationship between the two may be determined by the artificial intelligence processor, such that if given a new input for properties A and B, the determined relationship C may then be used to predict what the outcome of property C will be, given that the two properties are in fact mathematically related.

This machine learned relationship may, therefore, be employed to determine when the two properties are in alignment with one another, e.g., everything is functioning as it should. But the relationship may further be used to determine when things are not functioning in alignment. This is useful when the predicted outcome is not observed, and thus, is indicative of their being a problematic state, which may be flagged by the system, e.g., such as where the object does not fit into the space, or at least not efficiently. In certain instances, however, the relationship between two or more properties are not linear, but rather may be more complex. For instance, in certain embodiments, the artificial intelligence module may be configured to model more complex processing of relationships in a manner similar to a neural network, such as in a deep learning protocol.

Accordingly, although in some instances, the relationships may be configured in a linear array, such as to form a direct linkage between the properties, in other instances, the relationships may be layered one on top of the other so as to form a stacked or layered, e.g., neural, network of information. Hence, in particular instances, the relationships may be formed in a multiplicity of stages and/or levels, where one level of information is connected to the next level of information, such as in a deep learning protocol. Additionally, the relationships between the various properties from one, or the same, level to another may be strengthened, and therefore given greater weight, or weakened, and consequently given less weight, by the machine learning protocol engaged. Hence, as information is processed and allocated across the properties in the different, or same, levels of the system, at each stage, a variety of different points are being given greater and greater, or lesser and lesser, weights, such that when given a particular input, the AI module may more efficiently predict a given outcome more accurately based on the various different levels of weighted historical information.

For example, the AI system may be adapted so as to process information in a layered or multi-staged fashion, such as for the purpose of deep learning. Accordingly, the system may be configured to evaluate data in stages. Specifically, the AI module may be adapted such that as it examines various data, such as when performing a learning protocol, stage by stage, level by level, where each connection between data gets weighted by the system, e.g., based on historical evidence and/or characteristics of relationships. The more stages and/or levels of learning that are initiated within the system the better the weighting between junctions will be, and the deeper the learning. Further, uploading data in stages allows for a greater convergence of data within the system.

Particularly, various feature extraction paradigms may also be employed so as to better organize, weight, and analyze the most salient features of the data to be uploaded. Additionally, in order to better correlate the data, one or more users may input and/or modulate basic weighting functions, while the system itself may employ a more advanced weighting function based on active learning protocols. For instance, a deep, e.g., reinforced, learning protocol may be employed in training and implementing a search function of the disclosure as discussed herein.

More particularly, deep learning is a paradigm where increased levels of datasets are employed in generating an answer to a query. If there is only one stage of learning involved when answering a query, the network architecture may be configured as a neural network. However, if the determination implements a multi-stage learning process, when deriving an answer to a query, the architecture may be configured as a deep learning network. The more stages there are, e.g., where each stage includes a weight, the deeper the learning will be. But, with each stage added, the computing power required to make the data converge becomes greater and greater. Specifically, with each additional data set being processed, another node is generated, which increases the level of future processing power that will be required to process that data.

With respect to the present disclosure, when running a deep learning protocol, the process may first implement a feature extraction protocol, where salient features, e.g. of an object or a space, are extracted and considered in comparison with similar features stored in a database of previously extracted features. In such instances, each feature may represent a characteristic that may be categorized into one or more classes or labels. Such labels may be used to recognize patterns whereby the machine can therefore be trained to recognize the reoccurrence of those patterns in other representations, and thereby draw conclusory predictions based on those recognized patterns.

Accordingly, in order to perform machine learning having a library of functions is useful. This is useful, for instance, where a model, such as a proposed placement model is generated by the system, the model may include a series of anchor characterizations, such as of a series of modelled object and/or placement space dimensions, which anchors may be identified, and subsequent analysis or distribution does not need to involve analysis or distribution of the entire subsequent characterizations, such as of new objects coming into view, or new spaces forming, but rather, only data pertaining to any differences or divergence from the anchor models. The models and their characterizations can continuously be updated, such as in response to an object not being placed in a space with an efficiency predicted by the model. This is termed feature extraction, the preferential analysis of the anchor characterizations, or in some instances, only the deltas.

Accordingly, in various instances, methods disclosed herein are directed to using labels, e.g., a pointer mechanism, to categorize and structure a database, such as for use in the artificial intelligence module to analyze data therein, such as in performing a placement operation. In such machine learning the data may first be cleaned and prepared for feature extraction, e.g., of dimension, size, shape, orientation, and/or other significant characteristic data. Such data, once extracted may be captured with respect to an object, a group of objects, a population of objects, a space, a plurality of spaces, etc. and may be based on one feature, a plurality of features, etc. thereby building a library of features as data is coming into the system. And once the data is in the system, the system must train the machine to build the graph or data tree assembly so s to generate potential levels of correspondences.

As indicated, the AI system may be configured for answering a query, such as where and how to place an object in a space. Accordingly, when performing a search function of the AI repository or database, the database may be configured as a relational database, wherein the architecture of that database is such that it is structured as a table or tree, or the architecture may be configured such that data is stored therein in a graph form, such as a knowledge graph, or tree graph, as described above. Additionally, when performing a search of the database, the search may be an effect based, or an inference based, search query.

An effect based search is typically one where the outcome is known and/or expected, whereas in an inference based search, the outcome is not known. Although table based searching is useful, it is based on known relationships that are categorized by tables, which may be searched by using the known key. Such searching is generally effect based searching, where the answer is known, and the relationship with its query simply needs to be identified, e.g., via the use of the key. This is useful for searching tables, such as described above.

Inference based searching, on the other hand, is where the relationship between two data points is unknown, but to be determined. Such determinations may be based on the building of a knowledge graph or data tree or other data structure and the learnings of the system, with respect to other relationships and the rules of those relationships, which allow for new relationships to be discovered and otherwise unknown outcomes to be determined.

As such, the generation and implementation of the knowledge and/or tree graph is a useful feature of the present search function in an inference based learning schema upon which the machine learning and inference engines, as herein described, are primarily built. Hence, as data flows into the database, it is formulated into one or more of these or another such structure, and the data, e.g., where its relationship to other data is known, may then be employed to train the search function of the system to determine data points and/or relationships between data points where the relationship was not heretofore previously known. In such instances, a key is not required to determine the presence of a relationship, rather it is inferred.

Specifically, once the known relationships have been determined, e.g., through a training process, the newly trained system, and the rules developed thereby, may then be employed to infer other relationships, heretofore unknown, between the data points with a probability establishing the prediction that the inferred relationship is in fact an actual relationship. In such a manner, various characteristics of an object and/or a potential space into which that object may be placed may be determined and entered into the system, as one set of a collection of data points, and this data may be employed to build a knowledge or tree graph or other data structure whereby the various relationships, known and inferred, between these data may be determined. This may be done for one or a plurality of objects, where the relationships and the learnings therefrom may be used to determine known outcomes, such as for training the system, and once suitably trained the system may then employ these learnings in determining heretofore unknown relationships so as to infer outcomes therefrom, such as with respect to whether an object will fit into a space and to what extent will doing so be efficient.

Hence, known facts and relationships may be used to train the AI engine, which once trained may determine rules by which unknown relationships may be determined and outcomes based on those relationships may be inferred and/or otherwise determined, such as by a suitably configured inference engine of the system. More particularly, objects having known characteristics, such as known sizes and dimensions, may be entered into the system, but in such a manner that a model generating portion of the system does not at first know the characteristics of the object, but must predict them. When the image analysis is performed and a prediction is made, if the prediction is right, then the system configurations are rewarded, but, if the prediction as compared to the known characteristics, is wrong, then the system can be reconfigured, weighting readjusted, and a new prediction made. In a manner such as this, the system's AI platform may be trained. This data can then be used to generate models for characterizing unknown objects based on a model of known qualities and quantities.

Hence, an object of unknown characteristics to be picked and placed can be imaged, the images can be analyzed, characteristics, e.g., the dimensions, of the object, can be determined, e.g., inferred, such as in comparison to a generated model, and the object can be characterized, especially with respect to its size, shape, weight, orientation, and the like. This can be performed for all objects encountered when performing picking and placing operations so as to build out a comprehensive objects based model. Likewise, images of spaces with known dimensions can be imaged, and the AI module of the system can make predictions about such dimensions. Consequently, like above, when an image analysis is performed and a prediction is made, if the prediction is right, with regard to the size and shape of the space, then the system configurations are rewarded.

But, if the prediction as compared to the known characteristics, is wrong, then the system can be reconfigured, the weighting readjusted, and a new prediction may be made. Hence, in like manner, a space can be analyzed, whereby one or more data points pertaining to a plurality of the characteristics of the space can be defined in a model, and all subsequent images of new spaces, as they emerge, can be analyzed and entered into the system, so as to further build out the model. The system may then receive these data, and one or more features may be extracted, and one or more nodes may be formed, which may be used to generate a knowledge graph or tree. More specifically, with respect to the above, provided herein are systems, devices, and their methods of use for solving the offline and/or online Three-Dimensional Bin Packing Problem (3D-BPP), with increased resolution at the level of discrete quantities, which can be achieved via the intense learning, e.g., deep reinforced learning, paradigms developed and implemented herein.

For instance, in the online version of the 3D-BP problem, the objects, e.g., parcels, on the conveyor system are presented to the image capturing device of the analytics system agent without previously being known or defined by the system, and in an order the sequence of which is not typically determinable by the analytics module of system. In such an instance, the analytics module acts as an agent that must make decisions, e.g., as to how and when to grasp parcels and in what orientation, as well as how and where to place them, and thus, the analytics system must be trained to make correct decisions with regard to picking a parcel coming in to view, e.g., on a conveyor, and directly placing the picked item into a target bin stably, without having a preview or ability to change the order of parcel arrival. However, because the conveyor system is moving, the placing system only has a limited period of time within which to make a decision and/or implement a decision, such as prior to the next parcel coming into view.

In this regard, an active environment can be defined. For instance, the environment may be defined as the space and its surroundings within which a parcel is being moved or translated, e.g., from a place where the parcel is stored to a place where it is to be picked up, e.g., by the positioning element of the placing system. In this instance, the environment may be a warehouse, trailer, or other storage environment wherein parcels are to be loaded onto or off of a conveyor by the positioning element and/or gripper. The environment is essentially the action space wherein the positioning element and/or gripper reside and function for the picking and placing of parcels. Particularly, in particular implementations, the action space may be represented virtually and/or mathematically, by all the actions that can be taken by an actor, e.g., the positioning element and/or gripper, within an environment, such as in regard to performing a particular picking and/or placing operation. Hence, where a picking and placing operation is being performed within the environment, it physically may be defined as an active space, which can be modeled virtually by the computing architecture, whereby the analytics system can generate one or more picking and placing models, as discussed above, for all the actions that can be taken with respect to picking and placing each object to be picked and placed as it comes into view of the imaging agent of the system.

In performing such modelling, a state of each acting agent, e.g., component acting within the active space of the environment, such as a positioning element and/or gripping device of the system, at a given time period, may be defined. For example, the state of the positioning element and/or the gripping unit prior to the object coming into view may be defined, as well as its movements within the space, e.g., action space, during the picking and placing operation. In certain instances, the movements of the positioning element and/or gripper, gantry and bridging system, and the like, within the space may all be potential movements that are represented virtually, whereby all potential actions for a specific picking and placing operation may be defined mathematically, and one or more probabilities for achieving a given outcome, e.g., placement operation, with a predicted placement efficiency, can be calculated and compared one against the other.

Accordingly, one or more states, e.g., an initial or subsequent state of an active agent within the space, at a given time, may be determined. For example, the state may define the current situation of the analytics agent vis a vis the condition that the positioning element and gripper are currently in, while calculating what movements are necessary to pick and place the next object coming into view. Particularly, the state may be defined by the coordinates of the positioning element and/or gripper unit, gantry, etc., in relation to the coordinates of the next parcel to be picked up at the conveyor, taking into account the fact that the parcel is moving on the conveyor and the positioning element and gripper must move in the opposite direction to pick up the parcel. Thus, one or more actions of the various system components can be defined via a sequence of its 3-D coordinates within the action space as those coordinates change over time as the acting agents move.

More particularly, the action may be defined as the choice the agent, e.g., the analytics system, must make at the current time step, such as with respect to how, when, and where to move the positioning element and/or gripper so as to pick up the parcel, move the parcel once grasped, as well as how to orientate and place the parcel. Specifically, actions may be defined by the decisions that must be made by the analytics module and implemented by the positioning element and gripper with respect to the operations required for picking and placing each parcel as it comes into view. In various instances, the system is configured for generating and implementing one or more courses of action, vis a vis, a picking and placing operation, such as in accordance with a determinable model, e.g., a policy. More specifically, a policy sets forth what the proposed strategy for generating the picking and placing model is to be and how it is to be implemented by the system. The policy, therefore, is the analytic process that defines the decision to be made, e.g., by the analytics system, with regard to the action(s) to be taken, e.g., by the positioning element and gripper and/or gantry, such as with respect to performing a picking and placing operation.

Particularly, the policy is a probability distribution with respect to a set of potential actions the gripper and/or positioning element or gantry may take, such as where actions having a higher probability for achieving a given outcome are given more weight, e.g., a higher reward value, and vice versa for lower probability actions. In such an instance, highly rewarding actions will have a higher probability, and thus a greater weighting, and lower rewarding actions will have a lower weighting, and thus, a lower probability. Hence, in determining a model action, a reward system for weighting a given action, as explained below, may be implemented. In various instances, the implementation of a reward function to place items, e.g., in a far to near order, is useful for avoiding collisions in the planning and movement of the positioning and gripping elements described herein.

Accordingly, in view of the above, when solving the 3D-BPP, the problem may be construed as a problem of decision making, namely, which out of all possible actions should be taken to maximize space utilization, minimize movement time, while also minimizing void space. As such, as discussed above, this decision making process may be formulated as a Markov Decision Process (MDP), where the state of the system and its components within the environment initially may be defined, and then be redefined over time, e.g., continuously. Particularly, a state transition process may be defined as a first state S, which may be characterized with regard to the Markov Decision Process, as $P[St+1|St]=P[St+1|S1, ... Stn]$, where P is a probability, St is the state at a given first time, and St+1n is the state at a subsequent time, or series of times. Specifically, in these regards, the Markov Decision Process (MDP) can be employed to formulate a deep reinforced learning process by which the online 3D-BP problem can be solved, and whereby once one or more models have been generated, the deep reinforcement learning can be initiated to solve the 3D-BPP at real time, in an ongoing process, such as with a constrained or open action space. For example, in the present context the MDP is a mathematical framework used for modeling an optimized decision-making process where the outcomes are partly random and partly under the control of the dynamic programming of the analytics platform. In this regard, the actions available to be taken by the system allow for choice and further give rewards for motivation.

Particularly, the MDP is defined by states, actions, a transition function, and rewards by which a policy may be determined and tested. In instances such as this, the state may be formed by the observable context of a parcel in the picking field, and the action of the positioning element and gripper unit picking up the parcel causes a state transition. Specifically, in general, the Markov Decision Process with regard to solving the BPP, may be defined by a state "S" and a probability, e.g., a transition probability, "P," where the process includes a sequence of random states, S1, S2, S3 ..., and the state transition probability Ps (at time t)→Ps' (at time t+1) is the probability of jumping to a state S' from the current state S. Accordingly, the state transition probability (Pss') may be defined as Pss'=P[St+1=s'|St=s]. In these regards, the action "a" of the positioning element and gripper cause a state transition as defined by P(S'|s, a).

However, as indicated above, out of all the myriad of actions that can be taken by the positioning element and/or gripper, with respect to achieving a certain placement outcome efficiency, some actions may be more likely to achieve that outcome than others. Hence, to accurately represent these potentialities, some actions, e.g., those with a greater likelihood for achieving a certain efficiency result, may be given a greater weighting, and those with a lesser likelihood, may be given less or no weighting. In some instances, a minus weighting may also be given. Consequently, a Markov Reward Process (MRP) may be implemented whereby the reward process may be defined by (S, A, P, R, y), where S is the state, A is a potential action to be taken at the state, P is the state-transition probability, R is the reward, and y is a discount factor.

In a traditional MDP the state transition probability and the state rewards would be random. However, in instances such as this, by considering one or more actions to be taken by the components of the system, the rewards and the next state become somewhat dependent on the action the system decides to take, and thus, they become somewhat non-random. A discount variable may be considered to compensate for this. The discount variable y, therefore, is introduced because there is no certainty that a future reward will increase a return, and thus, a discount should be included to limit the contribution of any future rewards. Additionally, as indicated above, in employing a MDP for solving the BPP, a policy must be determined. In such an instance, the policy w is the distribution of probabilities over the set of potential actions A, given the current state S. Essentially, it gives the probability of the analytics system picking an action A at a given state S. Accordingly, the policy may be defined as $\pi(a|S)=P[At=a|St=s]$.

Essentially, the policy determines the decision being made by the AI of the system in performing the action of picking up a parcel, and defines the behavior of the analytics system with respect to implementing a reinforced learning paradigm by which that policy may be evaluated, and the best action implemented for placing the picked up parcel. Specifically, the policy is the probability distribution over the set of actions A, given the current state S. It gives the probability of picking an action A at state S. Further, the state reward Rs is the expected reward over all possible states that can be transitioned into from state S. This reward is received for being at the state S at time t=St. Consequently, the reward is received after the analytics platform makes a decision and the positioning element and/or gripper leaves the state, and hence is considered as R(t+1). Thus, the state transition probability of a given action and reward can be expressed as:

$$P^{a}ss'=P[St+1=S'|St=S],At=a], \text{ and} \qquad a.$$

$$R^{a}s=E[Rt+1|St=s,At=a] \qquad b.$$

The state reward $R^{a}s$, therefore, is the expected reward over all the possible states that the system can transition to from the initial state s. The reward is received for being at the state St, and it is received after the positioning element and/or gripper, e.g., the acting agent(s), leaves the state and is regarded as R(t+1). Once the state, actions, transition function, and rewards have been defined, then the policy can be determined, and if(s) and the expected reward can be maximized.

In this regard, to maximize the policy, the transition function may be defined by determining the probabilities of going from one state to another, such as with respect to picking and placing a first parcel, and preparing to pick and place a second parcel. Once the policy has been learnt, it may be applied by passing the current state S as an argument, and the best action A can be determined according to the policy. In such instances, various in state variables may be considered for making predictions, e.g., by the analytics module of the system, such as with regard to how to pick up a parcel, in what orientation, and into which space to place the parcel in such a manner that overall void space reduction results. For example, a current time may be employed as a state variable so as to allow the analytics module to associate time varying conditions, such as the movement of the parcel along a conveyor as well as the movements of the positioning element and the gripping unit in relation to that movement of the parcel on the conveyor.

Consequently, in various instances, a state and/or action value function may be considered, e.g., over time, where the value function may represent the long-term value of the expected return over a state and/or an action. For instance, in particular implementations, the value function, e.g., the expected return starting from state S, with regard to an action A that may be taken by a system component, may be configured to optimize the rewards. However, even after the system decides on an action, which may give a decent reward, there might be a greater total reward available in the long-run, and thus, the system should be configured for determining the greatest possible reward.

Particularly, in one instance, the agent, e.g., the analytics system acting upon the positioning element and/or gripper, can transition one or more of those components from the current state S to a proposed future state S', such as by taking action A. In such an instance, the state value function can be evaluated so as to consider the expected value of returns over all potential future states S', with respect to a variety of possible actions. For instance, the state value function V w(S) may be expressed as the expected return starting from state s, and thus the policy can be expressed as: $V\pi(S)=E \pi[Gt|St=s]$. Specifically, the state reward is the value to be received for being at state S. Further, with regard to the action value function, such as for performing the proposed action A, the action value function $q_x(S, A)$ can be expressed as the expected return starting from state S, taking action A, and thus, the following policy results: $q_\pi(S, A): E_\pi[Gt|St=s, At=a]$. Hence, it is important to evaluate both states along with actions, such as where actions are considered the parameters for state transitions, and then the action value function may be defined in such a manner that renders the expected return over all actions.

In essence, at each time step of the picking and placing process, the physical system is at a first state "S." Given the first state S, the analytics platform must choose an action "A," which is available to be taken at state S. Once the action A is taken, the analytics system responds at the subsequent time step by moving, e.g., randomly, into a new state S', and giving the analytics system a corresponding reward: Ra(S, S'). Specifically, at a first time, such as when a parcel to be placed comes into view, such as on a conveyor system, the imaging element will capture one or more images of the parcel, which images may then be passed to the analytics system whereby one or more models, or policies π, for the picking and placing operations to be performed, may be generated, an action A may be evaluated, in accordance with the preceding description, instructions may be produced and transmitted to the positioning element and/or gripper control units, and one or more determined actions may be taken. Hence, initially, the system and its components may be at a first state, such as rest, but as the object comes into view, and a decision is made, e.g., according to a first policy "π", then a picking action "A" may be determined and implemented, such as in accordance with the policy π.

For instance, in one embodiment, where a first parcel X comes into view, at a first time t, its position may be defined with respect to its cartesian coordinates, and its size, such as in x, y, and z dimensions, may be defined. An axis-aligned orientation can also be characterized. Further, given the determined size of the parcel, and its orientation, all the possible, potential placement positions may then be demarcated. With this information, the system agent, e.g., the analytics module, may evaluate all potential actions that can be taken, e.g., by the system components, to place the parcel in view in all possible relevant placement positions. In performing these analyses the system may employ a data structure whereby all potential actions can be evaluated.

Specifically, all the potential actions that can be taken, e.g., with regard to all the potential positions for placing the parcel, may be evaluated, such as with respect to a data structure by which those potentialities may be evaluated. For instance, as discussed in detail above, a data structure, for example, a knowledge graph or evaluation tree, such as a nearest neighbor graph or packing configuration tree, may be employed by which to evaluate potential actions, where possible action states may be represented as nodes on the graph or leaves on the data tree. For example, potential positions for placement during the picking and placing process can be characterized as one or more placement nodes or leaves, whereby once the parcel has been placed in said position, the respective placement node can be replaced by a packed item node or leaf, and the data structure can be updated accordingly, with respect to all other placement possibilities. Furthermore, once a new placement position, which may be represented virtually as a node or leaf, has been determined, new potential placement positions, e.g., nodes, may be generated.

Accordingly, as t+1 . . . n proceeds, the nodes and/or leaves will be iteratively updated such that a dynamic data structure, such as a packing configuration tree, may be formed. In these regards, the internal nodes will come to be represented by the space configurations that have been converted to packed item nodes, and the leaf nodes will become the packable candidate placement spaces, along with object dimensions for objects to be placed within those spaces, which spaces and objects may be defined by the boundaries forming the space opening, and defining the object dimensions, and with respect to their central axis and orientation. Likewise, the weight of the objects can be estimated, as well, the force and torque effects attendant to placing the parcels, e.g., within a growing stack of parcels, can be estimated and accounted for, so as to ensure a more stable spatial distribution so that more parcels can be placed in a more stable manner.

Thus, through the iterative picking and placing process, the packable candidate leaf nodes become packed item nodes, which can then be removed. In certain embodiments, placement may be performed vertically with a top-down packing within a bin, or vice versa down to up, or a combination of the two. When there is no packable positions that satisfy the placement constraints, the packing process may end, with respect to that item, which may be placed via human intervention, and any new parcel that is capable of being placed may be placed, until no useable space is available given the dimensions of parcels to be placed. In such instances, one time step may be equivalent to one whole picking and placing operation. This part of the operation is completely controllable by the system as it performs the picking operation. Once the item is placed, the system may then return to rest, and this may complete the state transition.

Alternatively, the environment may act on the analytics system, e.g., the agent, such as by presenting another parcel for packing, and that action sends the system to a new state based on the transition probability. This part of the process is not necessarily controllable by the system because the system may not control how the environment, e.g., the conveyor, acts. Rather, it can only control its own actions in response to the environment. Consequently, the chosen action "A", imaging a first parcel for placement, influences the move into new state S', e.g., a picking operation, such that the probability of "A" can be determined as Pa(S,S').

Hence, at the subsequent time step, state S' depends from the current state S and the action A, but is independent of all previous states and actions. For example, for state S, the probability of a next state S(t+1) occurring is only dependent on the current state, and not dependent on any of the past states. Therefore, the probability that an action A will be taken by the system in state S at time t will lead to state S' at time t+1 is Pa(S,S')=Pr(St+1=S, At=A), and the immediate reward received after transitioning from state S to state S', due to action A is Ra(S,S'). In these instances, the state and action spaces may be finite or infinite. Since, both a state and an action transition are being considered, as described above, the two transitions can be combined into a state to action transition, whereby the expected action value over all actions can be determined. In such an instance, the value for all states and all actions for all possible patterns of actions that can be implemented, e.g., with regard to picking and placing operations, for all policies, can be determined, and the policy with the highest value for states and actions can be selected for implementation, for instance, by finding the best leaf and/or node selection policy, such as to expand the data structure.

A plurality of expansion schemes, or heuristics, may be employed for expanding the data structure, specifically by reducing the number of solutions needing to be considered when making a placement decision, while not overly discounting potential placement positions. These factors are important to consider because the more the system contemplates inappropriate positions for a given parcel's dimensions, the more time is wasted. Therefore, it is beneficial to filter out, as quickly as possible, positions that are unsuitable for placement of parcels, while not discounting spaces that could be potential good fits. Expansions occurs by deciding which particular space leaf and/or node index to convert into a placement node, for accommodating the current item's placement, using placement expansion rules, such as via use of a pointer mechanism, which may be employed for effectuating placement expansion, such as corner point, extreme point, as well as empty maximal space. Additionally, the optimal values for the optimal policy may then be determined, such as by implementing a value and/or policy iteration, state action reward state action (SARSA), Q-Learning, and the like.

Accordingly, in view of the above, in various implementations, the solving of the 3D-BPP, may be performed by implementing a Markov Decisions Process, which in various instances, may involve generating one or more data structures by which one or more policy models may be generated and/or tested and selected for implementation, whereby a learning based procedure may be employed so as to implement particularized heuristics by which the on- or offline 3D-BP problem may be solved. For instance, solving the 3D-BPP may include one or more of using an initial set of rules, e.g., a generalized heuristic, so as to generate an initial data structure, and then performing one or more deep and/or reinforced learning protocols, so as to develop more specific placement rules particularized to the parcel to be placed, by which particularized rules that parcel may indeed be placed. This iterative rule-making process enables high resolution analysis by which an action space may be broken down into unique sets of parameters, where each set of parameters contains a discrete number of values such that the number of possible states within an active space may be limited. In a process such as this, high packing precision may be achieved with greater efficiency.

Particularly, as described herein, in solving the online 3D bin packing problem (3D-BPP), a hierarchical data structure, such as a hierarchical packing configuration graph or tree, may be constructed, which structure may be employed to make the deep reinforcement learning process faster, more efficient, and more effective at generating decision making models. Specifically, the referenced data structure may be configured as one or more of a three dimensional grid of values, e.g., organized into layers of rows and columns, such as a voxel grid, graph, e.g., knowledge graph, a stacking tree, and/or other such configuration, which can be employed so as to facilitate high analytic accuracy while reducing computational complexity, thus, making such analyses well suited for deep learning. In a manner such as this, an increased number of parcels of different sizes, shapes, and weights can be picked and placed within one or more, e.g., as few bins (containers) as possible, while reducing the greatest amount of void space. In these regards, both the parcel and the container sizes can vary arbitrarily, and the environment can be bounded or boundless, e.g., countless.

Accordingly, provided herein is a novel hierarchical picking and placement methodology that utilizes the above referenced unique factoring representations for facilitating and accelerating computer learning, such as where picking and placing data, e.g., state, action, transition, reward, etc. data, is structured in the configuration of a graph or tree structure, such as in a voxelated grid or knowledge or nearest neighbor graph or packing configuration tree, and the like. For example, data pertaining to the picking and placing of parcels may be represented in a data structure, such as a grid, graph, tree, and/or other such configuration in a manner that instigates deep reinforcement learning. Particularly, the analytics module of the system may employ one or more specialized data structures, such as for the purpose of generating a predictive model, implementing rules particularized to individual parcel types to be placed, by which one or more statistical analyses may be performed so as to generate a plan for picking parcels from a storage location or off of a conveyor system and placing the parcels on to a conveyor system or into a conveyance vehicle, such as for transport.

For instance, in solving a 3D-BP problem, the referenced data structure may be generated and employed for describing and defining the state and action space with regard to the picking and placing model to be generated for the performance of a packing operation. More particularly, a data structure, such as a package configuration tree, can be constructed to support the generation of the picking and placement policy, such as through deep reinforced learning. Specifically, in these regards, the number of nodes, e.g., leaf nodes, in the data structure, e.g., packing action space, may be made proportional to the size of the packing action space, thus, making the training of the learning model more efficient and its implementation more accurate, while providing for a continuous solution space.

In performing the statistical analyses, one or more of the linear or stacked algorithms, referenced above, may be employed to determine one or more predictive functions by which the dimensions of a parcel may be defined, potential spaces for placement of the parcel may be determined, and a prediction as to the optimal placement of that parcel within a determined space may be made. For example, in a particular implementation, a series of algorithms may be employed, so as to form a stack, e.g., a hierarchy, of algorithms, which may be implemented by a pipeline of processing elements for generating the data structure and then employing that structure for solving the 3D-BP problem. Particularly, provided herein is a daisy chain of processing engines that may be arranged and trained such that each algorithm may apply a nonlinear transformation to each node or leaf or data input element within the structure so as to create one or more, e.g., a plurality, of statistical picking and/or placement models.

The generated statistical model(s) can then be aggregated across a set of values that can be used to determine an optimal placement for each parcel coming into view for placement within a conveyance, such as where the sizes and shapes of the parcels are not previously known when they come into view, their order may not be determinably by the system, but a placement decision/action must be made within a short period of time, parcel by parcel. Because, in the online BP scenario, the parcels to be picked are not known until they come into view, the problem to be solved is not a search problem, but rather a problem of predicting a current placement model, based on a past placement experience, in the sense that with the placement of each preceding parcel, the environment changes with regard to each subsequent parcel to be placed. In various instances, a voxelated grid may be employed, e.g., in part, to predict parcel placement and solve the 3D-BPP, such as virtually.

However, in particular instances, such a methodology may be limited by the number of types of different parcel dimensions to be accounted for with respect to the picking and placement operation, and thus, may further lead to a large action space, which can make the decision making process difficult and unwieldly. This difficulty, however, may be overcome by structuring the state and/or action space, as set forth herein, with respect to a particular data structure, such as by a placement configuration tree, or graph, or the like, for representing the state, by which data structure the action space may be limited, and therefore, discrete actions may be determinable and evaluated. Further, by generating and deploying a neural network architecture, such as one or more graph attention networks, for learning the attendant representations, efficiency in decision making can be increased, while at the same time accuracy in results can be enhanced and computational time may be decreased.

Particularly, data representing the size, shape, and dimensions of all parcels having been viewed and placed, as well as the placement space into which they are placed, can be represented in a novel, hierarchical data structure, as disclosed herein. The data structure may be layered, such as in a plurality of graph attention layers, whereby a linear transformation may be utilized to weight a series of nodes and vectors in the structure so as to generate a weighted matrix. An attention coefficient may then be calculated for each node feature, the features may be normalized, and the relative importance of each feature can then be compared one against the other. A self- or multi-head attention may be employed to compute a plurality of different attention maps that can be used to aggregate the learned representations. And a graph attention network may then be employed to compute the learned features of the nodes.

In a manner such as this, states and actions can be defined and limited, and packing policies can be generated, tested, and learned, such as via a deep reinforced learning protocol. In this regard the size of the picking and placing action space(s) may be made proportional to the number of nodes, e.g., leaf nodes, and/or edges, which nodes and/or edges may represent the dimensions of parcels to be picked up and/or the dimensions of various candidate positions into which the parcels are to be placed, and the connections between them may represent the decisions made or to be made. This configuration, implemented by the structured processing engines set forth herein, makes the decision making process more accurate by allowing for the development and application of particularized rules that may be generated, tested, and ordered, using deep learning, by which rules efficient and accurate placement decisions may be modeled and made in a less resource intensive, faster, and more efficient manner, even where the placement coordinates may be continuous values.

Specifically, the disclosed hierarchical data structures are dynamic, and thus may be grown from inwards to outwards, whereby internal nodes may be formed to describe the configuration of packed items within the packed space, and the leaf nodes or edges may be formed to represent the potential placements of a present parcel having come into view. For instance, during training, the data structure may be grown by employing one or more algorithms, e.g., implementing one or more heuristics or pointers, by which to make decisions as to where to place an item as it comes into view, such as by comparing the determined dimensions of an object to all potential spaces that have dimensions that can accommodate that item. However, as packing progresses, and items are placed, the potential positioning becomes more and more complicated, and the goal of minimizing void space becomes increasingly difficult. Placing an object in too big of a space, although easy to perform, increases void space and is therefore inefficient. Yet, placing an object in too small a space may cause damage to the object and/or surrounding objects. An additional difficulty arises when considering all potential placements of an object against any other objects that are in view or are coming into view. In such instances, the number of placements possible and the number of calculations needed to compare the potential objects to the entirety of potential placements becomes very large and unwieldly.

Accordingly, one or more heuristics may be utilized to run different simulations whereby the comparisons can be made more easily and faster. For example, one or more heuristics such as corner point, extreme point, empty maximal space, guided local search, tabu search, deep-bottom-left, height map-minimization, maximize-accessible-convex-space, hybrid genetic algorithm, and the like, can be used, initially, to analyze the space, calculate dimensions, perform comparisons of space to object dimensions, and then present a first model of a potential placement operation, which the system can then use to evaluate to perform a first relative efficiency and utilization of space of one potential placement over another. Hence, heuristics are useful, in the beginning, for generally determining placement decision possibilities, and for beginning the growing of the data structure.

However, as the process continues, the placement and order decisions may become more and more optimized via the process of generating the data structure, and modifying the heuristic formula so as to become more and more precise as time goes on, whereby the placement of any given parcel can be evaluated against all potential placement spaces in a variety of orientations, given the respective dimensions of each, such as by developing and implementing an individualized heuristic. In such an instance, through a deep reinforced learning model an individualized heuristic, specific to the particular parcel to be placed, e.g., a unique policy for that individual parcel, can be generated, tested, and by which a final placement decision can be made by the analytics system to be implemented by the automated positioning element and gripper on a parcel by parcel basis. Accordingly, generalized heuristics are useful for confining the solution space, but in doing so, they may confine the space too narrowly, or not narrowly enough, and thus, although such heuristics may be useful for initially growing the data structure from inwards to outwards, a more refined heuristic should be developed, iteratively, for advanced parcel placement, e.g., policy development.

Specifically, through training a more individualized placement heuristic should be determined based on a learning model, e.g., discriminant fitness function, which takes into account the overall data structure, whereby in view of the entirety of the data structure, a wide variety of candidate placements can be determined that is more catered to each individual object. More particularly, state features can be extracted from the data structure, e.g., using critic attention networks that encode the spatial relations of all space configuration nodes, and may be input into the analytics system whereby the critic attention networks, e.g., graph or tree attention networks of the deep learning model, can be employed to weigh the nodes and/or edges, e.g., leaf-nodes, and then determines an action output, such as for the final placement of a parcel, within a placement environment with a particularly defined orientation. In this manner a more robust packing policy may be generated, above and beyond which could be considered using simple heuristics. The data structure, therefore, represents a full-blown description of the state and action conditions that form the foundation for the learning and development of the policy, e.g., based on deep reinforced learning. In a manner such as this, deep reinforced learning may be utilized to generate and test a plurality of policies, whereby the various models may be tested, and the best policy may be determined through the deep reinforced training, e.g., of one or more of the daisy train of processors. Hence, each model can be tested in an iterative process until a desired level of acceptable accuracy has been achieved.

In these regards, a number of different states, such as with respect to the generation of the data structure, in relation to the dimensions of each parcel to be picked and placed, and with regard to each action, e.g., picking and placing operation, within a space, may be arranged so as to be proportional to the number of nodes, e.g., leaf nodes, in the data structure, where each edge or leaf-connection may represent a candidate placement position that may be restricted by the physical limitations defining the present parcel, given the environment determined by the bin space and the positioning of the previously placed parcels. Accordingly, the configuration of the disclosed data structures accounts for both parcel size as well as bin space, and makes the training and, therefore development of a deep reinforced learning model more efficient at the same time as being more accurate. Particularly, employing the training processes disclosed herein for generating a deep learning protocol, both state and action space for bin packing can be defined and used to generate an individuated heuristic that can be used to develop a bin packing model, which model can in turn be utilized to efficiently and effectively solve the BPP, and can further be used to place parcels within a bounded (or even boundless) space in accordance with the generated bin packing model.

In such an instance, the dimensions of the parcels to be placed, as well as the dimensions and/or size of the placement action space, may be represented as a number of nodes, e.g., leaf nodes or nodes in a knowledge graph or voxel grid, and one or more connections or edges between the nodes may be represented by potential relationships and/or potential predictive decisions, whereby the graph or tree is expanded based on one or more heuristic, e.g., generalized or particularized, rules, which act as the action space for deep reinforcement learning. Accordingly, as set forth above, in this regard, the data structure may be expanded by implementation of one or more heuristics in a manner that reduces the action space to a limited number of nodes and/or connections, e.g., actions. Reinforcement learning may then be incorporated to optimize placement efficiency, such as in a manner that limits what could otherwise be a continuous action space.

Specifically, the action space may be determined by the hierarchy of the picking and placing algorithms, as well as the heuristics employed thereby, which define the number of candidate actions thereby confining an otherwise continuous action space and setting forth the packing problem and defining the packing coordinates, which may be continuous values. This process creates a discrete and reduced action space while providing a continuous solution space by which the online 3D-BPP may be solved, thereby leading to better learning results. These methods can greatly reduce the action space to discrete nodes, e.g., via heuristic search. However, because the more general heuristics typically only select a part of action space, after the heuristic search is performed, the packing action space may be reduced somewhat but may not fully be covered.

Thus, using more generalized heuristics, there may be a trade-off between complexity and optimality. For instance, the complexity of the graph or tree search grows exponentially in situations where there is a larger number of parcels that have to be packed, which complicates scalability, because the more parcels are placed within the space, the number of potential placement positions decreases, making the decision process of matching a particular parcel to be placed with an available space that can accommodate that parcel more difficult. Hence, as complexity increases, optimality will decrease as it becomes more difficult to define spaces within which parcels may be placed. More specifically, a large number of leaf nodes makes the attention network computationally heavy since it is quadratically related to the number of nodes. To overcome this difficulty, after an initial implementation of a more generalized heuristic, a more particularized placement determination scheme can be developed, such as via deep reinforced learning. For example, a general placement heuristic may first be employed so as to determine the initial candidate points, but after the candidate points have been determined, the original heuristic rules may then be modified by deep reinforced learning so as to later determine the placement point of new items by the systems newly generated heuristic rules.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible.

In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims. Accordingly, the foregoing descriptions of the apparatuses, their methods of use, and the attendant processes are provided merely as illustrative examples and are not intended to require or imply that the steps of the various embodiments must be performed in the order presented and/or by the referenced apparatus components.

Particularly, as will be appreciated by one of skill in the art the order of steps in the disclosed embodiments may be performed in any order. Words such as "after," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular. It will be understood that each method step or block of a described process or flowchart, and combinations of steps or blocks in the processes or flowcharts, may be implemented by various apparatuses, such as hardware, firmware, one or more processors, circuitry and/or other devices associated with execution of software including one or more computer program instructions.

For example, one or more of the procedures described above may be embodied by computer program instructions. In this regard, the computer program instructions that embody the procedures described herein may be stored by a memory of an apparatus employing an embodiment of the present disclosure and may be executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the corresponding processes. The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. Particularly, in various instances, certain aspects of the artificial intelligence module may be accelerated, such as by being implemented in hardware, such as by a suitably configured integrated circuit, such as by an FPGA, ASIC, Structured ASIC, and the like.

For instance, in certain embodiments, the AI system may be configured to model a neural network, including a deep learning neural network, which may be formed of layers and layers or processing engines, where the more layers provided the deeper the learning configuration, and where each processing engine is trained in accordance with the methods disclosed herein to perform predictive analyses, which based on the number of layers may allow for exponential analyses to be performed. In other instances, various actions, as described herein above, to be performed by a computing architecture, may be performed by a general purpose processor, such as one or more of a CPU, GPU, QPU, and the like. A general-purpose processor may be a microprocessor, but, in the alternative, the processor may be any processor, controller, or state machine. A processor may also be implemented as a combination of computing devices, e.g., a combination of a DSP and a microprocessor, a plurality of microprocessors, one or more microprocessors in conjunction with a DSP core, or any other such configuration. Particularly, a processor or controller of the disclosure may be configured for generating and/or implementing instructions, such as computer programmable instructions.

As indicated above, these computer program instructions may be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the disclosed processes. As such, the operations set forth herein, when executed by a processing unit of the system, may convert a computer or processing circuitry into a particular machine configured to perform an example embodiment of the present disclosure. Accordingly, the described operations define algorithms for configuring one or more computers or processors to perform various example embodiments. In some cases, a general purpose computer may be provided with an instance of the processor which performs the algorithms transform the general purpose computer into a particular machine configured to perform an example embodiment. Alternatively or in addition, some steps or methods may be performed by circuitry that is specific to a given function.

However, in one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor.

By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media.

Additionally, any combination of instructions stored on the one or more non-transitory processor-readable or computer-readable media may be referred to herein as a computer program product. Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the machine.

Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The invention claimed is:

1. A system for implementing a series of optimized picking and placing operations in a manner so as to minimize void space when packing a conveyance with parcels, the system comprising:

an automated intelligent translation platform having a plurality of sets of horizontally extended frame members that define a perimeter portion that forms a base member, the base member including at least one wheel that is coupled to an associated motor so as to form an automated wheel unit, and a side member defined by at least one vertically extended side support, the side member being coupled to the base member, the base member including an associated first computing device and first communications module in communication with each of the automated wheel unit, the first computing device configured for receiving a first set of instructions as to directing one or more movements of the at least one automated wheel units in accordance with the received first set of instructions so as to direct the movements of the automated intelligent translation platform;

an automated positioning element moveably coupled to the side member of the intelligent translation platform, the automated positioning element including one or more robotic arms having a motor associated with a controller, each controller being further associated with a second communications module in further communication with a second computing device for receiving a second set of instructions so as to direct one or more movements of the arm in accordance with the received second set of instructions so as to direct the movements of the arm segments of the robotic arm;

one or more automated gripping instruments being movably coupled to a segment of respective robotic arms, the automated gripper comprising a plurality of extended elements each being moveably coupled with a flipper unit that is capable of being extended away from or retracted toward the extended elements by a force being applied thereto, each flipper being individually and independently controllable so as to contact and grasp an object to be picked up and placed in accordance with a third set of instructions received by a third communications module coupled with the third computing device; and a system server, the system server being coupled with the first, second, and third computing devices, and being configured for generating a picking and placing model by which parcels to be picked and placed within a conveyance may be done so in a manner that minimizes void space, the model defining a plurality of operations to be performed by each of the automated intelligent translation platform, automated positioning element, and automated gripping instrument so as to implement the picking and placing model, and the system server further configured for generating and communicating via an associated fourth communications module, the first, second, and third sets of instructions of the generated picking and placing model, each set of instructions setting forth at least one of the plurality of operations to be performed.

2. The system in accordance with claim 1, wherein the picking and placing model is a result of solving an on-line or off-line bin packing problem.

3. The system in accordance with claim 2, wherein one or more of the automated intelligent translation platform, automated positioning element, and automated gripping instrument further includes one or more of an image capturing device and a sensor module for collecting captured data, and the picking and placing model is based at least partially on an analysis by the system server of the captured data.

4. The system in accordance with claim 3, wherein the automated positioning element comprises a plurality of robotic arms each coupled to a respective automatic gripping instrument, and the server system solves an online or offline bin packing problem for each robotic arm and each automated gripping instrument substantially simultaneously in generating the picking and placing model.

5. The system in accordance with claim 4, wherein each flipper of each automatic gripping instrument is automated via a pneumatic force being applied to a proximal portion of the flipper.

6. The system in accordance with claim 3, wherein the captured data further includes image and distance data defining one or more spaces into which a parcel may be fitted, and the picking and placing model is based at least partially on an analysis by the system server of captured available space related data.

7. The system in accordance with claim 6, wherein the picking and placing model is a result of solving an on-line problem in substantially real-time.

8. A system for implementing a series of optimized picking and placing operations in a manner so as to minimize void space when packing a conveyance with parcels, the system comprising:

a motorized intelligent base having at least one wheel that is coupled to an associated motor and controller so as to from an automated wheel unit, the intelligent base including an associated first computing device and first communications module in communication with each controller of the wheel unit, the first computing device configured for receiving a first set of instructions as to directing one or more movements of each wheel unit in accordance with the received first set of instructions so as to direct the movements of the motorized intelligent base;

an extendable and retractable injection platform having a housing for retaining a set of extendable segments that are configured for being moved into stacked alignment with one another so as to be fitted within the housing, in a retracted form, and further being moved away from one another into extended alignment with one another, in an extended form, the injection platform having a liftable and rotational connection element coupling the injection platform to the motorized intelligent base, and further including a second computing device coupled to a communications module and a first and second injection controller, the communications module for receiving a second set of instructions, the first injection controller being associated with a first motor for effectuating the lifting and rotating of the injection platform, and the second controller being associated with a second motor for extending a top portion of the housing away from the intelligent base, in accordance with the received second set of instructions;

an automated positioning element moveably and rotatably coupled to the housing of the extendable and retractable injection platform, the automated positioning element including one or more robotic arms coupled to a motor associated with a controller, each controller being further associated with a third communications module in further communication with a third computing device, the third computing device configured for receiving a third set of instructions as to directing one or more movements of the arms in accordance with the received third set of instructions so as to direct the movements of the robotic arm;

one or more automated gripping instruments being movably coupled to respective one or more robotic arms, the automated gripper comprising a flipper unit, each flipper being individually and independently controllable by an associated fourth computing device so as to contact and grasp an object to be picked up and placed in accordance with a fourth set of instructions received by a fourth communications module coupled with the fourth computing device;

a system server, the system server being coupled with respective computing devices, and being configured for generating a picking and placing model by which parcels to be picked and placed within a conveyance may be done so in a manner that minimizes void space, the system server further being configured for generating and communicating via an associated fifth communications module, the respective sets of instructions from the generated picking and placing model, each set of instructions setting forth at least one of the plurality of operations to be performed.

9. The system in accordance with claim 8, wherein the picking and placing model is a result of solving an on-line or off-line bin packing problem.

10. The system in accordance with claim 9, wherein one or more of the motorized intelligent base, extendable and retractable injection platform, automated positioning element, and automated gripping instrument further includes one or more of an image capturing device and a sensor module for collecting captured data, and the picking and placing model is based at least partially on an analysis by the system server of the captured data.

11. The system in accordance with claim 10, wherein the automated positioning element comprises a plurality of robotic arms each coupled to a respective automatic gripping instrument, and the server system solves an online or offline bin packing problem for each robotic arm and each automated gripping instrument substantially simultaneously in generating the picking and placing model.

12. The system in accordance with claim 11, wherein each flipper of each automatic gripping instrument is automated via a pneumatic force being applied to a proximal portion of the flipper.

13. The system in accordance with claim 12, wherein the captured data further includes image and distance data defining one or more spaces into which a parcel may be fitted, and the picking and placing model is based at least partially on an analysis by the system server of captured available space related data.

14. The system in accordance with claim 13, wherein the picking and placing model is a result of solving an on-line problem in substantially real-time.

15. A system for implementing a series of optimized picking and placing operations in a manner so as to minimize void space when packing a conveyance with parcels, the system comprising:

an automated positioning element including a vertical support member to which one or more robotic arms are moveably coupled, the robotic arm being defined by a plurality of arm segments coupled to one another by a moveable joint element, each joint element being coupled to a motor associated with a controller, each controller being further associated with a first communications module in further communication with a first computing device, the first computing device being configured for receiving a first set of instructions as to directing one or more movements of the arm segments in accordance with the received first set of instructions so as to direct the movements of the arm segments of the robotic arm;

one or more automated gripping instrument being movably coupled to a distal portion of a distal arm segment of respective one or more robotic arms, the automated gripper comprising a plurality of arm segments, each arm segment being moveably coupled with a flipper unit, each flipper unit being individually and independently controllable by an associated second computing device so as to contact and grasp an object to be picked up and placed in accordance with a second set of instructions received by a second communications module coupled with the second computing device; and a system server, the system server being coupled with the first and second computing devices, and being configured for generating a picking and placing model by which parcels to be picked and placed may be done so in a manner that minimizes void space, the model defining a plurality of operations to be performed by each of the automated positioning element and automated gripping instrument so as to implement the picking and placing model, and the system server further being configured for generating and communicating via an associated third communications module, the first and second sets of instructions from the generated picking and placing model, each set of instructions setting forth at least one of the plurality of operations to be performed.

16. The system in accordance with claim 15, wherein the picking and placing model is a result of solving an on-line or off-line bin packing problem.

17. The system in accordance with claim 16, wherein one or more of the motorized intelligent base, automated positioning element, and automated gripping instrument further includes one or more of an image capturing device and a sensor module for collecting captured data, and the picking and placing model is based at least partially on an analysis by the system server of the captured data.

18. The system in accordance with claim 17, wherein the automated positioning element comprises a plurality of robotic arms, and the server system solves an online or offline bin packing problem for each robotic arm substantially simultaneously in generating the picking and placing model.

19. The system in accordance with claim 18, wherein the automated positioning element comprises a plurality of robotic arms each coupled to a respective automatic gripping instrument, and the server system solves an online or offline bin packing problem for each robotic arm and each automated gripping instrument substantially simultaneously in generating the picking and placing model.

20. The system in accordance with claim 19, wherein the picking and placing model is a result of solving an on-line problem in substantially real-time.

* * * * *